US012509880B2

(12) United States Patent
Sanabra Loewe

(10) Patent No.: US 12,509,880 B2
(45) Date of Patent: Dec. 30, 2025

(54) PREFABRICATED FLOOR ELEMENT, STRUCTURE COMPRISING PREFABRICATED FLOOR ELEMENTS AND INSTALLATION FOR OBTAINING THE PREFABRICATED FLOOR ELEMENT

(71) Applicant: Elastic Potential, S.L., Barcelona (ES)

(72) Inventor: Marc Sanabra Loewe, Barcelona (ES)

(73) Assignee: Elastic Potential, S.L., Barcelona (ES)

( * ) Notice: Subject to any disclaimer, the term of this patent is extended or adjusted under 35 U.S.C. 154(b) by 632 days.

(21) Appl. No.: 16/977,907

(22) PCT Filed: Mar. 12, 2019

(86) PCT No.: PCT/EP2019/056193
§ 371 (c)(1),
(2) Date: Sep. 3, 2020

(87) PCT Pub. No.: WO2019/175196
PCT Pub. Date: Sep. 19, 2019

(65) Prior Publication Data

US 2021/0040739 A1 Feb. 11, 2021

(30) Foreign Application Priority Data

Mar. 12, 2018 (EP) .................................... 18382159

(51) Int. Cl.
*E04B 5/04* (2006.01)
*B28B 1/08* (2006.01)
(Continued)

(52) U.S. Cl.
CPC .............. *E04B 5/043* (2013.01); *B28B 1/084* (2013.01); *B28B 3/228* (2013.01); *B28B 11/0863* (2013.01); *E04B 5/04* (2013.01)

(58) Field of Classification Search
CPC ............ E04B 1/161; E04B 1/165; E04B 5/29; E04B 5/28; E04B 2005/322; E04B 5/04;
(Continued)

(56) References Cited

U.S. PATENT DOCUMENTS 2,215,975 A * 9/1940 Rackle ...................... E04B 5/06 52/440
5,044,139 A * 9/1991 Mills ................... E04G 23/0218 52/741.1
(Continued)

FOREIGN PATENT DOCUMENTS

DE 10105488 A1 8/2002
EP 2657423 A1 * 10/2013 ............ B28B 1/084
(Continued)

*Primary Examiner* — Theodore V Adamos
(74) *Attorney, Agent, or Firm* — Snell & Wilmer LLP

(57) ABSTRACT

Prefabricated floor element (1) having an elongated shape wherein a longitudinal direction (X), a transversal direction (Y), a height direction (Z), two end faces (11) which delimitate the element (1) in the longitudinal direction (X), two lateral faces (12) which delimitate the element (1) in the transversal direction (Y), a lower face (13) and an upper planar face (14) that delimitate the element (1) in the height direction (Z) are defined, which comprises transversal continuous upper grooves (15) on the upper planar face (14) or lateral grooves (26) on the lateral faces (24), the lateral grooves (26) extending from the lower tab (TS) to the upper planar face (24). The invention also relates to a structure comprising such prefabricated floor element (1) and further comprising a linear supporting element (LS) which supports one end of the prefabricated floor element.

6 Claims, 35 Drawing Sheets

(51) Int. Cl.
*B28B 3/22* (2006.01)
*B28B 11/08* (2006.01)

(58) Field of Classification Search
CPC ......... E04B 5/043; B28B 1/084; B28B 3/228; B28B 11/0863
See application file for complete search history.

(56) References Cited

U.S. PATENT DOCUMENTS

| | | | | |
|---|---|---|---|---|
| 5,894,003 | A * | 4/1999 | Lockwood | E04G 23/0218 264/36.19 |
| 2012/0167502 | A1* | 7/2012 | Tikhovskiy | E04B 1/161 52/251 |
| 2015/0345127 | A1* | 12/2015 | Thomas | E04B 1/04 52/251 |
| 2016/0319541 | A1* | 11/2016 | Sanabra | E04B 5/043 |
| 2018/0283024 | A1* | 10/2018 | Reigstad | E04G 23/0237 |
| 2019/0071871 | A1* | 3/2019 | Yin | E04B 5/026 |

FOREIGN PATENT DOCUMENTS

| | | | | |
|---|---|---|---|---|
| FR | 2357347 | A1 | 2/1978 | |
| FR | 2757889 | A1 * | 7/1998 | E04B 5/04 |
| FR | 2924451 | A1 * | 6/2009 | E04B 5/043 |
| FR | 2938564 | A1 | 5/2010 | |
| JP | H08267437 | A | 10/1996 | |
| JP | 2006299571 | A | 11/2006 | |
| KR | 100693122 | B1 * | 3/2007 | B28B 1/084 |
| WO | WO 2002/051604 | A1 | 7/2002 | |
| WO | WO 2016/020753 | A1 | 2/2016 | |
| WO | WO-2016177920 | A1 * | 11/2016 | E04B 5/043 |

* cited by examiner

Fig. 3
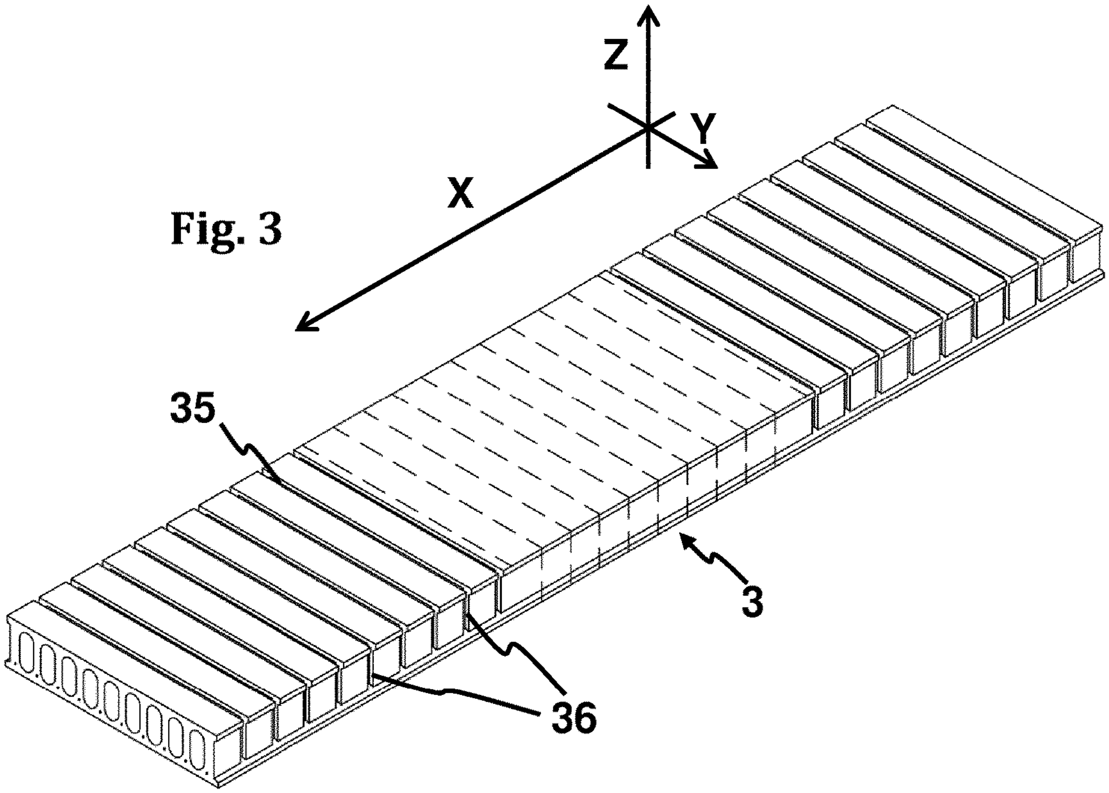
Fig. 4
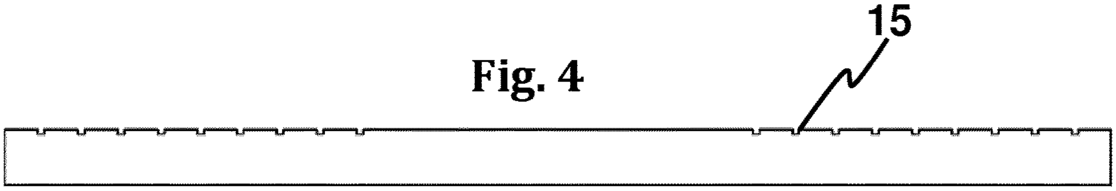
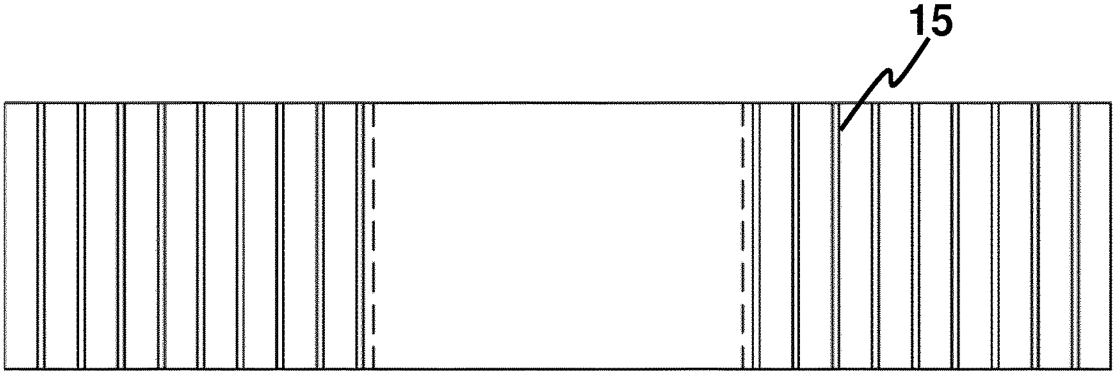
Fig. 5

Fig. 6
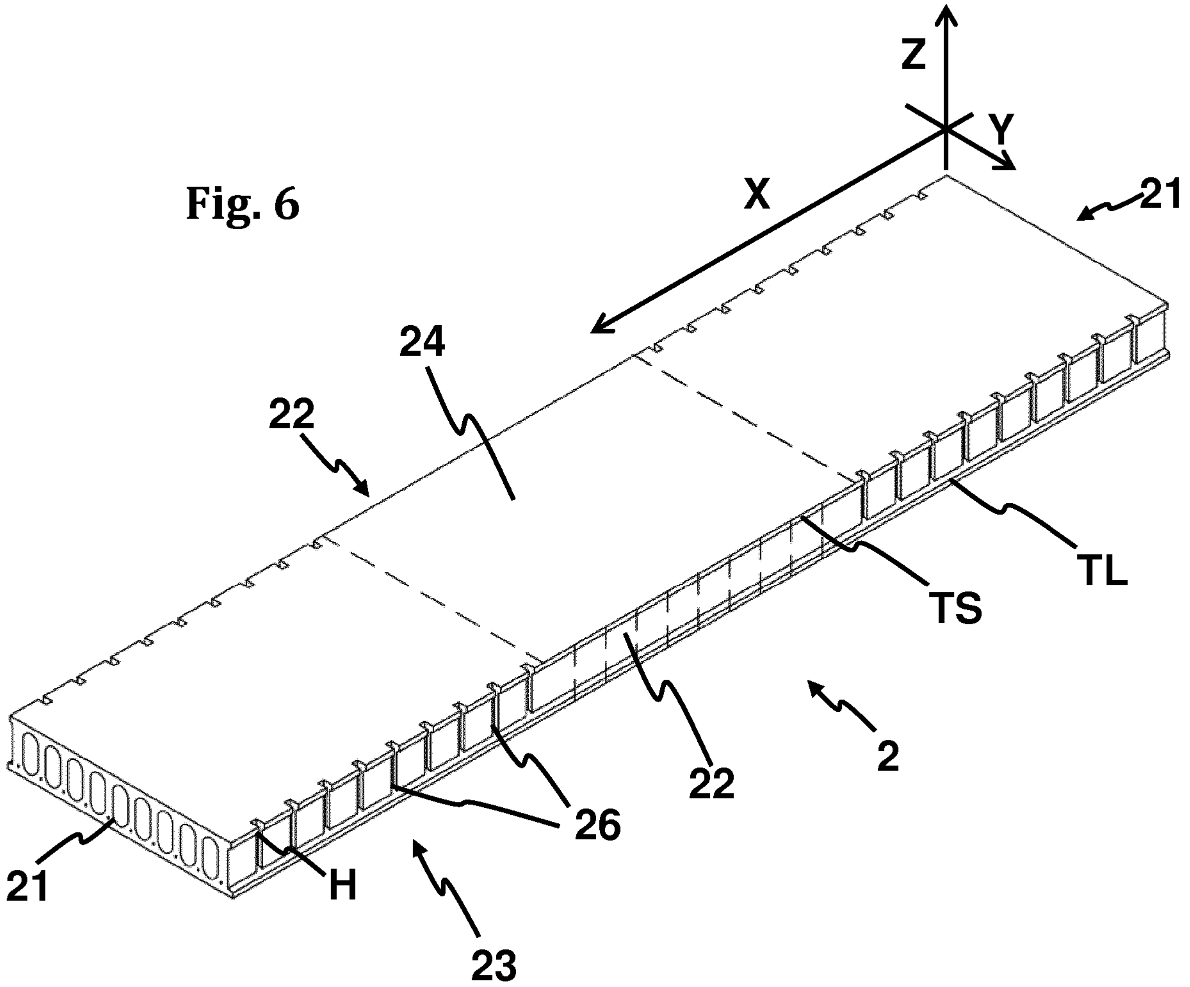
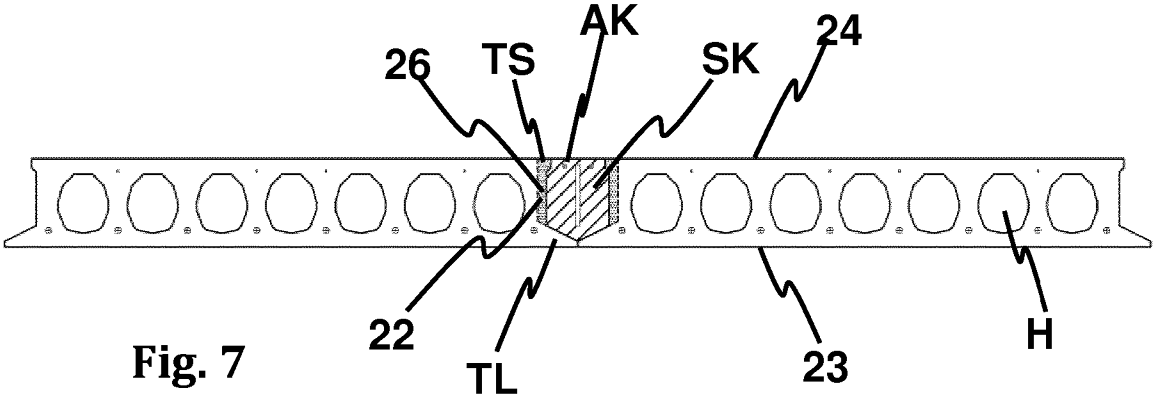
Fig. 7

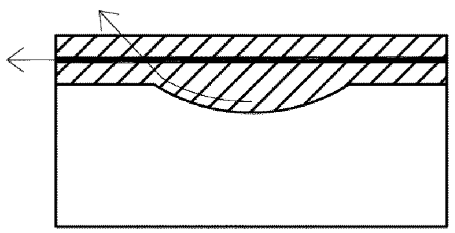
Fig. 10A
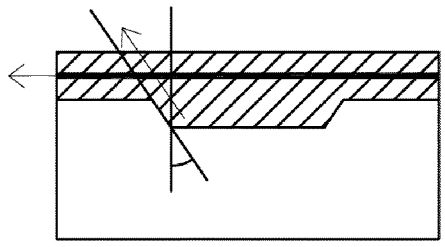
Fig. 11A
Fig. 10B
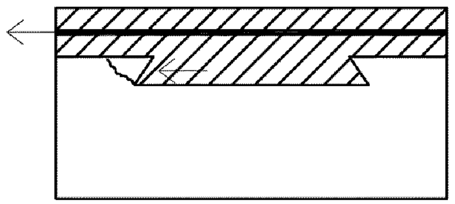
Fig. 11B
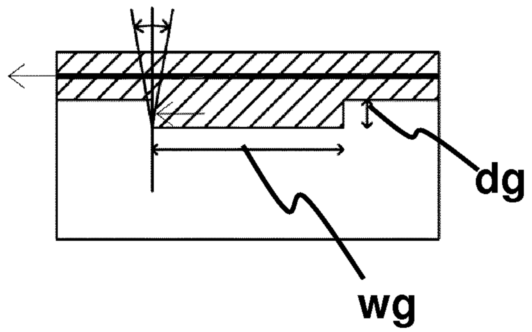
Fig. 12
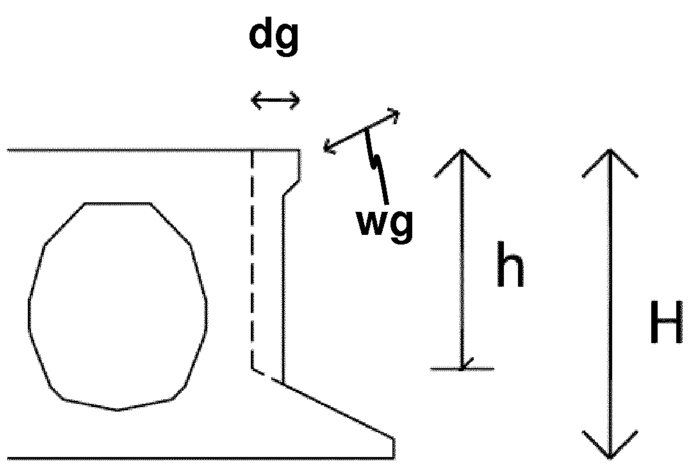

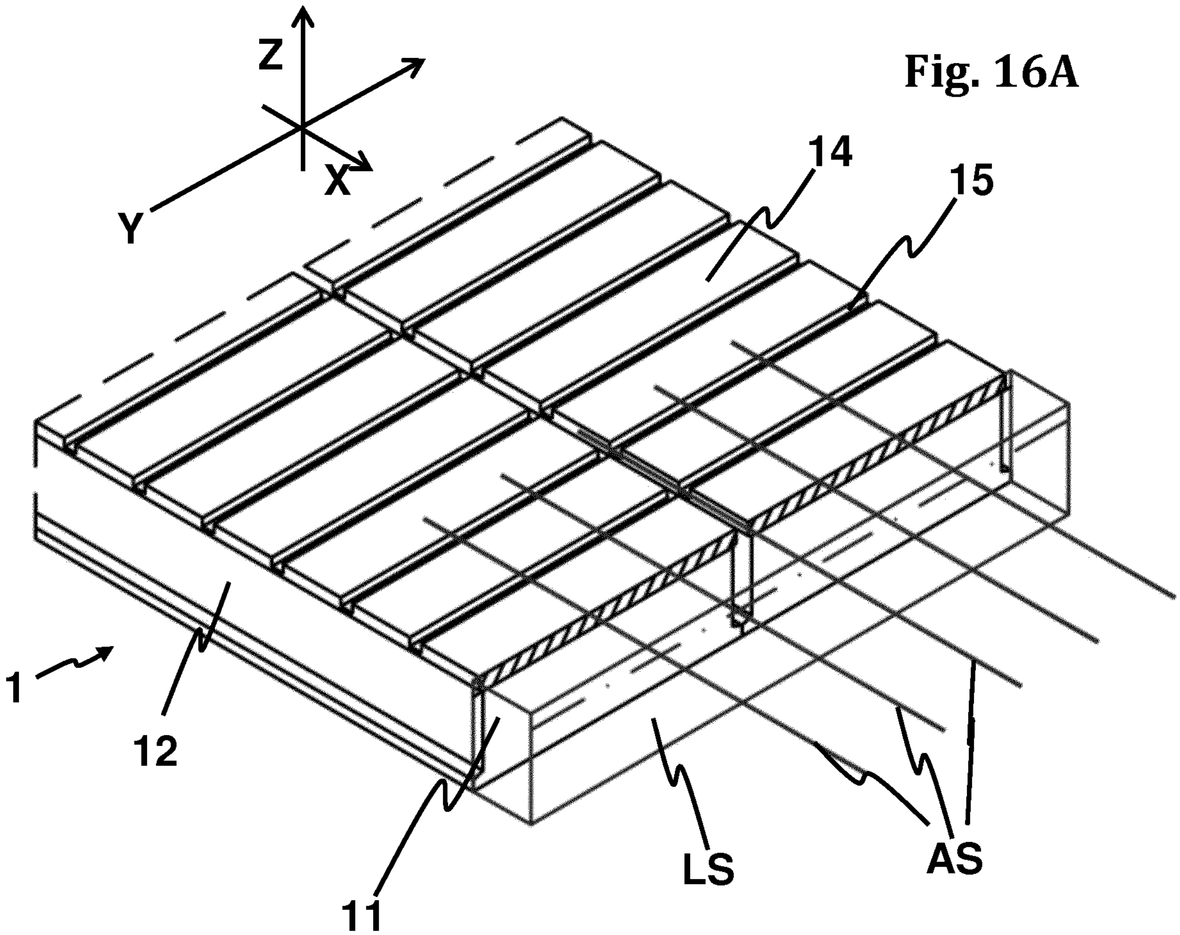
Fig. 16A
Fig. 16B
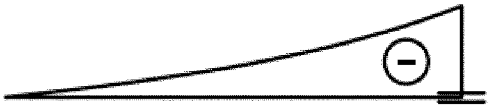
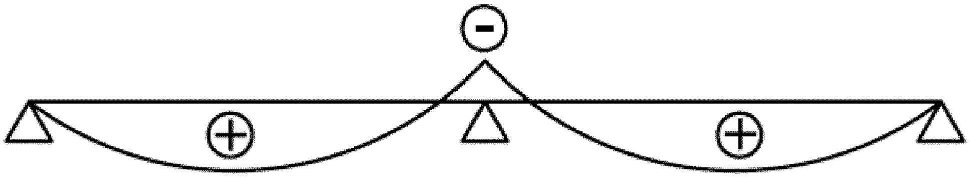
Fig. 16C

Fig. 41
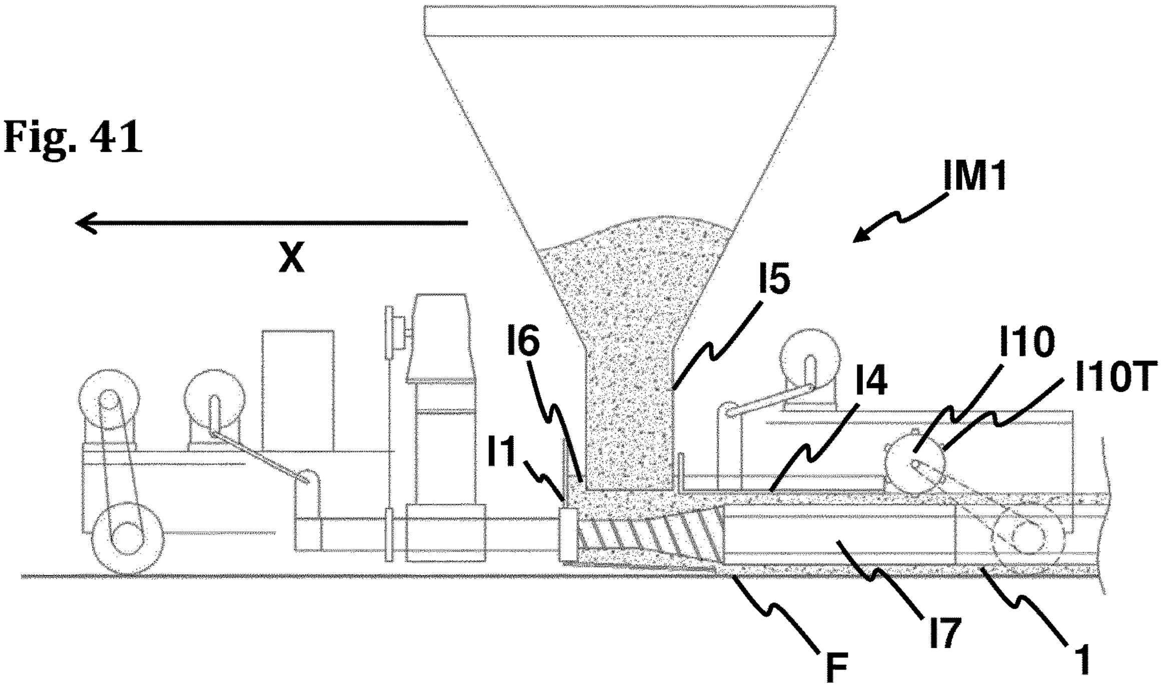
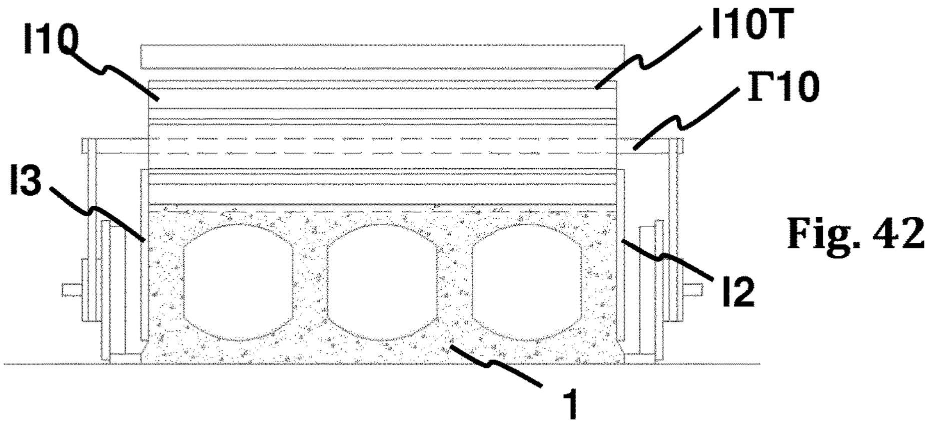
Fig. 42
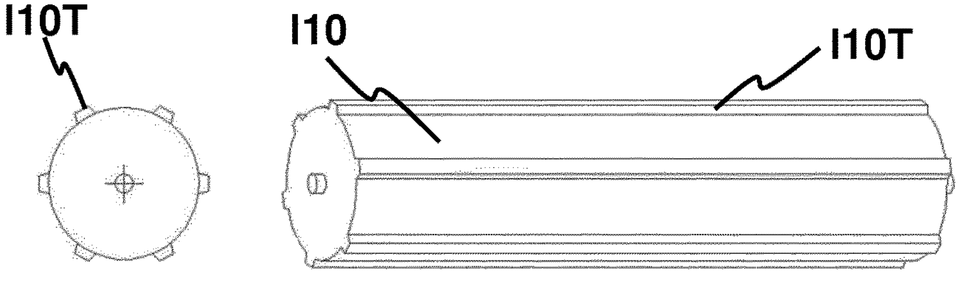
Fig. 43

| BATCH | NUMBER OF SPECIMENS | SORT OF CONTACT SURFACE | | SORT OF CONCRETE | AGE OF CONCRETE OF TOPPING | AGE OF PRECAST ELEMENTS | AVERAGE HORIZONTAL SHEAR STRENGTH (MPa=N/mm$^2$) |
|---|---|---|---|---|---|---|---|
| | | SURFACE | ARMATURE | | | | |
| 1 | 4 | Smooth | - | H1 | 12 | 29 | 0,36 |
| | 2 | Smooth | - | H2 | 12 | 29 | 0,34 |
| | 2 | Smooth | - | H3 | 12 | 29 | 0,54 |
| 2 | 2 | Deep grooves | - | H1 | 12 | 29 | 1,29 |
| | 2 | Deep grooves | - | H3 | 12 | 29 | 1,23 |
| | 2 | Deep holes | - | H1 | 12 | 29 | 0,37 |
| | 2 | Deep holes | - | H3 | 12 | 29 | 0,38 |
| 3 | 2 | Smooth | - | H1 | 55 | 69 | 0,04 |
| | 2 | Smooth | Yes | H1 | 55 | 69 | 0,63 |
| | 2 | Deep grooves | Yes | H1 | 55 | 69 | 1,06 |
| 4 | 3 | Smooth | - | H3 | 12 | 120 | 0,32 |
| | 2 | Deep grooves | - | H3 | 12 | 90 | 1,19 |
| 5 | 2 | Smooth | - | Plant | 60 | 130 | 0,97 |
| | 2 | Brushed | - | Plant | 60 | 130 | 0,43 |
| | 2 | Shallow grooves | - | Plant | 60 | 130 | 0,91 |
| | 2 | Deep grooves | - | Plant | 60 | 130 | 1,63 |

Fig. 51

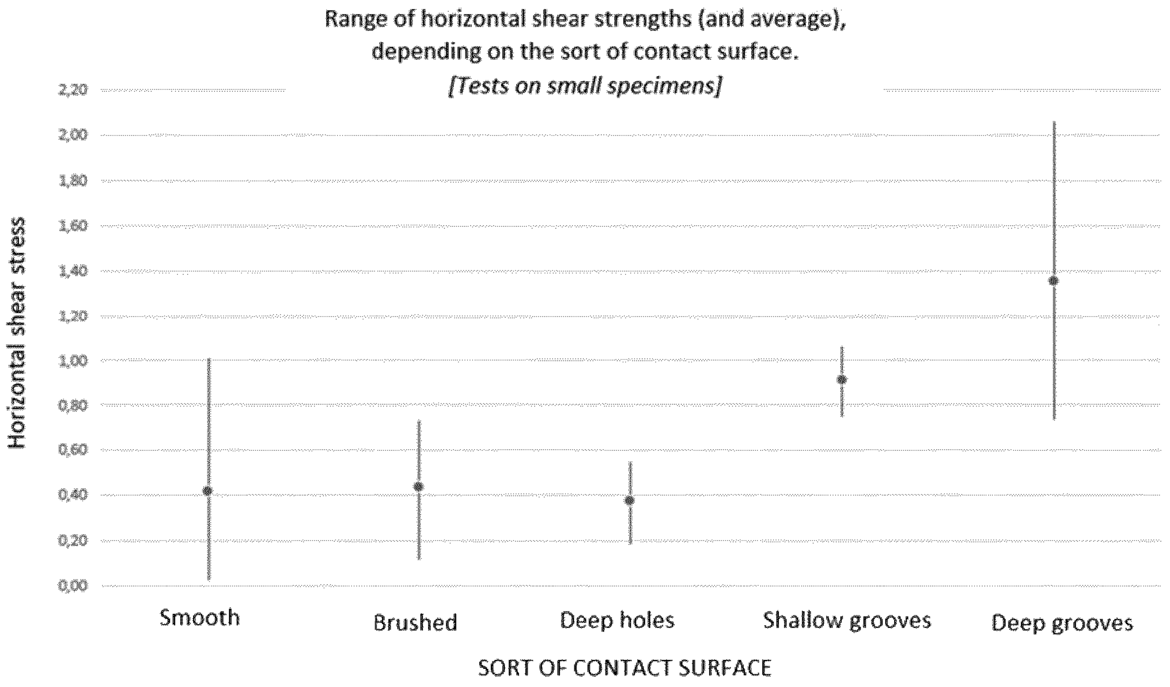

Fig. 52

PREFABRICATED FLOOR ELEMENT, STRUCTURE COMPRISING PREFABRICATED FLOOR ELEMENTS AND INSTALLATION FOR OBTAINING THE PREFABRICATED FLOOR ELEMENT

TECHNICAL FIELD

The present invention relates to an improved constructive system for structural floors and its erection method. The structural floors are made out of improved structural precast concrete elongated elements and reinforced concrete placed in the job able to properly work together with the precast elements thanks to a proper bonding, being such precast floor elements fabricated thanks to improved industrial installations.

STATE OF THE ART

Known in the art are number of floor systems based on precast concrete elongated floor elements and reinforced concrete placed in the job. In sake of clarity, from here on all the term elongated floor element will be used exclusively to refer to a particular family of floor elements: those which span directly from end to end bearing at both ends exclusively in primary structural members (such as primary beams, girders or walls). Also those elements which work in cantilever are included as long as the mentioned structural floor elements are made of one sole piece. These mentioned structural elements typically have a continuous steel reinforcement from one end to the other. Excluded of this field are all those structural elements and/or formers which form structural floors only as a result of a juxtaposition of elements in the direction of the span. This sort of elements that work by addition, typically have their reinforcement interrupted in the direction of the span (and splices often have to be arranged), and also temporary props and/or formers are needed during the erection process, as these small structural elements are too small to span from one main bearing (wall, girder, etc.) to the next one.

In order to analyse the differences between the currently existing systems of structural floors, those can be studied seeing 5 main features:

A) CROSS SECTION of the precast floor elements, transverse to their longitudinal direction;

B) METHOD OF VOIDING THE CROSS SECTION to make lighter and more efficient elements;

C) AMOUNT OF CONCRETE POURED IN THE JOB and its relative position in relation to precast floor elements;

D) BONDING SYSTEM to keep together precast concrete to cast in situ concrete;

E) Existence of EFFECTIVE NEGATIVE REINFORCEMENT to enable the structural floors to resist negative moments over the linear supports where structural floor elements bear their ends.

For each of the 5 features, the main solutions are described, some examples are mentioned, and their main advantages and/or drawbacks are mentioned.

A) Cross Section

Two main sorts of cross section of the elements can be defined. Solid elements and light or voided elements.

Among solid elements, the most common are known as preslabs, predalles or half slabs, among other names. These are typically rectangular section flat solid elements intended to form solid slabs by pouring considerable amounts of concrete in the job. The precast elements normally have a height around ⅓ or ½ of the total height of the finished slabs. Their main advantages one can count that their prefabrication is generally easy. However, some examples of very complicated preslabs can be found: QIU ZEYOU (CN1975058), QIU ZEYOU (CN1944889) and QU, YUAN, ZHOU, LI, WEI (CN201924490). Among the main disadvantages of predalles (or preslabs) (apart from the expensive fabrications in some cases, as the mentioned examples) is the fact that precast elements may be heavy and finished solid floors are very heavy, and inefficient compared to light or voided floors.

Among precast floor elements with a light or voided, there is a considerable variety. Some of the more generally used are hollow core slabs, double-T slabs and voided preslabs (or predalles). All this elements' cross sections are specifically designed searching their optimization. This means a minimum consumption of concrete (and steel), and thus a minimum cost and weight, but also a maximum moment of inertia and a height as small as possible. Voided cross sections always have a bigger radius of gyration (i) than solid sections with the same depth. This means a higher ratio (Moment of Inertia)/(Area). This simply means light or voided section precast elements are more efficient than solid section precast elements.

B) Method of Voiding the Cross Section

This feature, obviously, is only applicable to precast elements with light or voided cross sections. There are two main strategies to void the section: using removable/reusable formers, and or embedding light permanent formers.

Using removable/reusable formers is typically used in elements such as hollow core slabs, double T slabs and similar sections. It is a cheap an efficient technique as formers are reusable for a very big number of elements. However, the floor elements obtained with this technique have one important drawback. Their low notional size leads to a rapid initial shrinkage of the precast element. This is because this elements have a cross section with a small area in relation to its perimeter.

Embedding light permanent formers is a solution used when using removable formers is not possible or too complicated. This is a solution used in voided preslabs (or predalles). A recently published example is JINLONG, JUNWEI, WANYUN (CN104032870). These precast elements are often prefabricated in two (sometimes tree) main steps. A first step consists in casting a flat thin solid slab. A second step consists in placing light permanent formers on the precast slab. And a third step (not always exists) is to cast vertical ribs (or stems) connected to the lower slab. This way of making light or voided cross sections is somewhat expensive, because the light permanent formers are often expensive, not only because of the material cost (normally polyestirene or tile) but also because of the cost of the handling during the placing operation.

C) Amount of Concrete Poured in the Job

We can find mainly four cases: 1) Those where the amount of concrete cast in the job is greater or similar to the amount of concrete of the precast element, and concrete is typically placed all over the precast element; 2) Those where the concrete placed in the job forms a relatively thin layer all over the precast elements, typically known as topping; 3) Those where the amount of concrete is minimum, and is typically placed only in the lateral joints along the sides or of the precast elements; 4) Those where no concrete at all is poured.

Those structural floors where the amount of concrete cast in the job is greater or similar to the amount of concrete of the precast elements, are of two sorts: solid preslabs (or predalles) (very usual) and hollow core slabs where some alveoli are open in the upper face (unusual in current practice). Using solid preslabs (or predalles) causes a typical dichotomy to solve. The thinner the precast solid preslab is, the more flexible it is, and the greater is the amount (and the weight) of the concrete paced in the job, so the more intense becomes the required shoring required during the erection (while cast in situ concrete is still fresh) to prevent the deflection of the thin preslab, thus the more expensive and slow the construction becomes. The thicker the precast solid preslab is, the less flexible it is and the lesser the mount of concrete cast in the field is required; so the lesser (or none) is the shoring required during the erection process. But, even if the shoring cost can be reduced or supressed for thicker solid slabs, the bigger amount of precast concrete very often increases the cost of the whole structure, as the precast concrete is often more expensive by $m^3$ than the cast in situ concrete due (among other reasons) to the fact that precast concrete is typically richer in cement and richer in additives. In the case of hollow core slabs where some alveoli are open in the upper face, the moment of inertia is reduced by the superior openings (and become more flexible). So, slabs typically need shoring in the job in order to withstand the weight of the considerable amount of concrete cast in the job.

Those structural floors where only a topping is placed, can have virtually any cross section (hollow core, double tee, solid or voided high-depth preslabs, etc.), as long as their superior face is flat or almost flat. There is a number of advantages in placing only a thin topping on the precast elements. Firstly, the precast elements have almost the same depth as the definitive structural floor, thus they are very stiff and do not deflect easily and typically need very little or no shoring. Secondly, the relatively thin topping is not too heavy, so does not deflect too much the already stiff precast element. Finally, the topping, despite being thin is able to effective act as a horizontal diaphragm that properly guarantees a good behaviour of the floor versus seismic forces (typically great horizontal forces). One drawback must be mentioned: toppings cast in situ have typically a considerable shrinkage, due to their shallowness and big surface exposed to the air (low notional size). This often leads to considerable differential shrinkage. Further than all the aforementioned, it must be said that a considerable number of the precast floor elements (but not all of them) used in this sort of structural floors are designed so that when placing the topping in the field, a small amount of concrete enters and completely fills the lateral joints between precast floor elements. For example, hollow core slabs are typically designed to have this lateral joints filled with concrete; while double T slabs do not have this lateral joints designed to be filled with concrete. The main function of the filling of these lateral joints can be understood, by reading the following.

Those structural floors where concrete only is placed in the lateral joints along the sides of the precast elements, can have solid sections or voided sections. All these structural floors have two main advantages. On the one hand, the height of the precast element is the same as the height of the finished structural floor, thus the stiffness of the precast element is very high and shoring is typically unnecessary. On the second hand, the amount of concrete poured in the field is very low, so that its weight is almost neglectable, and it causes nearly no deflection to the precast floor elements. The combination of this two advantages means that this sort of structural floors are the more efficient of all during the construction process, because the deflection caused by the weight of the fresh concrete does not cause an important deflection nor does it "consume" a significant part of the positive moment strength of the precast floor element. However, these floors have two significant drawbacks. On the one hand, the small volume of cast in situ concrete may have a relatively important surface (the superior face) in contact with the atmosphere, and thus a considerable shrinkage, which is especially high for precast elements with a small depth (as the concrete volume is smaller). The transverse shrinkage of the concrete poured in the joint will, per se, open cracks in the contact with the precast element, but additionally, the longitudinal shrinkage will probably lead to differential shrinkage, and favour the breaking of the bonding. On the other hand, the precast floor elements without topping typically work as pinned-pinned (only resist positive moments), and when deflected under service loads, the ends of the precast elements tend to rotate considerably in relation to the linear supports where they bear. This typically causes long and wide cracks parallel to linear supports in the contact of linear supports and the ends of the precast floor elements. This sort of imperfections in the structure, which are normally hidden by finishings, are still not desirable, as such wide and deep cracks are bad for the durability of the structure.

Further than the aforementioned, it is important to highlight the main function of the filling of the lateral joints. This lateral joints have the mission to transfer vertical shear forces from one precast floor element to the precast floor element placed immediately beside it. This is achieved thanks to the shape of the lateral faces of the precast floor elements, which are typically designed to form shear keys when concrete is poured in the joints. This vertical shear keys are mainly achieved in two ways: or the lateral side of the precast element has an upper tab (in the longitudinal direction) protruding transversally from the side, or the lateral side of the precast floor element has a groove (parallel to the longitudinal direction). On the other hand, the filling of concrete also helps solving the imperfection of the joints, as concrete needs certain precasting and placing tolerances, not easily compatible with the avoiding of leakage of the concrete placed in the field. To reduce and try to avoid leaking, the mentioned lateral joints are closed in their lower parts thanks to tabs protruding from the lateral faces of the precast elements. Such tabs typically protrude more from the lateral faces of the precast element, than any other tab or element protruding from those faces. This is to guarantee the proper closing of the joint.

Those structural floors where no concrete at all is placed in the job, on top or at the sides of the precast element are not so usual, but there are some outstanding examples. Among the modern examples, maybe the most important are "pretopped" double tees. This is a sort of double T designed to work without topping, which have a superior slab thicker than usual double T elements designed to be covered by a topping cast in the job. In this category (no concrete at all) one may also mention some patents of the early twentieth century, now considered outdated and not feasible. Several decades ago not so much attention was payed to precasting and erecting necessary tolerances, now considered essential. At that time some inventors considered wrongly that perfect matching of precast elements was easy to achieve. This sort of structural floor construction by simply placing elements side by side is rapid and easy but has a number of drawbacks. Firstly, the transfer of vertical shear forces is not possible, or metallic inserts must be added to guarantee such an important structural feature. For instance, steel teeth or tabs protruding from the lateral faces of the precast elements (this sort of solutions are usual in pretopped double tees).

Secondly, the transfer of horizontal forces (such as seismic forces) is not guaranteed. To solve this problem, the aforementioned protruding metallic inserts (or other equivalent means) must be able to fixely connect a precast element to the one beside it. Achieving this will require some work in the field (welding, screwing, small concrete pouring in pockets, etc.). So the "economies" achieved thanks to not pouring a topping, are in part payed in other sorts of tasks an material consumption in the job. Finally, this sort of floors have the same problem at the end of the precast elements as those where only the lateral joints are filled with concrete: wide and profound cracks appear parallel to the linear support elements.

D) Bonding System

The main mission of a bonding system able to make precast concrete and cast in situ concrete work together is to withstand shear forces parallel to the faces of the precast element (superior face, or lateral faces). To achieve such bonding, five main strategies may be described: 1) Reinforcement passing through the contact surface, say reinforcement embedded in the precast element and coming out of it, intended to be embedded in the cast in situ concrete; 2) Labyrinthine contact perimeter in the transverse cross section of the precast element with the cast in situ concrete 3) Flat contact surfaces between precast concrete and cast in situ concrete are made smooth o rugose; 4) Linear or isolated concrete protrusions coming out of the precast element faces which will be in contact with cast in situ concrete; 5) Grooves or holes on the precast element faces which will be in contact with cast in situ concrete.

Those structural floors where reinforcement is embedded in the precast element and protrudes out of it to embed in the cast in situ concrete are relatively common. This strategy is very usual in preslabs (or predalles). One example can be seen in the patent JILONG, JUNWEI, WANYUN (CN104032870) and in some embodiments of patents QIU ZEYOU (CN1975058) and QIU ZEYOU (CN1944889). In fact one can also find it in precast elements of other cross sections, such as in the patent BORI, FABRA (ES2130037). However, this solution—protuding steel—is unusual in most conventional floor elements such as hollow core slabs or double tees. This solution, which a priori may seem the more straightforward, has three main drawbacks. Firstly, steel is expensive per se (both the material and the placing). Secondly, placing protruding steel into precast concrete is often difficult, because protruding reinforcement cannot exist in faces in contact with a former or near to mobile parts of casting machines. Finally, embedded reinforcement will typically complicate compaction of precast concrete, which is why elements made of dry concrete (such as hollow core slabs) have very rarely protruding reinforcement elements.

Those structural floors with a labyrinthine contact perimeter in the transverse cross section are not too usual, but have been tested in a number of real buildings. The most outstanding example are hollow core slabs where some alveoli are open in the upper face. These openings are used to place negative reinforcement within at the job, and then pour concrete, which typically fills the open alveoli. This solution, which is even accepted in some national codes, is unusual in the practice due to four main disadvantages; 1) Opening the upper part of the alveoli of the slabs requires an additional work during the precasting process, which requires human workforce and leads to waste the removed concrete, or requires an investment in specific machinery able to do the openings and recover the removed concrete. 2) Openings are typically not made along all the hollow core length, but typically ⅔ of the length of each slab, which complicates precasting and makes it more costly to solve local defects on the slab occurred during the casting process (as bigger lengths of precast element must be rejected and wasted, when compared to very short rejected parts necessary when the cross section is totally uniform). 3) Eliminating a part of the upper flange of the slabs (to open the alveoli) reduces considerably the moment of inertia of the slab, and makes it more flexible and less efficient during the erection process, leading often to the need of shoring during the erection. 4) Around ⅔ of the length of open alveoli are filled with concrete cast in the job. As a result, the slab reduces considerably its lightness and becomes less efficient. As a whole, this solution is somewhat similar to voided preslabs.

Those structural floors where mainly flat contact surfaces are smooth or rugose, have the advantage that are very easy to cast. That is why most common use precast structural floor have this sort of surface. However, this has an important drawback: while a certain bonding often exists in the first weeks, months or years after the structural floor is finished, this bonding typically breaks completely as time passes, differential shrinkage occurs, and the structure has to go through the cyclic loading and unloading due to the normal use of any structure. This issue is one of the reasons why there is a certain trend in the last decades in trying to eliminate the topping in this sort of structural floors. As bonding breaks the topping is no more a part of the main structural section, and its contribution to structural strength versus flexure moments becomes neglectable. In the end it becomes mainly a dead load on the structure, with the sole function to act as a horizontal diaphragm in the case of earthquake.

Those structural floors where isolated or linear protrusions come out of the faces of the precast elements are very usual, but some outstanding examples exist. On the one hand there is a considerable variety of precast elements that include protrusions only in their lateral faces. Most of these solutions are thought to make the structural floors able to resist seismic forces. This is nowadays a usual solution in the practice for hollow core floors that do not have a topping and need to be seismic resistant. An example is CUYVERS (BE858167). Protrusions on the upper face of floor elements are more unusual, but a couple of examples are MING, WEIJIAN, ZHEZHE (CN102839773) and MING, WEIJIAN, YANTING, PEINAN (CN104727475). This sort of solution, in general, is a good solution to transfer shear forces, as long as this forces do not overcome the shear strength of the unreinforced concrete in the weakest sections. Among its advantages is the fact that no steel is needed to guarantee the connection of the two concretes (precast and cast in situ), which makes the fabrication of these bonding system easier and cheaper. One of its main drawbacks is that unreinforced concrete fails fragilely under shear forces, and shear strength of unreinforced concrete is not easy to predict (shear strength results of a same concrete typically show quite disperse statistical distributions, because shear strength depends on tension strength which is based in part on aleatory factors, such as aggregate distribution, cracking geometry due to shrinkage or tension forces, etc). As a consequence, a solution based on unreinforced concrete working under a shear force must be designed with a big security coefficient, much bigger than reinforced concrete under the same shear force. For example, a security coefficient of 2.0 (or even 2.5) for the material (or sort of ULS) and of 1.4 for the loads. Thus a global security coefficient of 2.8 (or even 3.5). That is one of the reasons why not all sorts and shapes of protrusions are appropriate. Some important details must be taken into account in their design:

i) Protrusions must be easy to precast in series, preferably by a machine, and must be easy to unmould (the mould or form must be easy to remove): sides of the protrusion should preferably not be at right angles, and edges should not exist in the direction parallel to the demoulding direction. For example both MING, WEI-JIAN, ZHEZHE (CN102839773) and MING, WEI-JIAN, YANTING, PEINAN (CN104727475) have inappropriate shapes for an easy demoulding. Especially inappropriate are some of the protrusion designs of CN102839773.

ii) Protrusions should have a minimum cross section (say at least 1.5 times the size of the biggest aggregate diameter) in order to guarantee the proper compaction of the concrete of the protrusion. Moreover the cross section must be such that it does not become a weak point. Its sizing shall be studied (and tested) in relation with the shear forces it will have to withstand, taking into account an especially big security coefficient (as explained above). For example, in patent MING, WEI-JIAN, ZHEZHE (CN102839773), protrusions look very small, or disproportionate in relation to the flat surface of the precast element. So, under shear forces the protrusions in the precast floor element will break clearly before the cast in situ concrete breaks.

iii) Distance between protrusions must be such that concrete poured in the job can be properly compacted and that minim cross sections are sufficient to withstand the shear forces that will act, with a sufficiently big security coefficient. Normally the distance between protrusions should be bigger than the cross section of the protrusions, as concrete poured in the job is typically weaker, so it will need bigger cross sections to achieve the same strength as the protrusions.

iv) Protrusions should have faces as perpendicular as possible to the shear force they have to withstand, in order to resist it properly and avoid or minimize the possible parasite forces non parallel to the original shear force, that would ease the breaking of the bonding. If perfect perpendicularity of the shear force and the protrusion's face is impossible, and some parasite forces appear, design must be such that the parasite forces do not break the bonding or some weak part of the precast element or of the cast in situ concrete. An example of unsuitable design of the protrusions is the patent CUYVERS (BE858167). Considering a shear force parallel to the longitudinal direction of the element, as the faces of the protrusions are not perpendicular to the shear force, they will tend to expulse upward the cast in situ concrete and break the bond.

v) Linear protrusions must be preferred to isolated protrusions for four reasons. 1) Linear protrusions will typically have bigger cross sections (bigger strength) 2) Isolated protrusions may be more difficult to unmould, as will normally have more edges. 3) In the case that floor elements are supported on main beams at their ends (which is very common), the deflection of main beams causes a horizontal shear force in the transverse direction (parallel to beams' span) in the contact surface of the precast concrete of the floor elements and the cast in situ concrete of the topping which only sums up to the horizontal shear force in the longitudinal direction (parallel to floor elements' span) in the case that exist surfaces opposing to the shear force caused by the deflection of beams. This sort of opposing surfaces only exist in the case of isolated protrusions. As a consequence, isolated protrusions not only are more vulnerable (as inferred from 1) but also have to withstand an additional force, which linear protrusions do not have to. 4) Isolated protrusions designed to be completely embedded in the cast in situ concrete (especially in the superior topping) will tend to slip in a way similar to flat smooth or rugose surfaces do. This is due to differential shrinkage and in particular to differential shrinkage in the direction parallel to the width of the precast element (transverse direction). This effect tends to cause a deflection of the cast in situ topping slab, that up-lifts it and weakens the bonding.

vi) In general the smaller the contact face is between the precast element and the cast in situ concrete, and the bigger the shear strength is. Thus, the bigger and stronger must the protrusions be.

Those structural floors where holes or grooves are made on the faces of the precast elements are quite rare in the conventional practice, but some examples can be found in patents. On the one hand one can find cases where holes or short grooves are placed only in the lateral faces of the precast elements. The intention is often the same as in solutions with protrusions: making the structures able to withstand seismic forces. Some examples (not all intended to withstand seismic forces) are MICHEL DE TRETAIGNE (FR2924451), LEGERAI (FR2625240) and BORI, FABRA (ES2130037). Even more rare are the solutions with holes or grooves in the upper face, but some examples are PRENSOLAND, S. A. (ES2368048), QIU ZEYOU (CN1975058), QIU ZEYOU (CN1944889) and QU, YUAN, ZHOU, LI, WEI (CN201924490). PRENSOLAND, S. A. (ES2368048) includes holes in the upper face and in the lateral faces; and the three next examples include transverse grooves all over the surface of the element, always cut by a central rib (or stem). The advantages and drawbacks of this bonding solution (holes or grooves) are very similar to that of protrusions. However, one of the main differences is that one has to take care in not weakening the faces of the precast elements where the holes or grooves are made. By reviewing the list of important details that one has to consider when designing protrusions, we will review next which of the aforementioned examples have issues in some or several of the details to take into account:

i) Easy to unmould. The next patents include precast element difficult de unmould QIU ZEYOU (CN1975058), QIU ZEYOU (CN1944889) and QU, YUAN, ZHOU, LI, WEI (CN201924490). All these patents have holes passing through a central web, in QU, YUAN, ZHOU, LI, WEI (CN201924490) the hole goes even through two webs in some embodiments. This holes, combined to the complex geometry of the hole elements, will give for sure complex unmoulding processes. Moreover, in QIU ZEYOU (CN1975058) and QIU ZEYOU (CN1944889) some of the embodiments include grooves almost virtually impossible to unmould without breaking the precast element or deforming (or collapsing) the mould in some way.

ii) Minimum cross section and depth of grooves, to enable proper compaction, and to ensure proper strength (by testing), guaranteeing with an appropriately big security coefficient when dividing strength/force. In the patents BORI, FABRA (ES2130037) and PRENSOLAND, S. A. (ES2368048) the holes on the faces look very shallow in the drawings (no depth is specified). An insufficient depth (inferior to the aggregate diameter)

will lead to an easy slipping of the whole cast in situ concrete on the contact surface. An insufficient depth is virtually equivalent to a rugose surface, where cast in situ concrete does not effectively push on a surface perpendicular to the shear strength. None of the aforementioned patents includes tests results guaranteeing a proper relation (say bigger than 2.5) of the unfactored strength of the joint to the unfactored shear stress acting upon the joint. Indeed, only a reduced number of the patents does mention that the grooves or are intended to withstand a shear force.

iii) Distance between grooves or holes. In the patent LEGERAI (FR2625240) the holes look very near to each other to withstand horizontal shear forces. In deed in this patent there is no mention to horizontal shear forces. The design is more focused in resisting vertical shear forces.

iv) Faces perpendicular to shear force. The patents BORI, FABRA (ES2130037) and LEGERAI (FR2625240) lack of this essential feature. In the event of a horizontal shear force, in both cases, the rounded shape of the holes, would tend to easily expulse the cast in situ concrete out of the hole, and thus break the bond.

v) Continuous grooves preferred to holes. The patent BORI, FABRA (ES2130037) and some of the embodiments of patent QIU ZEYOU (CN1975058) use holes instead of grooves. This obviously reduces the shear strength of the joint, particularly in the drawings in QIU ZEYOU (CN1975058) the number of holes is very small. Moreover, the way in which this embodiments of the patent seem to include holes with reinforcement coming out of the hole and armature passing through the hole seem particularly not suited to be molded and unmolded. Further than that, the patent BORI, FABRA (ES2130037) and several embodiments of the patent QIU ZEYOU (CN1944889) are particularly not compatible with differential shrinkage in the transverse direction, and favour the deflection or lifting of the topping cast in situ in the transverse direction, an thus the break of the bonding. On top of all that, patents QIU ZEYOU (CN1975058), QIU ZEYOU (CN1944889) and QU, YUAN, ZHOU, LI, WEI (CN201924490) have one common drawback due to the fact that the cast in situ concrete is divided into portions due to the central ribs (or stems) that "cut" the preslabs into two or three parts. These longitudinal precast ribs will easily favour long and wide cracks all along their both sides, in the contact with cast in situ concrete vi) The smaller the contact face between the precast element and the precast floor, the bigger the groove (or the holes) must be. An example of unsuitable design is that of the patent BORI, FABRA (ES2130037). The design described in this patent might take advantage of big surface of contact between precast concrete and cast in situ concrete (as concrete is cast both to form a topping and to fill the lateral joints), but most of the surface is smooth and only dull and shallow holes are made in the side faces. This clearly seems an insufficient improvement in the bonding when compared to totally smooth surfaces. It has to be said that BORI, FABRA (ES2130037) includes reinforcement protruding from the sides, so that bonding will mostly be achieved thanks to the reinforcement, rather than thanks to the concretes' contact surface shape alone. In patents MICHEL DE TRETAIGNE (FR2924451) and LEGERAI (FR2625240) the size of the grooves or holes is only medium. The small contact surface of the lateral sides and such partial grooves or holes will only resist reduced shear loads and/or loads almost uniformly distributed along the whole joint. This is the case of shear forces due to seismic forces. This is reasoned next:

vii) When the seismic shake is parallel to the precast floor elements, those are able to properly transmit the horizontal force, by taking axial forces well uniformly thanks to the longitudinal support elements (beams or walls) placed transversally to floor elements. Under these conditions, a proper bonding of precast and the cast in situ concretes is unnecessary. When the seismic shake is transverse to the long dimension of the precast floor elements, these elements tend to have two possible behaviors: a) experience horizontal deflection (one lateral face tends to shorten while the opposite one tends to lengthen); or b) the whole plate of parallel slabs tends to behave under a tie and strut regime, so that some of the slabs tend to be fully under a longitudinal tension and some fully under a longitudinal compression; but all of the floor elements are under a transverse compression. Under this conditions the proper bonding of cast in situ concrete and precast concrete is relevant, in order to get the whole floor to work as a diaphragm. However, as surprising it may seem, neither the behavior a) nor the behavior b) lead to important shear forces in the contact surfaces. This is due to two facts: 1) shear forces are very small, as the floor elements are extremely stiff in the horizontal direction, and small horizontal deflections (or elongations) lead to small stresses; 2) shear forces on lateral faces often are quite uniform and can distribute along all the contact surface. This small shear forces can perfectly be withstanded by grooves as the ones in MICHEL DE TRETAIGNE (FR2924451); or the small undulations very often placed in the laterals of hollow core slabs in common practice to make them seismic resistant when those are used in structural floors where no topping is poured.

E) Effective Negative Reinforcement

The main mission of an effective negative moment reinforcement is to make the finished floor able to withstand such negative moments, which typically cause tension in the upper face of the structural floor and compression in the bottom face. Most of the most usual structural floors made out of precast floor elements and cast in situ reinforced concrete are floors only able to withstand positive moments. This is due to the fact that all modern precast floor elements are designed to resist positive moments, by means of including longitudinal reinforcement (which may be passive or prestressed). However, achieving this floor structures to properly resist negative moments is more difficult than it seems for two reasons. On the one hand, negative reinforcement (placed near the upper face of the structural floor) can only be embedded in cast in situ concrete. Thus a certain amount of cast in situ concrete is necessary. On the other hand, proper bonding between precast concrete and cast in situ concrete is essential for the negative reinforcement (under tension) to work together with the bottom face of the precast floor element (under compression) and resist the negative moment. Currently three main situations can be found in the existing technology: 1) Effective negative reinforcement is embedded in cast in situ concrete which is properly bonded to precast concrete; 2) Only crack control reinforcement is embedded in cast in situ concrete; 3) No reinforcement at all is placed.

Those structural floors where effective negative reinforcement is embeddded are usual, but are limited to only two sorts of structural elements: preslabs (or predalles) [much more usual] and hollow core slabs with superiorly open alveoli [unusual]. In preslabs there usually is plenty of place to embed negative reinforcement and there typically is reinforcement embedded in the precast element protruding from its superior face to properly guarantee the bonding with cast in situ concrete. Hollow core slabs with superiorly open alveoli have limited space to place reinforcement, so it has to be carefully placed to guarantee a proper wrapping with concrete cast in the job. Thanks to having negative reinforcement, preslabs (or predalles) and hollow core slabs with superiorly open alveoli are particularly efficient and can reduce their depth when compared to structural floors without negative reinforcement. However, as mentioned previously conventional preslabs (or predalles) get typically expensive due to the need of reinforcement to guarantee the bonding and due to their heavy and inefficient solid section or to their expensive embedded permanent forms (in the case of voided preslabs). Hollow core slabs with superiorly open alveoli are also expensive due to their very specific precasting process. So this two sorts of structural floors are typically thinner (structurally more efficient) but not necessarily less expensive than only positive-moment-resistant floors made with voided section floor elements, such as conventional hollow core slabs or double tees.

There is a considerable number of currently usual structural floors where negative moments are not intended to be resisted, and reinforcement is placed only to control the width of the cracks that typically appear at the end of precast floor elements, parallel to linear supporting elements—beams or walls. This solution (reinforcing to control cracking) is adopted is those cases where the structural system is not able to guarantee a proper bonding between precast concrete elements and cast in situ concrete, but there is still some place to embed the reinforcement. This is the case of all conventional floors made of voided section precast elements, where typically only small amounts of concrete are poured in the job. Be it mainly to form a topping or only to fill the lateral joints. This virtually occurs in all hollow core floors (with or without topping), all double tee floors with topping and a number of the most common structural floors.

For example, in the patent by CHAO, ZHAOXIN, GUOPENG, JIANFENG (CN203347077), the reinforcement embedded in the topping is aimed at controlling the crack width.

There are cases where no reinforcement is placed, as there is no cast in situ concrete where to embed such a reinforcement to control cracking. This is the case of structural floors made with "pretopped" double tees, which have not topping cast in the job.

As a summary, nowadays when erecting a structural floor made with precast floor elements and reinforced concrete cast in the job, one has to choose between the two following solutions:

a) Either a more inefficient structural floor (with a bigger depth) only able to resist positive moments; but relatively cheap and rapid to erect (typically does not need shoring). In this case hollow core floors (with or without topping), double tee floors (with or without topping), and other similar voided section floors may be included.

b) Or a more efficient structural floor (with a shallower depth) thanks to its ability to resist both positive and negative moments; but hardly cheaper than the former and often slower to erect (typically does need shoring). This case includes all preslabs (also called predalles) and hollow core slabs with superiorly open alveoli. Solid but thin preslabs always need propping as they are not stiff enough to withstand the weight of fresh concrete poured in the job. Those solid but thick are expensive, as precast concrete is typically richer in cement and additives. Those with a voided section, are typically expensive, due to expensive embedded permanent formers and also very often need shoring in the job. All most common preslabs include protruding reinforcement, which make them all expensive. Some recent Chinese patents for preslabs (like the ones mentioned above) do not include such expensive reinforcements, but include complex geometries, that may not be too cheap to precast either, as special forms or complex unmoulding procedures may be needed. Hollow core slabs with superiorly open alveoli will usually need shoring in the job, and are expensive to precast due to their specific geometry.

Thus, nowadays one has to choose: or an easy-to-build but structurally less efficient solution (hollow core slabs, double T slabs, etc.); or a labour-costly and slower-to-build but structurally more efficient solution (preslabs, hollow core slabs with superiorly open alveoli)

DESCRIPTION OF THE INVENTION

For overcoming the mentioned drawbacks of the existing solutions, the present invention proposes a prefabricated floor element having an elongated shape wherein a longitudinal direction, a transversal direction, a height direction, two end faces which delimitate the element in the longitudinal direction, two lateral faces which delimitate the element in the transversal direction, a lower face and an upper planar face that delimitate the element in the height direction are defined, which comprises transversal continuous upper grooves on the upper planar face.

This prefabricated floor element is destined to be supported at its ends on two respective linear supporting elements, like walls or beams arranged in the transversal direction. Specifically, this element allows, by arranging an armature placed on the upper planar face and extended beyond the end faces and pouring a layer of concrete (also called topping) in which said armature is embedded, to transmit tension forces having the longitudinal direction, due to negative flexure moments, thanks to the continuous upper grooves on the floor element, while allowing to avoid the effects of differential shrinkage of the two concretes (that of the prefabricated floor element and that of the layer of concrete). These tension forces in the upper armatures, in combination with the compression forces on end faces of the floor element allow to transmit negative moments through said end faces, these moments being around the Y direction (or axis).

In some embodiments the upper grooves are present only on two end portions, each covering ⅓ of the length of the entire upper face, such that the central portion is devoid of grooves. In this way the grooves are only in the places where they are useful, leaving the floor element unchanged (and unweakened) at the central portion.

In some embodiments the prefabricated floor element has a lower tab on a lower edge of the lateral faces. The aim of this lower tab is to prevent the cast in situ concrete to leak between two floor elements, as a cast in situ rib forms when those are put side by side, parallel to the longitudinal direction.

In some embodiments the prefabricated floor element comprises an upper tab on an upper edge of the lateral faces, the lower tab being longer than the upper tab in the transversal direction. When a cast in situ concrete rib is formed between each two floor elements, the aim of the upper tab is to allow the cast in situ rib to transfer vertical shear forces. In this embodiments, the proper transfer of vertical shear forces, the upper tab works together with the lower tab from one precast floor element to the adjacent one.

In some embodiments, instead of an upper tab, a groove exists on lateral faces, which enables the cast in situ rib to transfer vertical shear forces.

In some embodiments the prefabricated floor element comprises vertical lateral grooves on the lateral faces. Like the upper grooves, these lateral grooves allow to transmit longitudinal forces between concrete poured in the cavity and an armature embedded therein.

In some embodiments the prefabricated floor elements has a light or voided cross section, such as that of a hollow core slab.

In some embodiments the prefabricated floor element is a double-T floor element, such that an upper planar plate and two vertical stems extending downwardly from the upper planar plate are defined.

The fact that double T slabs are provided with upper continuous transversal grooves has two main advantages, just as in other light floor elements (with low dimensionless thickness). On the one hand, the transversal grooves on the upper face enable the possibility to transfer forces in the longitudinal direction form the prefabricated slab to the armature by the means of the concrete of the topping. This ultimately enables the floor made with prefabricated slabs to be fixed (=negative moment-resistant) at one or both of its ends. On the other hand, the fact that the grooves are able to prevent the effects of differential shrinkage; which is particularly high in precast elements with a low dimensionless thickness (under 0.6). The effects of shrinkage in the longitudinal direction are blocked thanks to grooves of the proper depth and with faces perpendicular to longitudinal shear forces; so that differential shrinkage in this direction will only add to other flexure forces, acting as a positive or negative moment, depending on the fixity on the topping slab at its ends. Transversal differential shrinkage has no effect on the slabs, thanks to the fact that grooves are continuous, so that there is no edge or face parallel to longitudinal direction. Such edges and faces, parallel to the longitudinal direction tend to prevent a proper transverse shrinkage of the cast in situ topping, leading to a slight upward deflection of the topping, which leads to the detaching of the topping from the slab. Such a behavior is incompatible with the transmission of longitudinal forces, essential to this invention. That is why, upper grooves must be continuous, and neither edges nor faces parallel to the longitudinal direction should cut the upper grooves.

The two advantages aforementioned are common to double T slabs and other light slabs, such as hollow core slabs, however there is an additional advantage for double T slabs (and inverted-U slabs—similar to T slabs in cross section): making negative-moment-resistant floors leads to a considerable reduction of the height of the precast element (−30%). Double T slabs, and inverted-U slabs are typically elements with big heights (from 40 cm to 80 cm), and such reduction in the depth is very useful, as it enables this sort of elements to be used in a wider range of buildings, where heights of floors must be smaller. Currently, due to their considerable height, double T slabs are mainly used in parking buildings, warehouses and sports pavilions. However, a reduction of a −30% in their typical depths, would considerably increase the applicability of this sort of structural slabs.

The invention also relates to a prefabricated floor element having an elongated shape wherein a longitudinal direction, a transversal direction, a height direction, two end faces which delimitate the element in the longitudinal direction, two lateral faces which delimitate the element in the transversal direction, a lower face and an upper planar face that delimitate the element in the height direction are defined, which a lower tab on a lower edge of the lateral faces, which comprises vertical grooves on the lateral faces, the lateral grooves extending from the lower tab to the upper planar face.

This prefabricated floor element is destined to be arranged side by side to another floor element, along the longitudinal direction, and then both supported at their ends on two linear supporting elements, like walls or beams arranged in the transversal direction. Specifically, these elements allow, by arranging an armature in the upper part of the shear key formed by pouring concrete in the volume delimited by the lateral faces and the tabs and extending beyond the end faces, to transmit tension forces having the longitudinal direction thanks to the lateral grooves. These tension forces in the armature, in combination with the compression forces acting upon the lower part of the end faces of the prefabricated floor element allow to transmit negative flexure moments, these moments being around the Y direction.

In a preferred embodiment the vertical grooves on the lateral faces are present only on two end portions, each end portion covering ⅓ of the entire length of the lateral face, such that the central portion is devoid of grooves. In this way the grooves are only in the places where they are useful, leaving the floor element unchanged (and unweakened) at the central portion.

In some embodiments the lateral grooves have a minimum depth and width of 1 time and 1.5 times, respectively, the diameter of the biggest aggregate of the concrete poured in the job.

In some embodiments the upper grooves have a minimum depth and width of 1 time and 1.5 times, respectively, the diameter of the biggest aggregate of the concrete poured in the job.

This minimum size is aimed to effectively prevent the slipping of the concrete cast in the job from its place on the prefabricated element. This is achieved on the one hand by ensuring the correct filling of the grooves by the poured concrete; and on the other hand by ensuring that the shear forces act upon the aggregate that enters the grooves, and not only on the cement wrapping the aggregate; thus avoiding that the aggregate detaches from the cement. Typical diameter of biggest aggregate of cast in situ concrete ranges from 10 mm to 20 mm, but most often 20 mm. In accordance, the depth and width must be at least of 20 mm and 30 mm, respectively.

In some preferred embodiments the dimensionless thickness of the floor element cross section is below 0.6.

The dimensionless thickness is obtained from dividing what is known as a notional size (or fictitious thickness) by the real thickness (say height of the floor element). The notional size is a parameter defined by Eurocode EC-2 in the section devoted to shrinkage of concrete elements. The notional size ($h_0$) is equal to twice the shape factor ($A_c/u$) of the cross section. That is, the notional size is equal to $2*A_c/u$, where "$A_c$" is the area of the cross section and "u" is the perimeter of the concrete cross section in contact with the atmosphere. For elements with interior holes, such as hollow core floor elements, this perimeter includes the perimeter of the interior hollow channels.

Then the dimensionless thickness (h') would be defined as $h'=h_0/h$, where h is the real thickness, and $h_0$ is the notional size.

The following table includes several cases studied. The first column corresponds to the name and the width of the prefabricated floor element. The second corresponds to the thickness or height (h). The third corresponds to the dimensionless thickness (h'). And the fourth is for the notional size ($h_0$). In the cases analysed, at the beginning there are two groups of solid slabs, those with a wide of 1.2 m and those with a wide of a wide of 0.6 m. Notice in all cases h' is equal or superior to 0.6. Notice also how the case with the lower dimensionless thickness h' can barely be considered a solid slab, as its 40 cm×60 cm cross section more that of a column or beam than that of a floor element like a slab.

Next are studied two sorts of hollow core slabs, depending on the sort of interior holes. Finally three examples of American double T slabs are studied. All these precast floor elements are light elements, all taken from actual commercial products. Notice that all have dimensionless thickness clearly under 0.6 (the lesser the h' is, the lighter the element is). In these light elements, the influence of modifying the wide of the element is neglectable, that is why, different widths are not displayed in the table.

| Prefabricated floor element | Thickness = Height (cm) (h) | Dimensionless thickness ($h' = h_0/h$) | Notional size (cm) ($h_0 = 2*A_c/u$) |
|---|---|---|---|
| Solid slab (1.2 m wide) | 10 | 0.92 | 9.23 |
| Solid slab (1.2 m wide) | 40 | 0.75 | 30.00 |
| Solid slab (0.6 m wide) | 10 | 0.86 | 8.57 |
| Solid slab (0.6 m wide) | 40 | 0.60 | 24.00 |
| Hollowcore slab (ovoid holes) (1.2 m wide) | 15 | 0.23 | 3.52 |
| Hollowcore slab (ovoid holes) (1.2 m wide) | 40 | 0.15 | 6.14 |
| Hollowcore slab (circular holes) (1.2 m wide) | 10 | 0.41 | 4.14 |
| Hollowcore slab (circular holes) (1.2 m wide) | 40 | 0.17 | 6.65 |
| Double T slab (2.4 m wide) | 32.5 | 0.19 | 6.30 |
| Double T slab (2.4 m wide) | 60 | 0.12 | 7.20 |
| Double T slab (2.4 m wide) | 80 | 0.11 | 9.19 |

Light elements (those with a low dimensionless thickness) have typically a bigger differential shrinkage between the concrete of the floor element and the concrete cast in the job than solid elements. This is because a smaller dimensionless thickness leads always to a bigger shrinkage. So, if the grooves described in the patent are good to properly resist the effects of a bigger differential shrinkage (in light elements), the same grooves will also withstand a lesser differential shrinkage of solid floor elements.

Differential Shrinkage and its Importance in Floors Made with Prefabricated Floor Elements:

Prefabricated floor elements are typically casted some days or some weeks before being placed in the job. After their being placed, some steel reinforcement is arranged on top of the precast elements and finally concrete is poured on the elements. This concrete may be poured only in the cavities between the floor elements, or may be poured all over the floor elements, as a topping. Therefore, the concrete placed in the job is at least a weak younger than the concrete of the precast elements, and it is not unusual that the difference in age is of several weeks. The two concretes are typically very different in their composition. The precast concrete is typically richer, and designed for a very fast hardening, which typically leads to a rapid initial shrinkage; so that after a week a very significant portion of the whole shrinkage of the precast floor element may have occurred. Early shrinkage is bigger in elements with a cross section with a smaller dimensionless thickness, such as all light prefabricated elements: hollow core slabs, double T slabs, inverted-U slabs, etc. When concrete is placed in the job in contact with precast floor elements, a considerable early shrinkage has already happened on the precast elements, so that shrinkage of the precast elements is decelerating. However, fresh concrete just placed in the job, experiences a rapid shrinkage, which is not synchronized with the shrinking rhythm of the precast. This causes what is known as differential shrinkage. This phenomenon tends to cause the slipping of the concrete cast in the job over the precast element. This slipping is initially (under small differential shrinkage) prevented by the adherence between the two concretes, but as differential shrinkage increases (as months pass) it weakens more and more the adherence, and may completely break it. This phenomenon typically leads, after some months or years, to a complete or nearly complete rupture of the connection of precast floor elements and concrete cast in situ (for example of the topping). This leads to two important drawbacks: a) on the one hand concrete placed in the job cannot work together with the precast floor elements; an thus it is pointless to try and put negative reinforcement embedded in the cast in situ concrete; b) concrete cast in the job ends as a dead load on the structure, with little or no structural function.

Trying to control the effects of differential shrinkage only by making efforts to synchronize the shrinkage speeds of the two concretes through a control of the concretes mixtures is extremely risky, as shrinkage is a phenomenon depending on a number of aleatory factors (temperature; humidity; wind; compaction of concrete; etc.) which are very difficult to control in a precasting plant, but even more in a job.

All the drawbacks caused by differential shrinkage are solved by the solution here presented: transverse and continuous grooves, be those placed on the superior surface or on the lateral faces.

The invention also relates to a structure comprising a prefabricated floor element having an elongated shape wherein a longitudinal direction, a transversal direction, a height direction, two end faces which delimitate the element in the longitudinal direction, two lateral faces which delimitate the element in the transversal direction, a lower face and an upper planar face that delimitate the element in the height direction are defined, which comprises transversal continuous upper grooves on the upper planar face, the structure further comprising:

a linear supporting element which supports one end of the prefabricated floor element such that in the linear supporting element a supporting surface is defined and:

a moment resisting system arranged on the linear supporting element and facing an end face of the prefabricated floor element, an upper concrete layer (topping) poured all over of the precast floor element, and armatures arranged along the longitudinal direction, such that a portion of the armatures is embedded in the concrete layer (topping) and another portion of the armatures extends such that they are embedded in the moment resisting system, such that the armatures, when acted under tension forces, can transmit forces to the concrete layer, and the concrete layer can transmit forces to the prefabricated floor element through the upper grooves on the upper planar face, and then a negative moment is transmitted from the moment resisting system to the prefabricated floor element.

This invention enables that structural floors made out of precast floor elements, reinforcement (passive or post-tensioned) placed at the job, and a relatively small amount of concrete—under the shape of a topping—poured at the job, to become up to a 35% more efficient than similar conventional floors, say those were there is no negative reinforcement, or such reinforcement does not come to be effective.

The increase in efficiency is obtained thanks to the fixity obtained when negative reinforcement, which is properly anchored to a moment resisting system, works properly bonded to the cast in situ concrete, and the cast in situ concrete is properly bonded to the precast floor elements.

The proper bonding of reinforcement to concrete cast in situ is easy to get as long as concrete properly wraps reinforcement. The proper bonding of cast in situ concrete and precast concrete is usually broken by the effects of differential shrinkage when contact faces are flat and smooth and do not include protruding reinforcement, but with this invention, this drawbacks are avoided, and proper bond is maintained over time.

The increase in efficiency obtained thanks to properly fixing the ends of a precast floor element can be seen in that, a precast floor element with a certain depth but fixed at two ends deflects much less than the same floor element pinned at both ends. Moreover, floor elements fixed at their ends need much less reinforcement at their bottom face than elements pinned at their ends.

Precast floor elements fixed only at one end can act as a cantilever; which is a totally novel capacity. A precast floor element pinned at one end, and free at the other would collapse, that is why conventional precast floor elements are not suited for cantilevers.

All these achievements are reached without changing the way in which the precaster is used to fabricate, nor the way the structural designer is used to design, nor the way in which the contractor is used to erect the buildings. So this innovation has the additional advantage that it should be easy to accept by all trades involved in the structure design and the structure construction.

In some embodiments the moment resisting system includes an upper extension of the linear supporting element, a cast in situ concrete placed between the upper extension of the linear supporting element and the end face of the precast floor element.

In some embodiments the moment resisting system includes a cast in situ concrete placed on top of the linear supporting element and between the end faces of two prefabricated floor elements arranged facing their end faces.

In some embodiments the armature has a diameter comprised between 10 and 20 mm, and the concrete layer has a height of at least 50 mm.

In some embodiments the cavity defined between the tabs and the lateral faces comprises a post-tensioned element.

The invention further relates to a structure comprising two prefabricated floor elements, each element having an elongated shape wherein a longitudinal direction, a transversal direction, a height direction, two end faces which delimitate the element in the longitudinal direction, two lateral faces which delimitate the element in the transversal direction, a lower face and an upper planar face that delimitate the element in the height direction are defined, which includes a lower tab on a lower edge of the lateral faces, which comprises lateral vertical grooves on the lateral faces, the lateral grooves extending from the lower tab to the upper planar face, which includes either a longitudinal groove at a lateral face or an upper tab on an upper edge, the floor elements being arranged adjacent such that a volume is defined therebetween the volume being filled with concrete such that a shear key is defined, the structure further comprising:

a linear supporting element which supports one end of the prefabricated floor elements such that in the linear supporting element a supporting surface is defined and:

a moment resisting system arranged on the linear supporting element and facing an end face of the prefabricated floor elements, the structure further comprising armatures arranged along the longitudinal direction, such that a portion of the armatures is embedded in the upper portion of the shear key and another portion of the armatures extends such that they are embedded in the moment resisting system, such that the armatures can transmit forces to the shear key, and the shear key can transmit forces to the prefabricated floor element through the lateral vertical grooves on the lateral face, and then a moment is transmitted from the moment resisting part to the prefabricated floor element.

This variant of the invention, where no topping is required is particularly efficient, because suppressing the topping reduces considerably the weight on the structure, and in particular the weight that has to withstand the structure under construction, when the concrete cast in situ has not hardened and prefabricated floor elements behave as elements pinned at their beings.

Floors made in this way are cheaper, lighter and more sustainable than any conventional similar floor (with the ends not fixed to linear supports).

In some embodiments the armature has a diameter comprised between 16 and 25 mm.

In some embodiments the structure comprises armatures placed in the shear key and extending from the upper part to the lower part thereof, such that it allows the concrete shear key to withstand higher vertical shear forces.

When prefabricated floor elements do not have a topping, negative reinforcement is placed at the sides of each floor element, in the relatively narrow cavities filled with concrete between floor elements, which forms a negative-moment-resistant rib. As a consequence most of the surface load applied all over the structural floor is applied directly on the prefabricated floor element, and only a small part is directly applied on the rib (cast in situ shear key). However, the prefabricated floor elements are not directly fixed at their ends, being not negative-moment-resistant. This situation tends to lead the floor elements (intensely loaded) to deflect as a pinned-pinned element, while the cast in situ rib deflects much less, just as a fixed-fixed element does, thanks to the negative-moment reinforcement embedded in the rib. As there is a key able to transmit vertical shear forces (longitudinal groove or tab) on the vertical faces of the precast floor element, the differential deflection between the cast in situ rib and the adjacent precast floor elements is prevented. As a result prefabricated floor elements equal their deflection to that of the cast in situ rib. But this happens thanks to the fact that the floor elements "hang" on the rib. This "hanging" means an important transfer of load form the floor element to the rib, leading this rib to withstand important vertical shear forces. Reinforcement is necessary for the rib not to break under this important vertical shear forces. Thus, if one ads negative reinforcement only in the ribs (as there is no topping to place those negative reinforcements placed all over the precast floor element), shear reinforcement is also required, in order to withstand the considerable vertical shear load transfer from the floor elements to the rib.

In some embodiments the structure comprises at least one duct which extends continuously in the shear key and a post-tensioned tendon inserted within the duct.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as an example of how the invention can be carried out. The drawings comprise the following figures:

FIG. 3 shows a perspective view of the third variant of the prefabricated floor element, combination of the first and second variants of the prefabricated floor element, that is both with upper and lateral grooves.

FIGS. 4 and 5 show, respectively, an elevation view and a plan view of the first variant of a prefabricated floor element.

FIG. 6 shows a perspective view of the second variant of the prefabricated floor element, which only has lateral grooves.

FIG. 7 shows a cross section parallel to transverse direction of a structural floor comprising two adjacent prefabricated floor elements of the second variant, with a shear key formed therebetween.

FIGS. 10A and 11A depict two inappropriate cross sections of a groove.

FIG. 10B depicts another inappropriate cross section of a groove.

FIG. 11B shows the proper shape and size that must have a groove—placed on a lateral face or on an upper face—to function effectively.

FIG. 12 shows the proper shape and size that must have a lateral groove to function properly.

FIG. 16A shows a perspective view of the structural floor, including prefabricated floor elements, armature to resist negative moments and a linear supporting element on top of which a moment resisting system should be, where the armature is embedded.

FIG. 16B shows a flexure moments diagram of a cantilever (all negative moments), that could be achieved with the structural floor depicted in 16A.

FIG. 16C shows a flexure moments diagram of a two span structure, with continuity over the bearing.

FIG. 41 is a vertical section according to the longitudinal direction of an inventive installation used for manufacturing prefabricated floor elements according to the first variant.

FIG. 42 is a vertical section according to the transversal direction of the installation of FIG. 41.

FIG. 43 shows a perspective view of the rolling die used for imprinting the continuous upper grooves.

FIG. 51 is a Table with results of a series of shear tests like the one described in FIG. 49.

FIG. 52 is a plot summarizing the results of a series of shear tests like the one described in FIG. 49.

DESCRIPTION OF A WAY OF CARRYING OUT THE INVENTION

Description of the First Variant of the Invention

Figure 1:
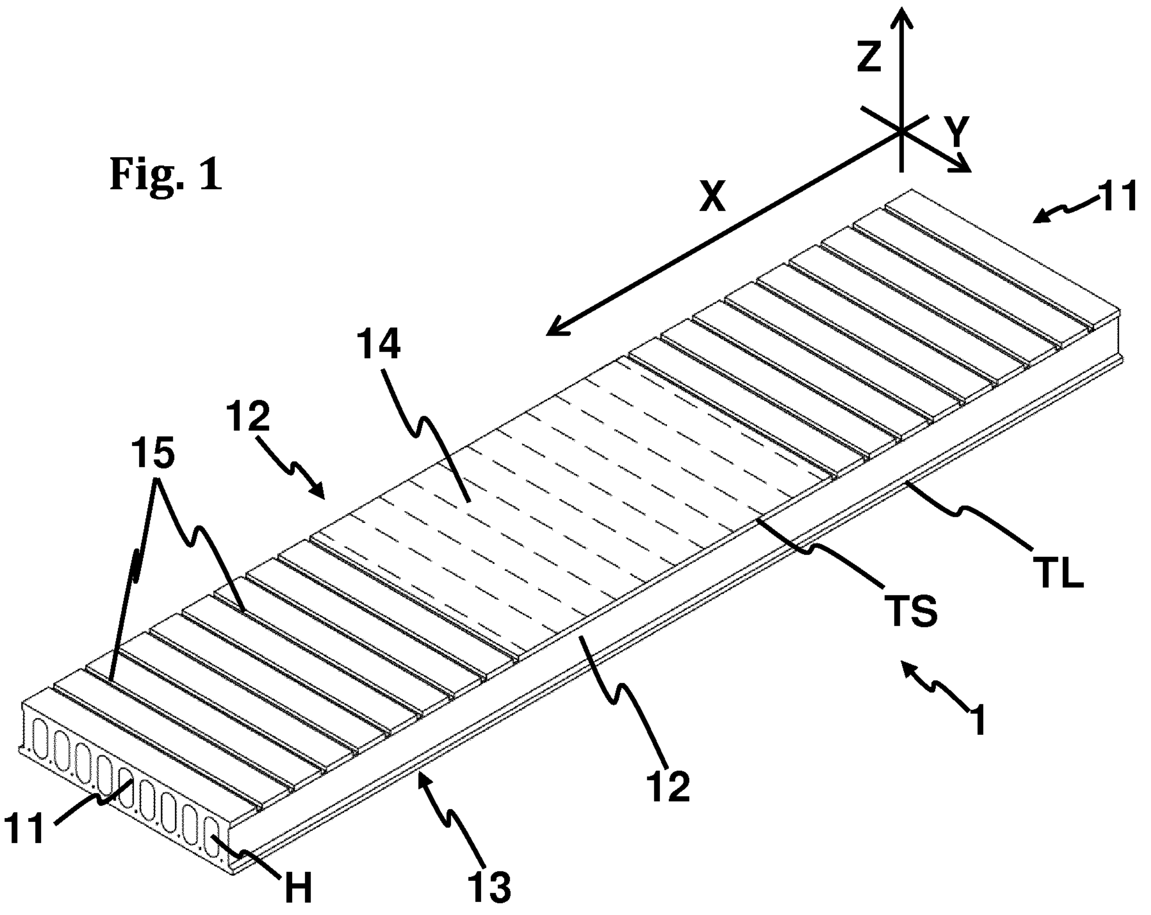
FIG. 1 shows a perspective view of the first variant of the prefabricated floor element, with upper grooves.

As shown for example in FIG. 1, according to a first variant, a prefabricated floor element is shown. This prefabricated floor element 1 has generally an elongated shape such that a longitudinal direction X, a transversal direction Y and a height direction Z are defined.

Throughout the following description, these directions will always be used with the same meaning.

By ‘elongated’ it is meant that the length (dimension in the X direction) will be generally longer than the dimension in the transversal direction, i.e. the width, which in turn will be longer than the height (dimension in the Z direction). The height may also be referred to as depth, and in the context of shrinkage study, also as thickness.

Also two end faces 11 which delimitate the element 1 in the longitudinal direction X, two lateral faces 12 which delimitate the element 1 in the transversal direction Y, a lower face 13 and an upper planar face 14 that delimitate the element 1 in the height direction Z are defined.

FIGS. 4 and 5 show, respectively, an elevation view and a plan view of a particular embodiment of the first variant 1 of the prefabricated floor element, comprising transversal continuous grooves 15 on the upper planar face, but where the grooves are only present on two end portions, each covering ⅓ of the entire length, such that the central portion is devoid of grooves. In this way the grooves are only in the places where they are useful, leaving the floor element unchanged and unweakened at the central portion. Having grooves only at the two end portions of the element is typically enough in most slabs, as at the ends of precast slabs where is placed negative reinforcement, and is there where is more intense the horizontal shear in the contact faces of precast concrete and cast in situ concrete.

An embodiment of this first variant where all the face 14 is covered with grooves 15 is advantageous, not for structural reasons, but for production reasons. It makes serial production more efficient as it allows an easy removing of the short segments of defective slab that occasionally appear during the casting process on the casting bed. The variant with grooves only at the ends may demand to reject bigger parts of the precast slab on the casting bed.

The prefabricated floor element 1 also comprises an upper tab TS on an upper edge of the lateral faces 12 the lower tab TL being longer than the upper tab TS in the transversal direction Y.

This element is advantageous when used in a structure as shown in FIGS. 16A, 17, 18, 19, 20, and 27A to 32. The optimum performance of the structure will be explained below with reference to FIGS. 36, 38, 39 and 40.

FIG. 16A shows a perspective view of the structural floor, including prefabricated floor elements 1 according to the first variant, with upper continuous grooves 15, an armature AS to resist negative moments an a linear supporting element LS on top of which a moment resistant MS system should be placed. The armature AS is embedded in a top concrete layer, which is not shown in this drawing. Within the topping, the armature AS will typically placed as high as possible, as long as the appropriate cover criteria are respected.

Figure 2:
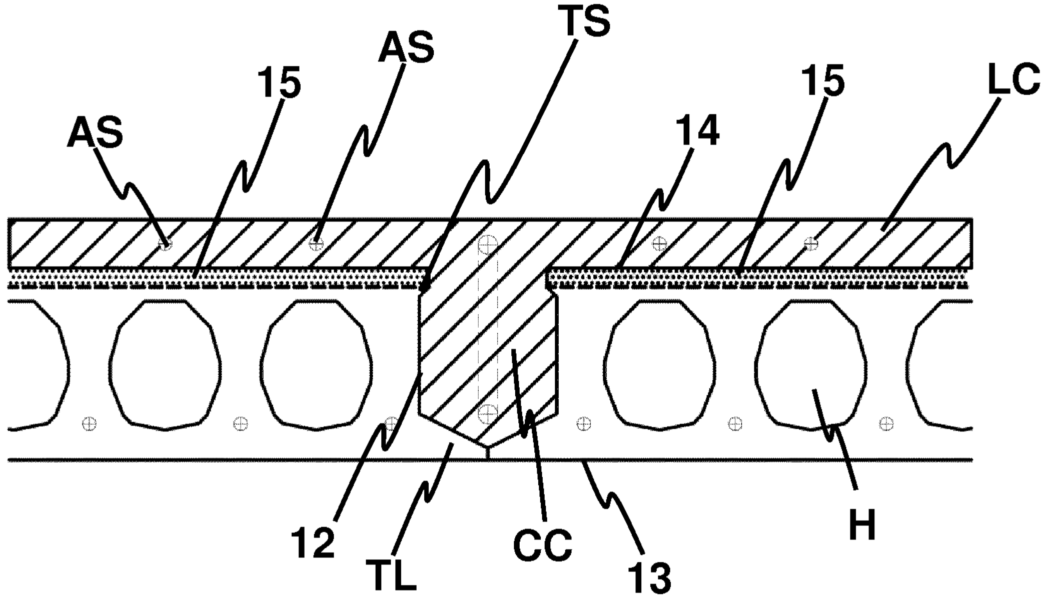
FIG. 2 shows a cross section parallel to transverse direction of a structural floor comprising two adjacent prefabricated floor elements of the first variant, with a shear key formed therebetween.

FIG. 2 shows a cross section parallel to transverse direction Y of a structural floor comprising two prefabricated floor elements 1 according to the first variant, which in turn comprise transversal continuous grooves 15 on the upper planar face 14, and displaying the main elements of the structural floor.

This arrangement gives rise to the moments as depicted in the following FIGS. 16B and 16C.

Specifically, FIG. 16B shows a flexure moments diagram of a cantilever (all negative moments), that could be achieved with the structural floor depicted in 16A. Said in other words, the end not shown in 16A of the prefabricated elements 1 can be either supported on another linear supporting element or not supported (cantilevered).

FIG. 16C shows a flexure moments diagram of a two span structure, with continuity over the central bearing and pinned unions on the two other bearings. This moments diagram could be properly resisted by a structural floor as the one depicted in 16A (if prefabricated floor elements were placed symmetrically at the other side of the linear supporting element LS. In particular, FIG. 16C clearly shows that the negative moment is raised at the linear supporting level, which in turn decreases the positive moment at midspan, thus allowing the system to withstand more loads.

Figure 17:
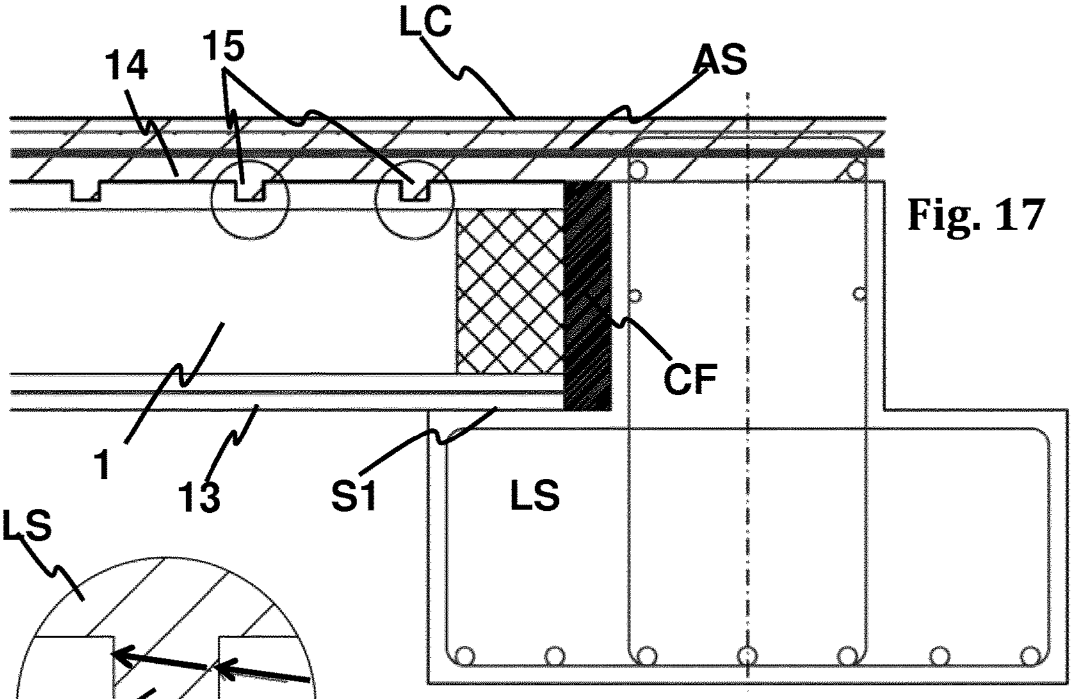
FIG. 17 shows a vertical section parallel to a prefabricated floor element in a structural floor, including also an armature embedded in the cast in situ topping.

FIG. 17 shows a section of a prefabricated floor element 1 placed in a structural floor, which includes also an armature AS embedded in the cast in situ topping LC. The floor element 1 is supported on surface S1 of the linear supporting element LS.

Figure 19:
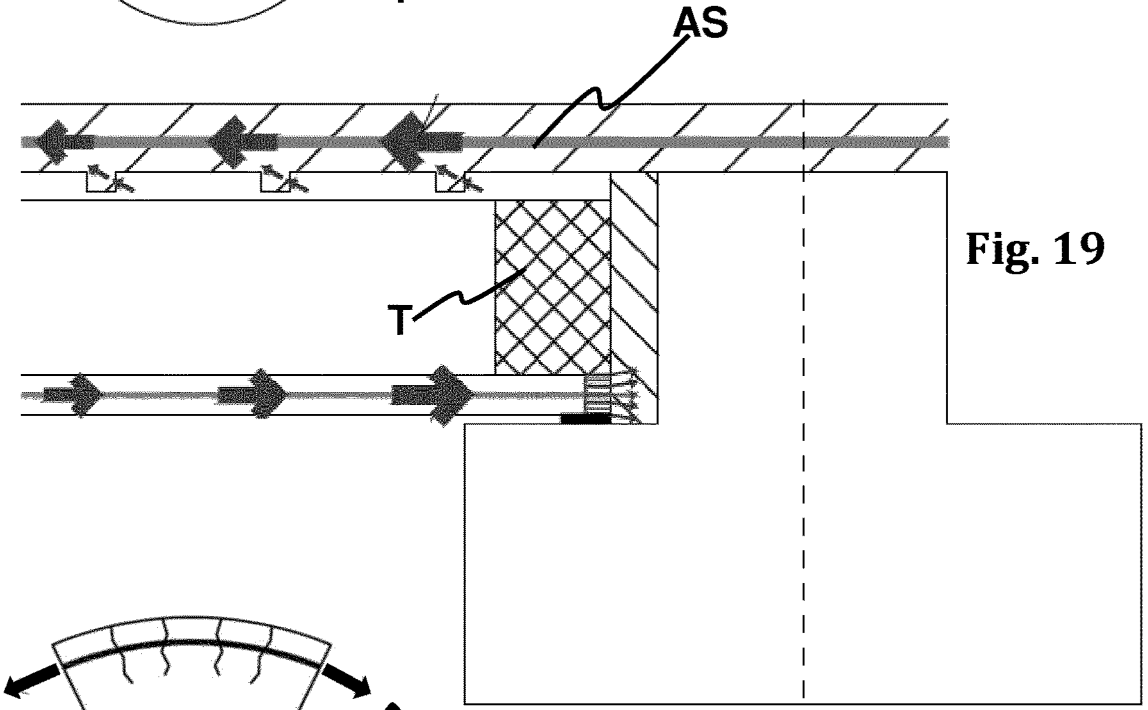
FIG. 19 is similar to FIG. 17, but including the forces.

FIG. 19 is similar to FIG. 17, but including the stresses. The lower part of the floor element 1 compresses the concrete filling CF, while the upper portion of the floor element 1 acts upon the topping LS dragging it, thanks to the effect of grooves 15, and causing tension on the armature AS, represented by the left oriented arrows.

Figure 18:
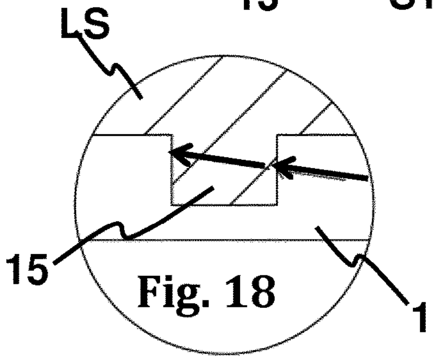
FIG. 18 shows a detail of FIG. 17, where can be seen how compression forces transfer from the floor element to the cast in situ topping when a negative moment acts, rotating the floor element counter-clockwise.
Figure 20:
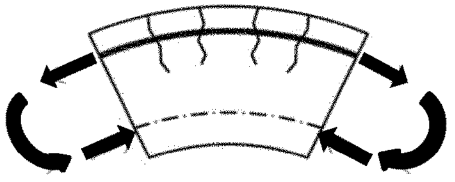
FIG. 20 is a typical scheme of the behaviour of a reinforced concrete element, under a negative moment.

FIG. 18 shows a detail of FIG. 17, where it can be seen how compression forces are transferred from the floor element 1 to the cast in situ topping LS when a negative moment acts. FIG. 20 is a typical scheme of the behaviour of a reinforced concrete element, under a negative moment.

In FIGS. 27A to 32 are depicted several conventional variants of a moment resistant system MS wherein the negative reinforcement AS is embedded in order to guarantee the proper fixity to of the precast floor elements 1, 3 at their bearing.

Figure 27A:
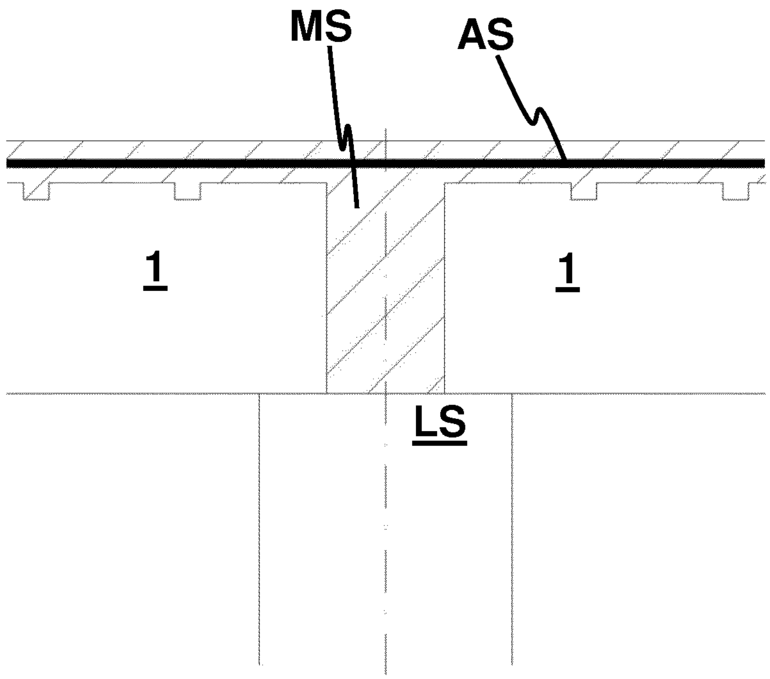
FIG. 27A shows a vertical section according to a longitudinal direction of a floor, in an arrangement where the moment resistant system is concrete poured between two facing prefabricated floor elements; with reinforcement properly anchored to both floor elements.

FIG. 27A shows two floor elements 1 supported on a linear supporting element LS such as a wall, each of the floor elements 1, in combination with the topping LC and the concrete filling placed in between of both floor elements, acts as a moment resisting system MS of the other floor element 1. That is why, fixity is achieved by the fact that negative reinforcement AS is embedded in the topping LC at both sides of the axis of the linear supporting element LS.

Figure 27B:
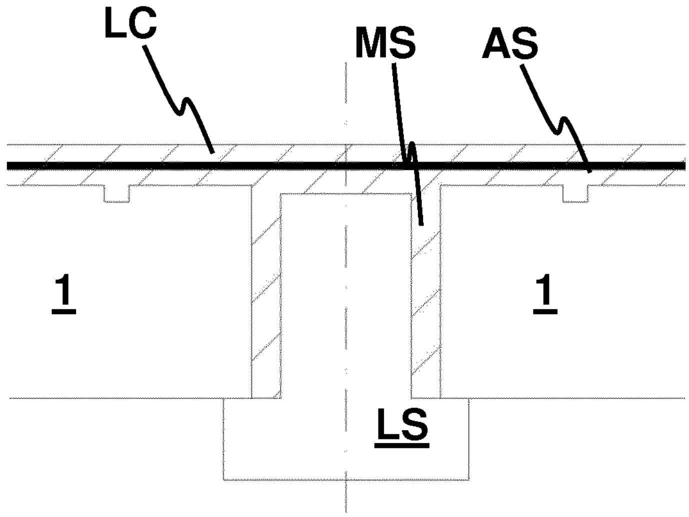
FIG. 27B shows a vertical section according to a longitudinal direction of a floor, in an arrangement where the moment resistant system is concrete poured between a vertical extension of the linear supporting element and the end of a prefabricated floor element; with reinforcement properly anchored to both floor elements.

FIG. 27B is similar to 27A, but in this case the linear supporting element LS is a precast beam, with a central protruding web. For the moment resisting system to work properly, the space between the web of the beam LS and the ends of the floor elements 1 must be filled with cast in situ concrete.

Figure 28:
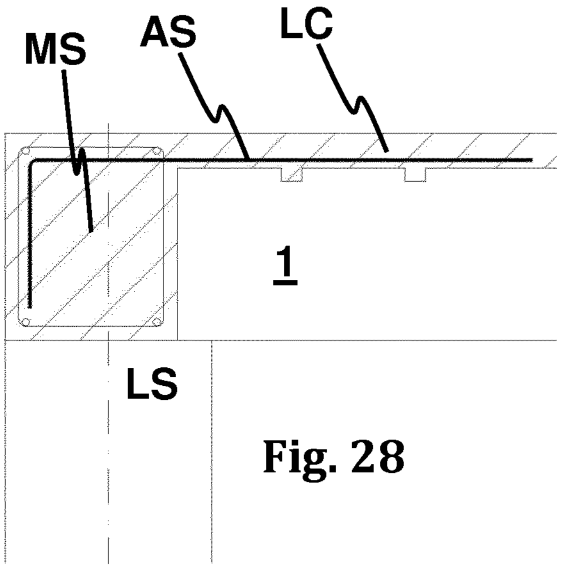
FIGS. 28 to 30 show arrangements where the moment resisting system corresponds to a tie beam at the end of the floor.

FIG. 28 shows a floor element 1 supported by a linear supporting element LS such as a wall. The moment resisting system MS is a cast in situ reinforced concrete tie beam, which includes hoops. Negative reinforcement AS is embedded in the moment resisting system MS to achieve a proper fixity of the floor element 1.

Figure 29:
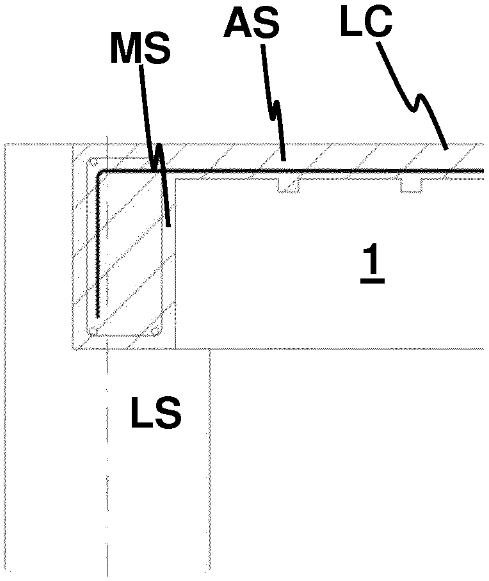

FIG. 29 is similar to 28. The main difference is that the wall LS includes a lateral wall, which enables the casting of the tie beam MS without the need of a lateral form.

Figure 30:
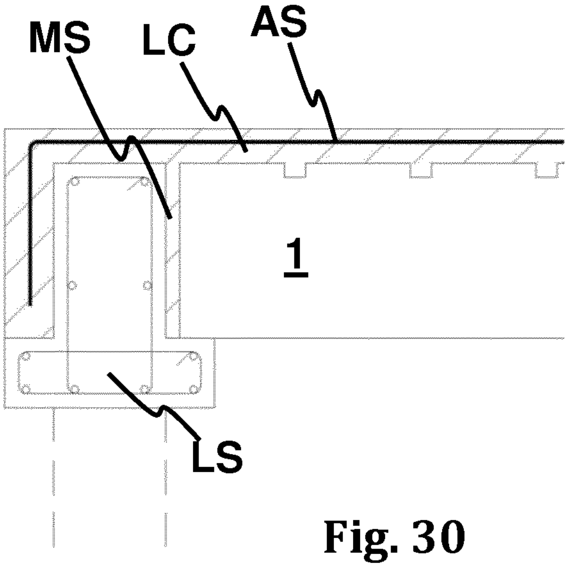

FIG. 30 is similar to 28, but the linear supporting element LS is here a precast beam with a central protruding web. The beam, together with the concrete is cast in situ all around the web of the precast beam forms de moment resisting system MS, wherein the negative reinforcement AS is embedded to achieve the fixity of the floor element 1.

Figure 32:
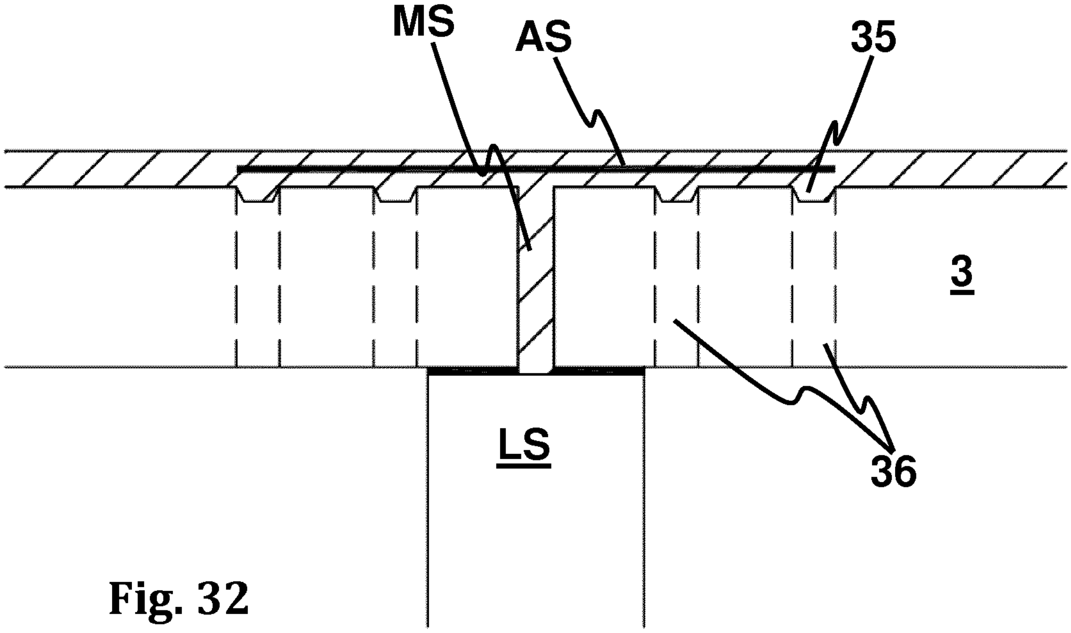

FIG. 32 is very similar to 27A, but in FIG. 32 floor elements 3 are of the third variant.

Figure 31:
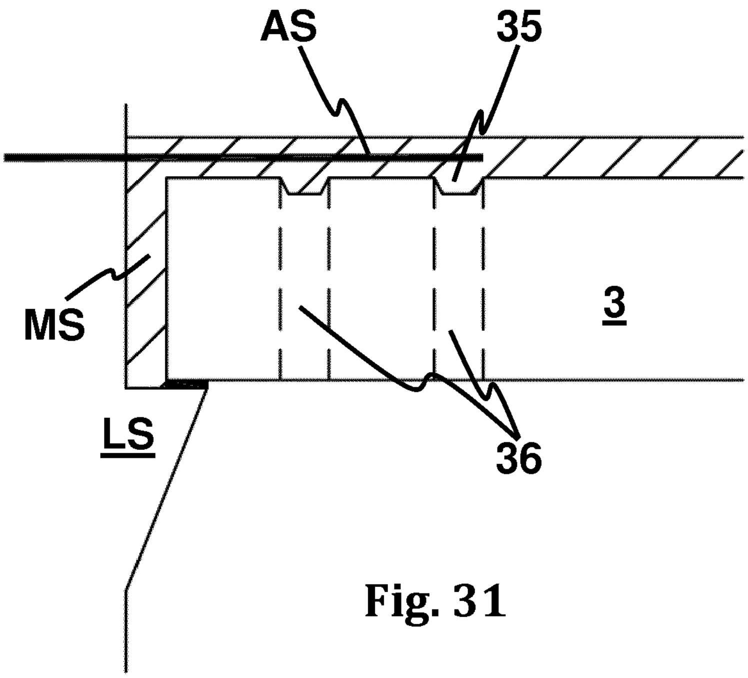
FIGS. 31 and 32 show embodiments of the linear supporting element in combination with prefabricated floor elements having upper and lateral grooves.

FIG. 31 shows a floor element 3 supported on a corbel of a linear supporting element LS that includes protruding negative reinforcement AS to be embedded in the topping LC. The moment resisting system MS is formed by the linear supporting element LS and the cast in situ concrete placed in between of the linear supporting element LS and the end face of the floor element 3.

Figure 8A:
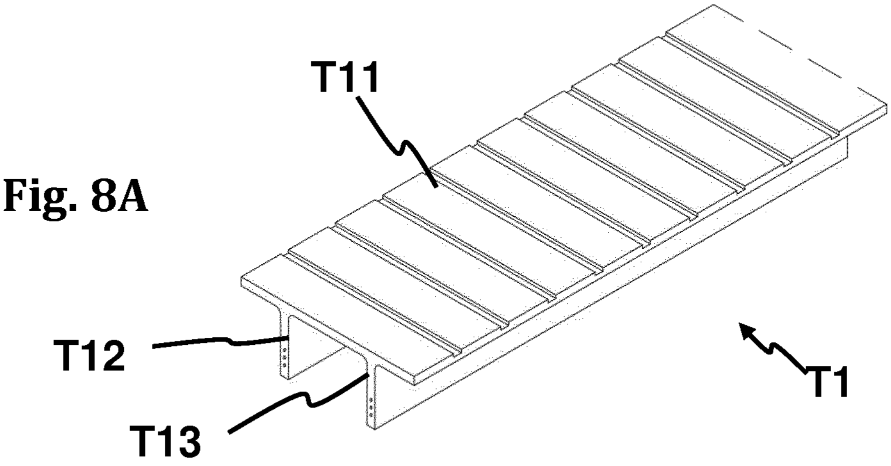
FIG. 8A shows a perspective view of the first variant of the prefabricated floor element under the shape of a double T slab.
Figure 8B:
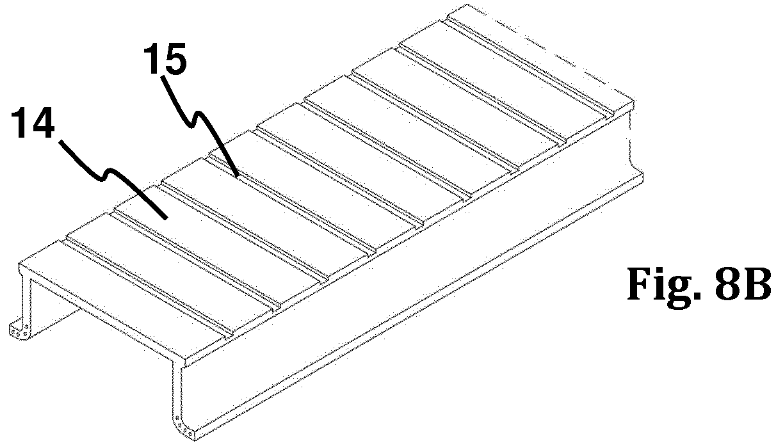
FIGS. 8B and 8C show, respectively, two variants of a prefabricated floor element with the same cross section, the element on the 8B including the transverse continuous grooves on the upper planar face, and the elements on 8C including the lateral grooves on the lateral faces.

The variants shown in FIGS. 8A and 8B, also provided with grooves on the upper surface, are other embodiments of the structural floor element that can work as shown up to now.

FIG. 8A shows a perspective view of the first variant of the prefabricated floor element under the shape of a double T slab T1, comprising transversal continuous upper grooves on the upper planar plate T11. There are two parallel vertical webs or stems T12, T13 joined to the upper planar plate T11 or flange, such that the double T section is obtained.

FIG. 8B shows another variant comprising the transverse continuous grooves 15 on the upper planar face 14, here referred as inverted-U slabs.

The armature has a diameter comprised between 10 and 20 mm, and the concrete layer LC has a height of at least 50 mm.

Description of the Second Variant of the Invention

FIG. 6 shows another variant of the prefabricated floor element 2 that has an elongated shape wherein a longitudinal direction X, a transversal direction Y, a height direction Z, two end faces 21 which delimitate the element 2 in the longitudinal direction X, two lateral faces 22 which delimitate the element 2 in the transversal direction Y, a lower face 23 and an upper planar face 24 that delimitate the element 2 in the height direction Z are defined, with a lower tab TL on a lower edge of the lateral faces 22, and it comprises vertical lateral grooves 26 on the lateral faces 24, the lateral grooves 26 extending from the lower tab TS to the upper planar face 24.

Therefore the difference with the first variant is that the grooves are lateral.

The prefabricated floor element comprises a lower tab TL on a lower edge of the lateral faces 22, the lower tab TL being longer than the upper tab TS in the transversal direction Y.

Figure 14A:
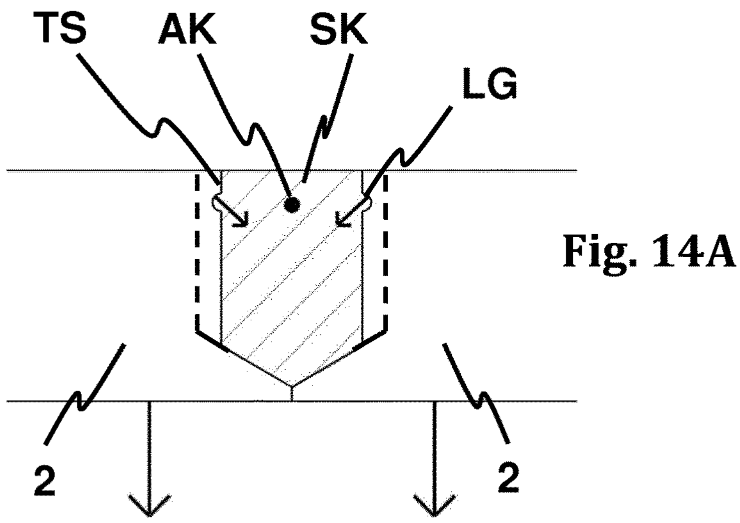
FIG. 14A is a transversal section of a structural floor including two prefabricated floor elements including vertical lateral grooves and negative reinforcement placed in the concrete shear key. Lateral horizontal grooves are also depicted, which transfer vertical shear forces.

An alternative embodiment of this second variant can be seen in FIG. 14A, where the upper tab TS is replaced by a longitudinal groove LG on the faces 22.

Like in the first variant, and as shown in FIG. 6, in a preferred embodiment the lateral grooves 26 are present only on two end portions, each covering ⅓ of the entire length, such that the central portion is devoid of grooves. In this way the grooves are only in the places where they are useful, leaving the floor element unchanged and unweakened at the central portion.

As shown for example in FIGS. 7, 9A, 14B, 21 to 26, this prefabricated floor element 2 is destined to be arranged adjacent to another floor element 2 in the transversal direction and then both supported at their ends on two linear supporting elements LS, like walls or beams arranged in the transversal direction Y. Specifically, these elements 2 allow, by arranging an armature AK in the upper part of the shear key SK formed by pouring concrete in the volume delimited by the lateral faces and the tabs and extending beyond the end faces 21, to transmit tension forces having the longitudinal direction X thanks to the lateral grooves 26. These tension forces in the armature SK, in combination with the compression forces acting upon the lower part of the end faces 21 allow then to transmit negative moments through said face, these moments being around an axis in the Y direction.

FIG. 7 shows a cross section parallel to transverse direction Y of a structural floor comprising two prefabricated floor elements 2, comprising lateral grooves 26 on the lateral faces 22, the lateral grooves 26 extending from the lower tab TL to the upper face 24, and displaying the main elements of the structural floor.

Description of the Flexure Strength Mechanism

Figure 13A:
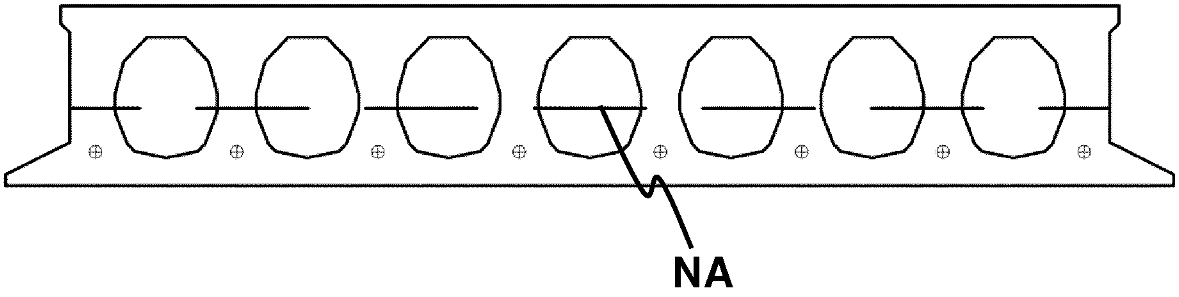
FIG. 13A shows the position of the Neutral Axis of the cross section of a prefabricated floor element, when the cross section is not cracked.
Figure 13B:
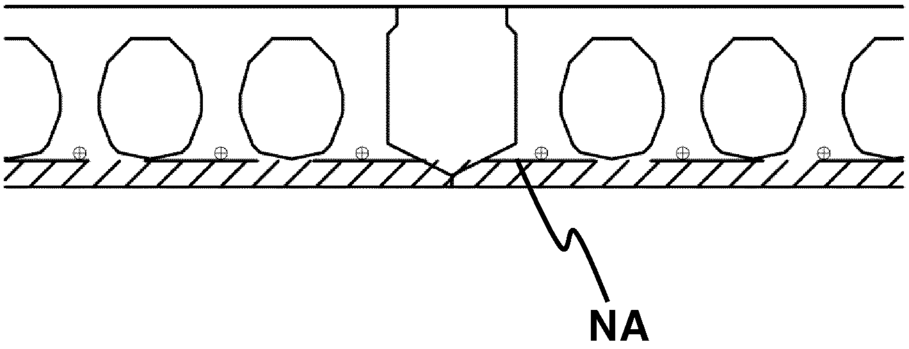
FIG. 13B shows the position of the Neutral Axis under Ultimate Limit State flexure forces of a floor structure including prefabricated floor elements.
Figure 13C:
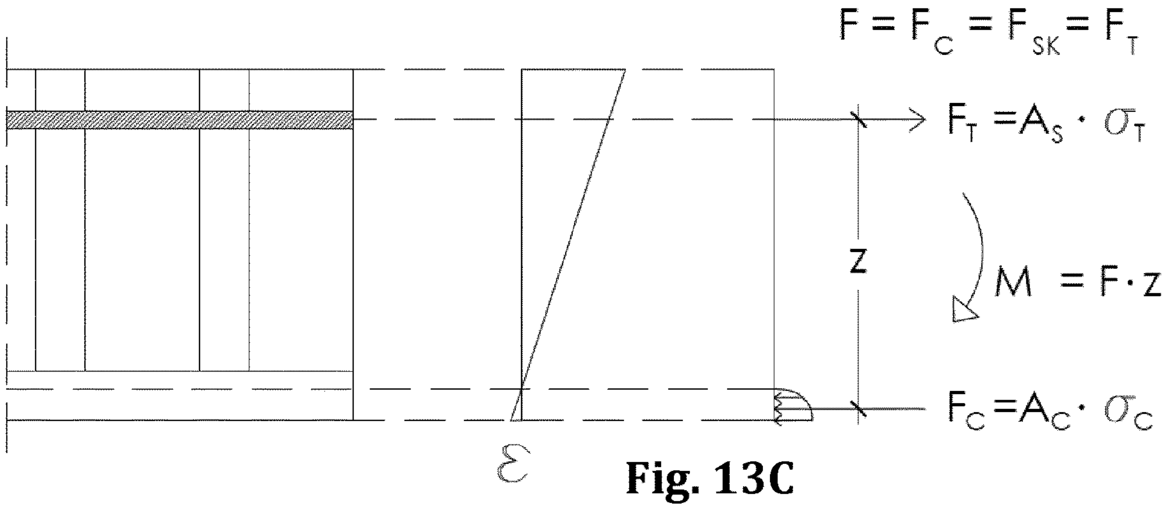
FIG. 13C shows a side elevation one of the prefabricated floor elements and the armature, as if a cut was made in the middle of the concrete shear key and this concrete made transparent.

FIG. 13C shows a side elevation of one of the prefabricated floor elements 2 and the armature AK, as if a cut was made in the middle of the concrete shear key SK and this concrete made transparent. Beside the elevation are depicted the strain scheme and the section equilibrium scheme. The least includes both stresses and forces.

Figure 13D:
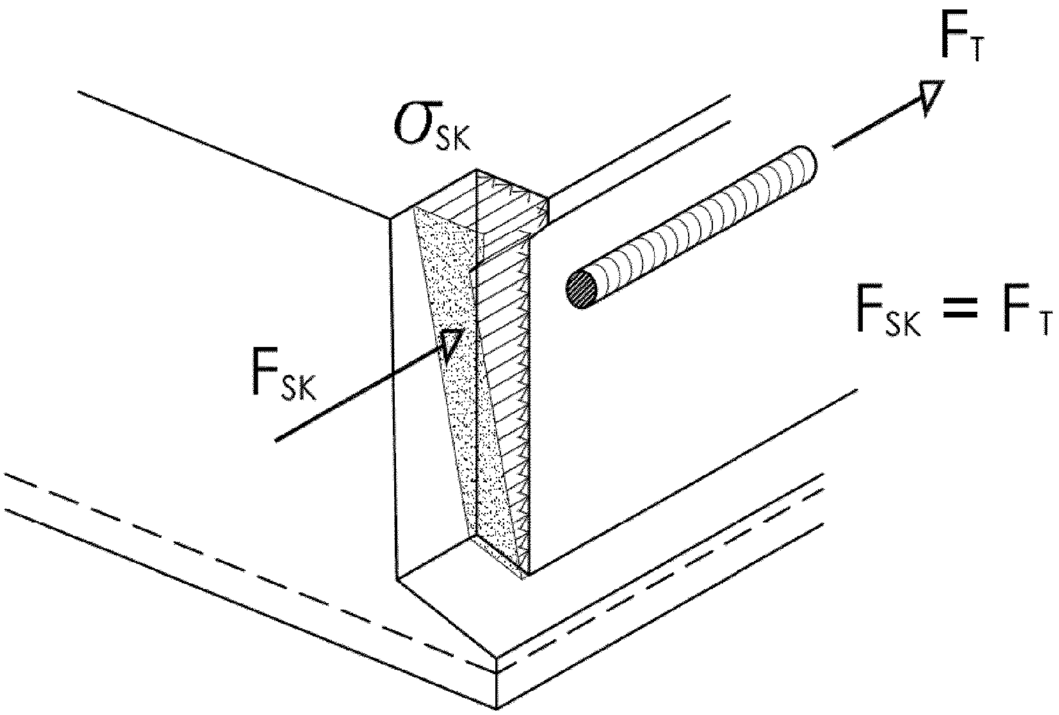
FIG. 13D shows a perspective view of a prefabricated floor element and the armature, with the concrete shear key made transparent.

FIG. 13D shows a perspective view of a prefabricated floor element 2 and the armature AK, while the concrete shear key SK is made transparent. The figure explains how when the armature AK is under tension, it drags the concrete shear key SK, which in turn exerts a compression $F_{SK}$ on the prefabricated floor element 2. Compression stresses $\sigma_{SK}$ are depicted on the floor element 2. It is relevant to note, as it can be seen in FIG. 13D, that the lateral surface of the groove is essential for the proper functioning of this solution, and it has an especial importance the part of this surface which is near the top surface (24). Also, the effectiveness of the reinforcement AK depends directly on its position in height. That is why it must always be placed as high as possible while respecting the appropriate cover criteria.

When prefabricated floor elements do not have a topping, negative reinforcement is placed at the sides of each floor element, in the relatively narrow cavities CC filled with concrete between floor elements 2, which forms a negative-moment-resistant rib or shear key SK. This means most of the load of the floor is applied directly on the prefabricated floor element, and only a small part is directly applied on the rib of shear key SK. However, the prefabricated floor elements are not directly fixed, so not negative-moment-resistant. This situation tends to lead the floor elements more loaded to deflect as a pinned-pinned element, while the cast in situ rib or shear key SK deflects much less, just as a fixed-fixed element does. As there is a shear key, upper tab TS or longitudinal groove LG, transmitting vertical shear forces in the vertical faces 22 of the precast floor element, the differential deflection is prevented. As a result prefabricated floor elements equal their deflection to that of the cast in situ rib or shear key SK. This happens thanks to the fact that the floor elements “hang” on the rib or shear key SK. This “hanging” means an important transfer of load form the floor element to the rib or shear key SK, leading this rib to withstand important shear forces. Reinforcement is necessary for the rib not to break under this important shear forces. Thus, if negative reinforcement is added only within the ribs, as there is no topping to place those negative reinforcements, shear reinforcement is also required in order to withstand the considerable shear load transfer from the floor elements to the rib or shear key SK.

FIG. 13A shows the position of the Neutral Axis NA of the cross section of a prefabricated floor element 2, when the cross section is not cracked.

FIG. 13B shows the position of the Neutral Axis NA under Ultimate Limit State flexure forces of a floor structure including prefabricated floor elements 2. In the case depicted, the floor structure is under a negative moment. In this situation, only the lower part of the cross section of the prefabricated floor elements (hatched) is under compression, while the rest of the cross section is under tension. In the middle, the armature AK is under tension.

On the one hand, the fact that the neutral axis under Ultimate Limit State ULS is so low for negative moments, and on the other hand the fact that in the variant 2 the lateral faces 22 are the only contact surfaces between cast in situ and precast concrete able to transfer negative moments from floor elements 2 to the negative reinforcement, explain the importance that the lateral (vertical) grooves 26 are made as big as possible: extending them from the lower tab TL to the upper planar face 24.

Description of Unwanted Obliquus Forces and Their Remedy

Figure 9A:
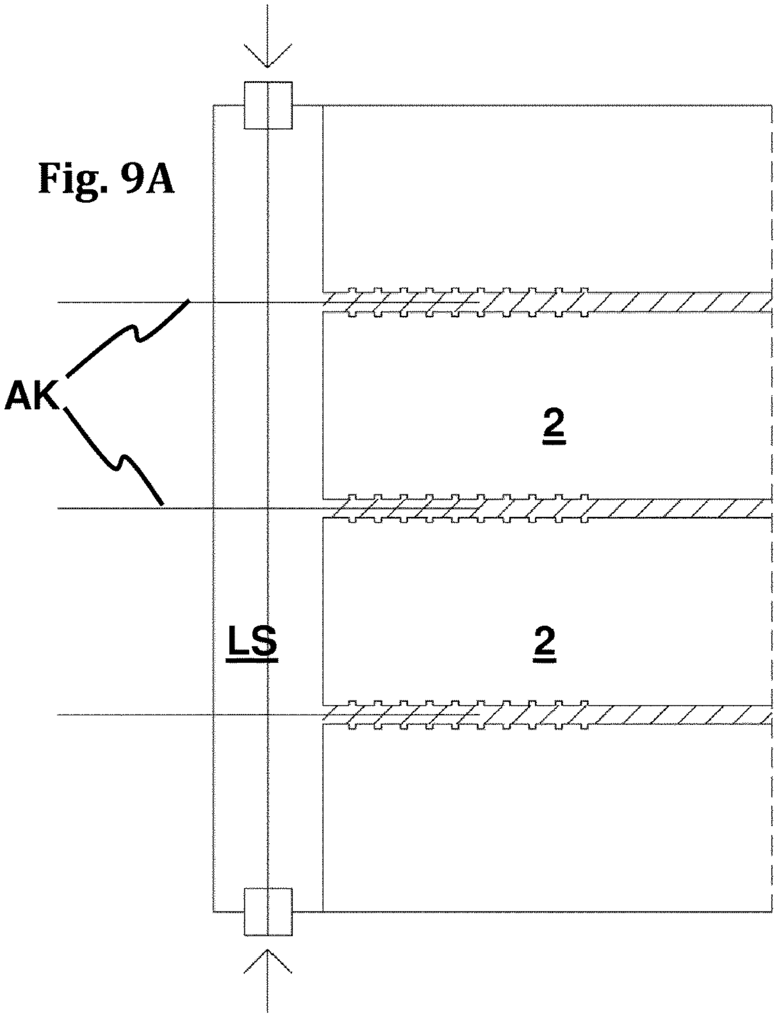
FIG. 9A shows a plan of structural floor comprising several prefabricated floor elements at their bearing on a linear supporting element.

FIG. 9A shows a plan of structural floor comprising several prefabricated floor elements 2 at their bearing on a linear supporting element LS, displaying also the negative armatures AK placed within the concrete filled shear key SK. Compression forces parallel to transversal direction Y are displayed, such as the ones acted by a transversal post-tensioned armature.

Figure 9B:
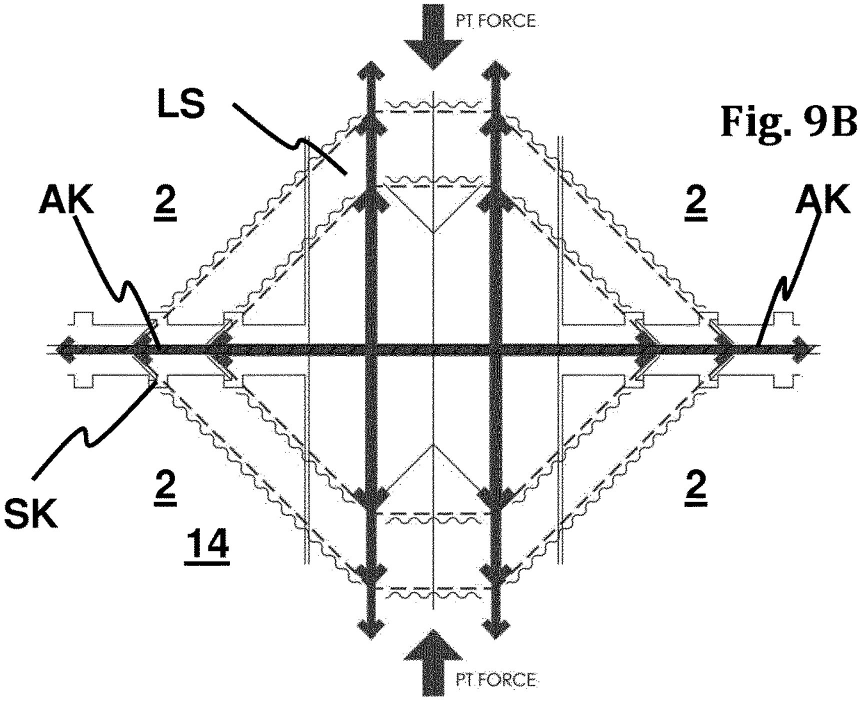
FIG. 9B is a detail of the plan view of FIG. 9A, showing a strut and tie forces diagram.

FIG. 9B is a detail of the plan view of FIG. 9A. On this 9B figure a tie and strut scheme is superposed to the main elements of the structure. On the armature AK one can see a tie with an increasing tension force. This tension force on the armature AK is increased by the compressions (struts) exerted by the prefabricated floor elements 2, through the lateral grooves and into the shear key SK. The system is in equilibrium by causing tensions (and cracks—depicted as undulations) on the linear supporting element LS. These diagonal compressions are perpendicular to maximum tensions that tend to cause cracks on the upper planar face 24 of the floor element 2. Both the cracks—depicted as undulations—on the linear supporting element LS and those on the upper planar face 24 of the floor element can be remediated by compression forces parallel to the transverse direction Y, such as forces exerted by post-tensioning.

Figure 24:
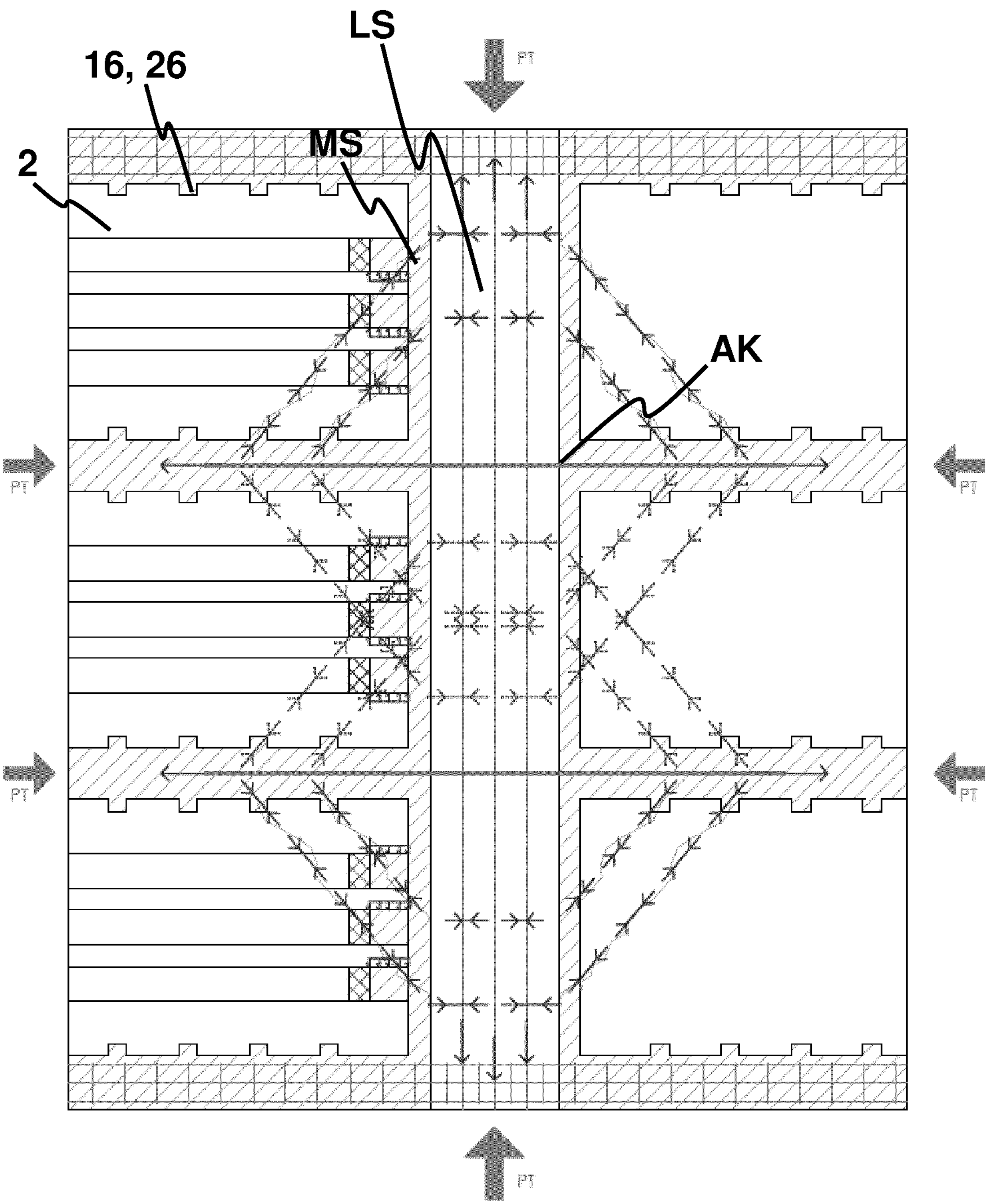
FIG. 24 is a plan view of a floor having four elements which ends are resting on the linear support, and showing a number of solutions to counter-act lateral outward pushing forces.
Figure 25:
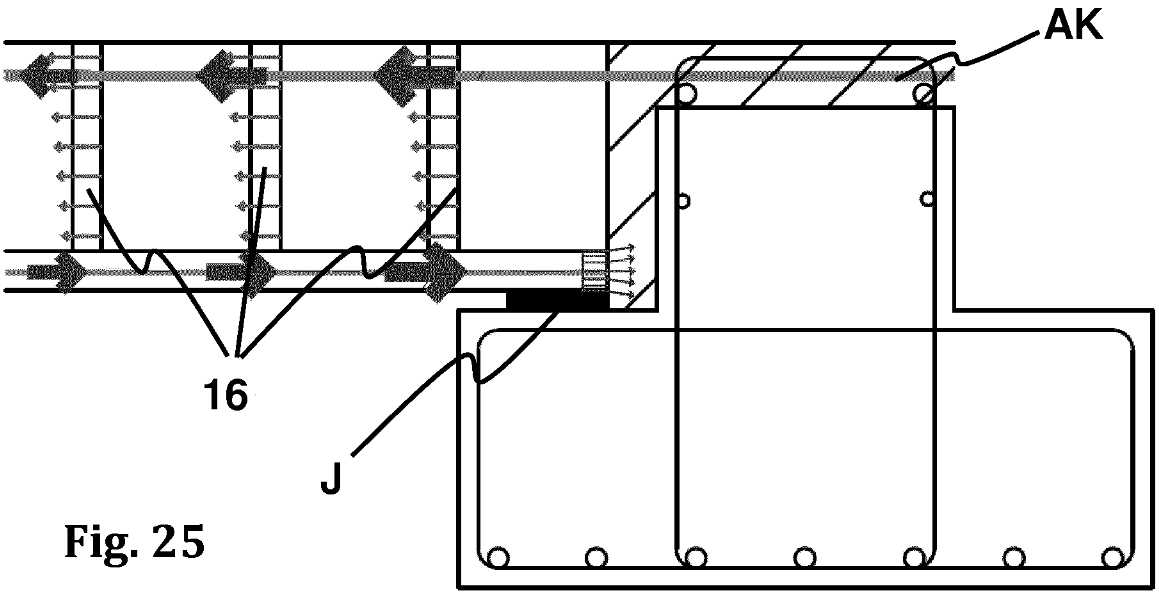
FIG. 25 shows a vertical section according to a transversal direction of a prefabricated floor element in a structural floor, where the main forces are represented.
Figure 26:
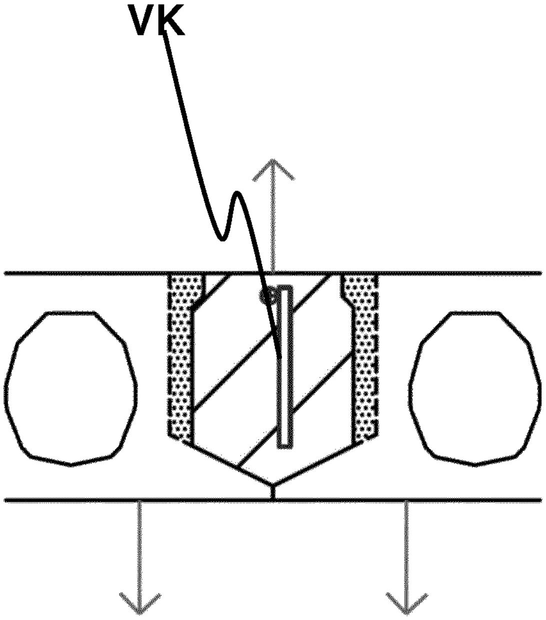
FIG. 26 shows a vertical section according to a transversal direction of a prefabricated floor element in a structural floor.

FIG. 24 is similar to 9A but shows at the left side hollow core elements cut at mid of their height. In this figure are depicted four alternative or complementary solutions to control diagonal cracking in the upper planar face 24, and to prevent lateral displacement of precast floor elements placed at the perimeter of the structural floor. Notice that this sort of failure is not relevant in interior floor elements, as those are already confined. So, the four mentioned solutions are: 1) Post-tensioning in the direction parallel to the linear support element; 2) Post-tensioning by placing a tendon in each shear key SK; 3) Tie beams placed in the perimeter (upper and lower parts of the figure); 4) Grooves of teeth blocking lateral movement. In the case depicted FIG. 24 is shown a solution consisting in filling with cast in situ concrete a small length of all alveoli. This is achieved by slightly recessing each plug (T) into its alveolus.

Description of the Vertical Shear Strength Mechanism of the Rib or Shear Key SK

FIG. 14A shows a detail of a structural formed by two floor elements 2 with lateral vertical grooves and lateral horizontal grooves SG. Between the two floor elements, a shear key SK is formed with cast in situ concrete, including AK reinforcement embedded therein. As mentioned above, as typically pinned-pinned floor elements 2 tend to deflect more than the cast in situ rib or shear key SK, they try to deflect downwardly (as big downward arrows suggest in FIG. 14A), but thanks to horizontal grooves SG which act as vertical shear keys, the downward deflection of precast floor elements is prevented and an intense vertical shear force is transferred to the cast in situ rib or shear key SK. So, precast floor elements “hang” on ribs SK.

Figure 8C:
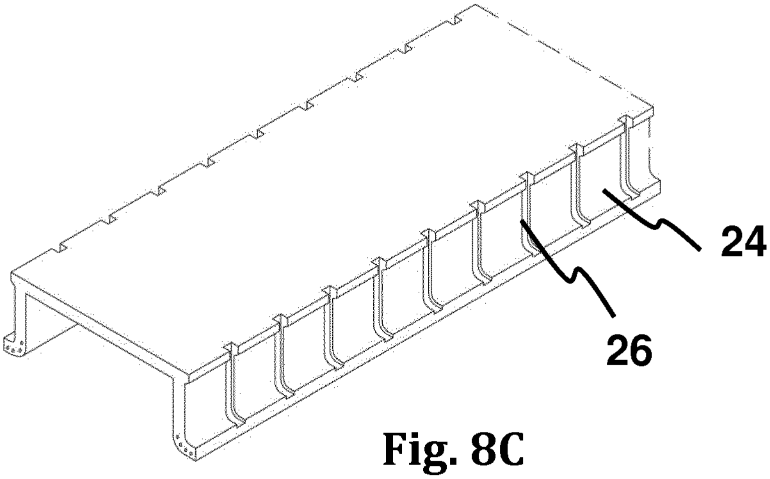

The variant shown in FIG. 8C is, also provided with grooves 26 on the lateral faces 22. This embodiment and other similar embodiments of the structure can work as shown according to the second variant of the invention.

Figure 14B:
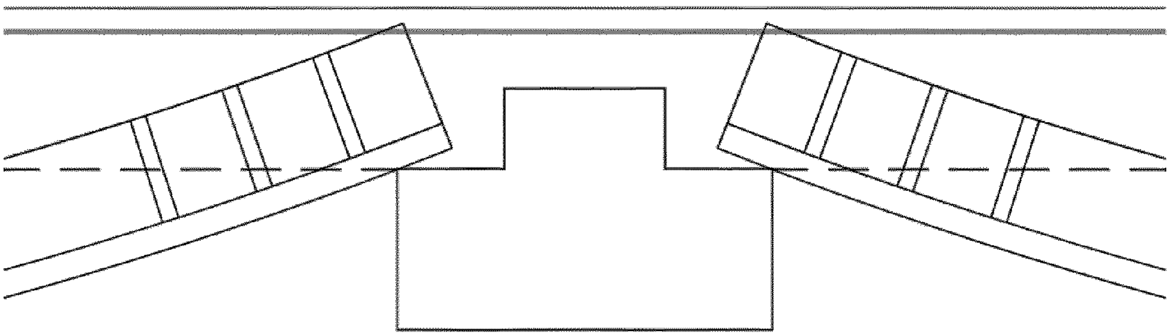
FIG. 14B is a longitudinal cross section of a structural floor including prefabricated floor elements and negative reinforcement placed in the concrete shear key; showing cracks in the shear key.

FIG. 14B shows a longitudinal section of a structural floor including prefabricated floor elements 2 and negative reinforcement AK placed in the concrete shear key SK. This figure shows the behaviour that would have the floor in the case that prefabricated floor elements 2 would not have an upper tab TS nor a side groove SG: the prefabricated floor element would deflect more, as a pinned-pinned element, and the concrete shear key SK would deflect much less, as a fixed-fixed.

Figure 14C:
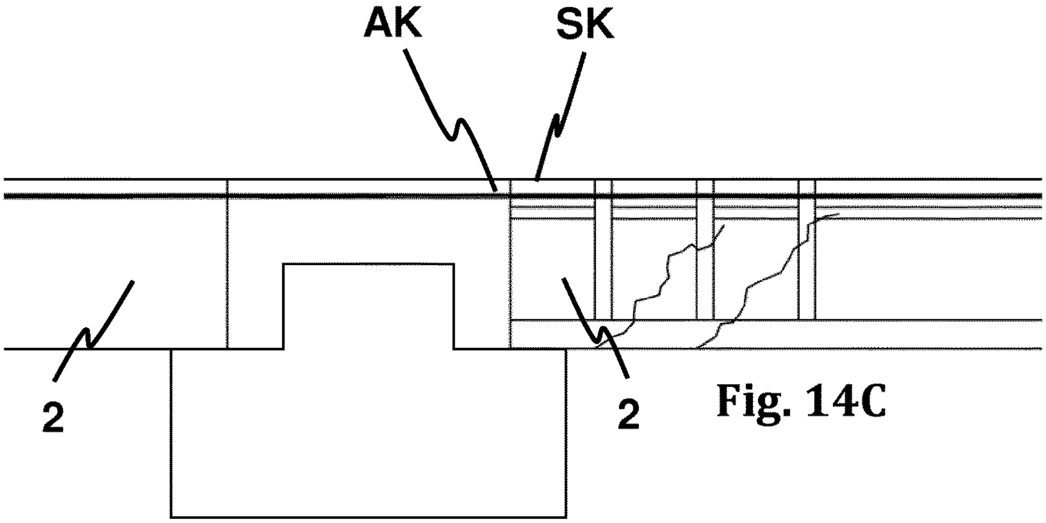
FIG. 14C is a longitudinal cross section of a structural floor including prefabricated floor elements and negative reinforcement placed in the concrete shear key.

FIG. 14C is a longitudinal cross section of a structural floor including prefabricated floor elements 2 and negative reinforcement AK placed in the concrete shear key SK. Cracks are depicted, which appear in the concrete shear key SK due to the intense vertical shear force, due to the fact that floor elements 2 tend to “hang” on the shear key SK, as illustrated in 14A.

Figure 15A:
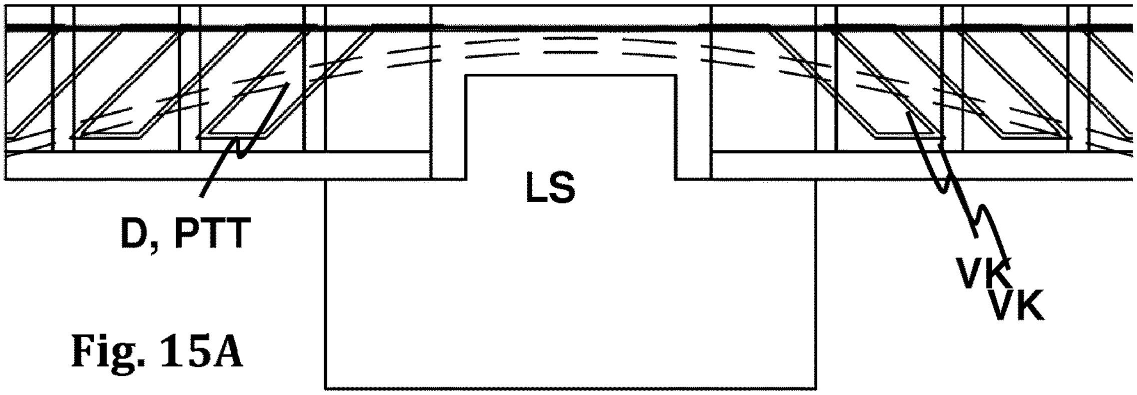
FIG. 15A is a longitudinal cross section of a structural floor including prefabricated floor elements, negative reinforcement, shear reinforcement and post-tensioning reinforcement, placed in a duct.
Figure 21:
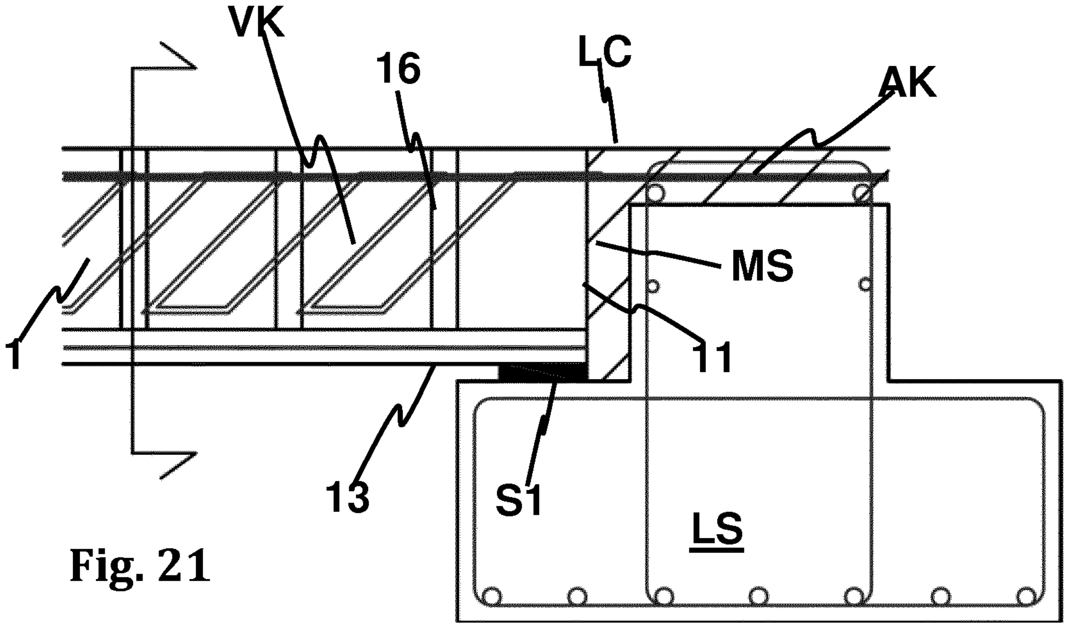
FIG. 21 shows a vertical section according to a longitudinal direction of a prefabricated floor element in a structural floor, at shear key plane level.
Figure 22:
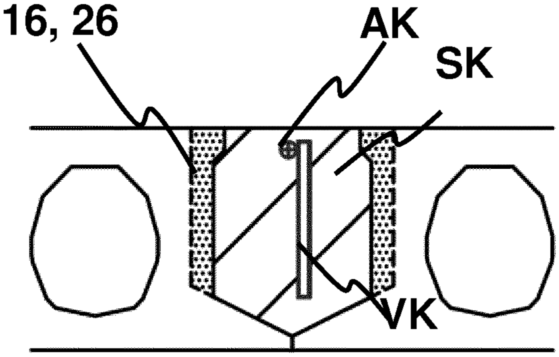
FIG. 22 shows a vertical section according to a transversal direction of a prefabricated floor element in a structural floor.

In some case such as the depicted in FIGS. 15A, 21 and 22, the structure comprises armatures VK placed in the shear key SK and extending from the upper part to the lower part thereof, such that it allows the concrete shear key to withstand typically high vertical shear stresses.

FIG. 15A is a longitudinal cross section of a structural floor including prefabricated floor elements 2, negative reinforcement AK, shear reinforcement VK and post-tensioning PTT reinforcement, placed in a duct D. No cracks appear, as the concrete shear key SK properly withstands the intense vertical shear forces, thank to proper reinforcements.

Figure 60:
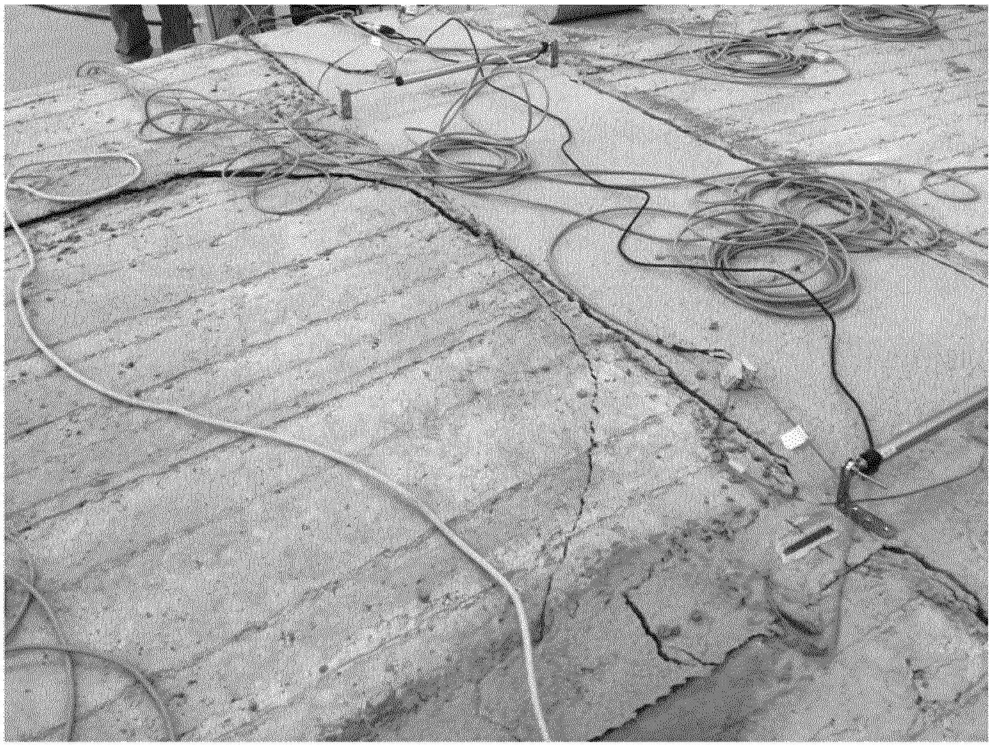
FIG. 60 shows, in a detailed view, important cracks appeared during the test performed on the conventional structural floor previously shown in FIG. 53.

Placing post-tensioning PTT in the shear key SK has the additional advantage to prevent cracks in the upper planar surface 24, such as the ones depicted in FIGS. 9B, 24 and 60, which very much increases the stiffness of the whole floor, reducing its deflection.

FIG. 21 shows a section parallel to a of a prefabricated floor element 2 in a structural floor, cutting the structural floor through the concrete shear key SK. Shear reinforcement VK is included. This floor does not include post-tensioning PTT, as it may not be necessary in cases where loads on the floor are not intense.

FIG. 22 shows a structural floor in a section transverse to prefabricated floor elements 2 with lateral grooves 26, including a cast in situ shear key SK and both flexure reinforcement AK and shear reinforcement VK embedded within the shear key SK. In this sort of floor elements 2, the bottom tab TL is typically bigger than in currently conventional floor elements. This increase in the size of bottom tabs TL is intended to increase de the width of the cast in situ shear key SK, as this is the only place where to place negative reinforcement SK, shear reinforcement VK and post-tensioning reinforcement PTT (if any). Moreover, as it is the only place where the whole armature can be placed, forces are typically very concentrated, and reinforcement bars have big diameters. It is not unusual to use 1 or 2 rebars of 20 mm or 25 mm of diameter put side by side, plus a shear reinforcement with 8 mm to 12 mm of diameter. Of course, proper cover concrete must be guaranteed all around the rebars. As a result, the average width of the shear key SK will hardly be smaller than 100 mm.

Figure 23:
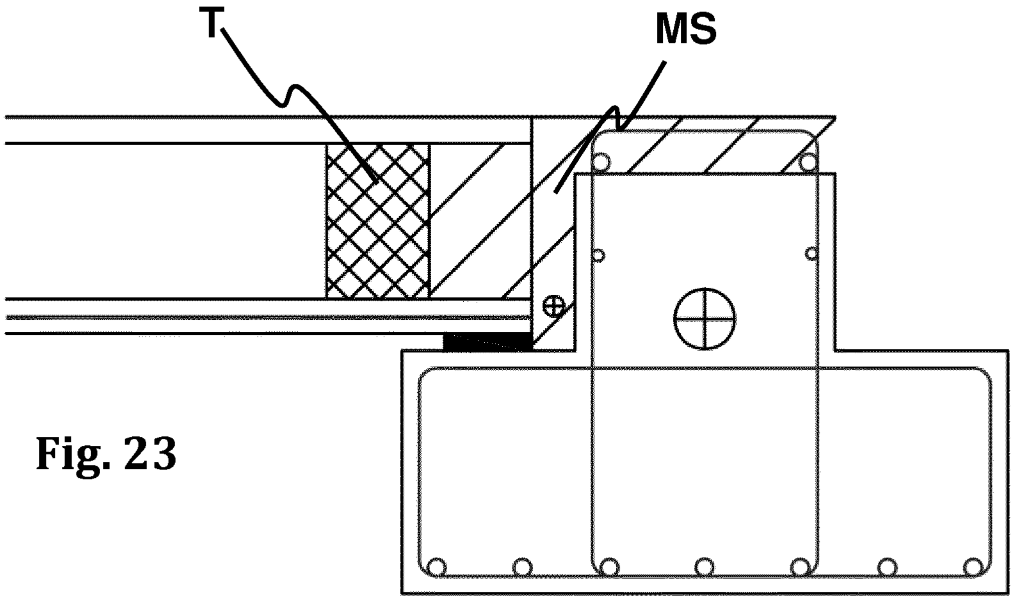
FIG. 23 shows a vertical section according to a longitudinal direction of the structural floor, where the ends of the alveoli filled with cast in situ concrete are shown, as well as post-tensioned reinforcements placed in respective ducts.

FIG. 23 shows a section parallel to a prefabricated floor element 2 in a structural floor, cutting the structural floor through an alveolus in the floor element 2. A plug T, intended to block the entrance of cast in situ concrete in the hollow core slab, is intentionally slightly recessed into the alveolus, to let cast in situ concrete fill the end of the alveolus.

Figure 15B:
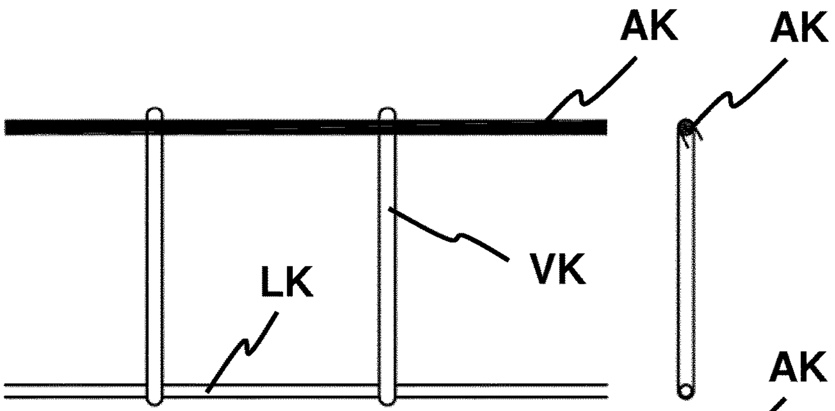
FIGS. 15B, 15C and 15D show elevations and cross sections of different possible shear reinforcements to be placed in the concrete shear key, in connection with negative armature, to prevent it from breaking.
Figure 15C:
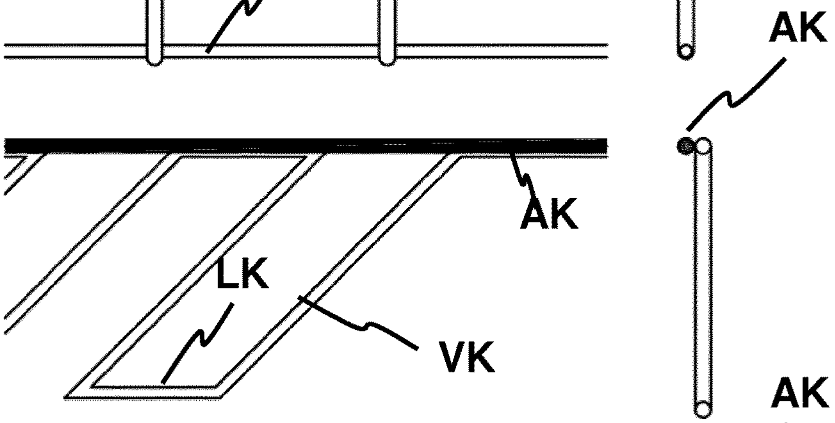
Figure 15D:
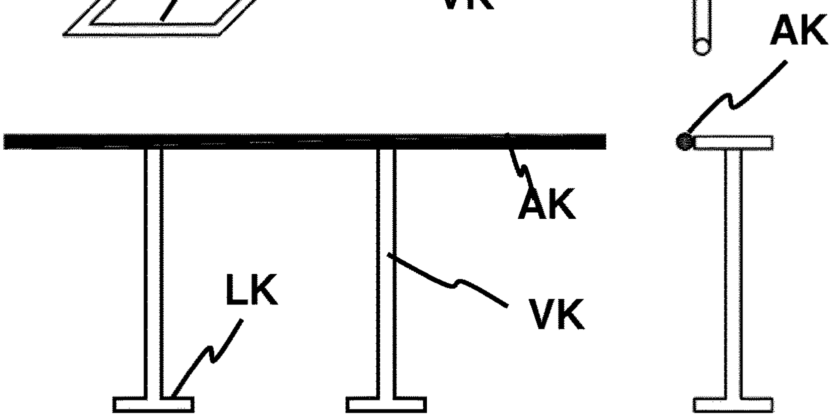
Figure 62:
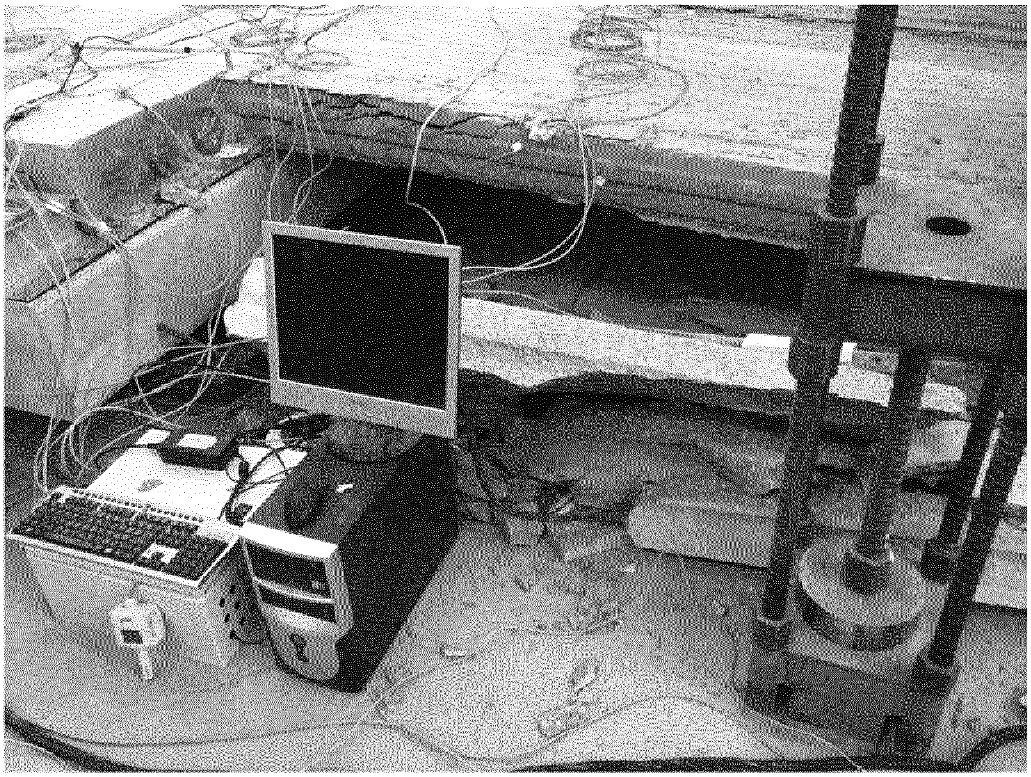
FIG. 62 shows a collapsed part of the conventional structural floor previously shown in FIG. 53, after the test had to be stopped, due to the failure.

FIGS. 15B, 15C and 15D show elevations and cross sections of different possible shear reinforcements to be placed in the concrete shear key SK, in connection with negative armature AK, to prevent the concrete shear key SK from breaking due to intense vertical shear loads, just as shown in FIG. 62. 15B shows typical stirrups. 15D shows Z-shaped shear reinforcement. 15D shows shear studs.

FIG. 3 shows a perspective view of the third variant of the prefabricated floor element 3, combination of the first 1 and second 2 variants of the prefabricated floor element, comprising transversal continuous upper grooves 15 and lateral grooves 36 on the lateral faces.

Details Regarding the Grooves

FIGS. 10A and 11A depict two inappropriate cross sections of a groove. When the reinforcement is put under tension, it pulls the cast in situ concrete (hatched), and the inappropriate shape of the groove will tend to separate the precast concrete (in white) of the cast in situ concrete. 10A depicts a rounded shape of the cross section; and 11A a side face of the groove excessively inclined (more than 10°)

FIG. 10B depicts another inappropriate cross section of a groove. This shape of the precast element virtually makes impossible a properly consolidation of precast concrete. Moreover, it is very hard (or impossible) to unmould. If these difficulties were solved, the shape would tend to easily break (as depicted) when the reinforcement pulled the cast in situ concrete.

FIG. 11B shows the proper shape and size that must have a groove—placed on a lateral face or on an upper face—to function effectively. The inclination of the lateral faces of the groove should not deviate more than 10° from the perpendicular to the direction to the shear force (typically parallel to the contact surface between the precast element and the cast in situ concrete). The depth dg of the groove should not be less than 1 time the diameter of the biggest aggregate of the cast in situ concrete. The width wg of the groove, measured parallel to the longitudinal direction X, should not be less than 1.5 times the diameter of the biggest aggregate of the cast in situ concrete.

FIG. 12 shows the proper shape and size that must have a lateral groove to function properly. The values for the depth dg and the width of the groove wg are those already defined. The vertical dimension must go from the lower tab TL to the upper face 24.

The minimum sizes mentioned above are aimed at effectively preventing the slipping of the concrete cast in the job from its place on the prefabricated element. This is achieved on the one hand by ensuring the correct filling of the grooves by the poured concrete; and on the other hand by ensuring that the shear forces act upon the aggregate, and not only on the cement matrix wrapping the aggregate; in order to avoid that the aggregate of the cast in situ concrete detaches from its cement matrix. Typical diameter of biggest aggregates ranges from 10 mm to 20 mm. Thus, the height and width must be at least of 10 mm and 15 mm, respectively; but 20 mm and 30 mm, respectively, are generally recommended in order to cover a bigger range of aggregate sizes with the same geometry of the grooves.

Respecting these criteria, guarantees an ultimate mode of failure in which either the concrete of the cast in situ concrete or the precast member breaks under shear; but never a failure happens in the interface (separating both concretes). This second sort of failure is not desired, as it is very difficult to predict, as it depends on a number of aleatory factors (humidity history, temperature history, direct insolation, wind, dirt in the job, rain in the job) or of factors that are almost impossible to control from one job to another (formulation of cast and degree of compaction of cast in situ concrete; age of precast members when cast in situ concrete is poured, etc.). These factors will have a very strong influence in the differential shrinkage a differential stiffness of the two concretes. Moreover, the influence of a number of these factors on the interface shear strength of the junction is not even described in most common codes, which mainly base their formulas on principles of cohesion-adhesion of the interface. So, a proper prediction of the strength of this interface surfaces is extremely hard to achieve.

On the contrary, when deep grooves are available, that guarantee an ultimate mode of failure causing the rupture of one of the two concretes (rather than the interface) allows for a very good prediction of the actual strength of the junction. This is because the ultimate shear strength of concrete (one sole material) is very well known and well described in codes. It only depends on the tension strength of concrete, which in turn depends on its compression strength. Thus, none of the mentioned aleatory factors enter into play.

Spacing between grooves should preferably be proportional to the width of the groove. The relation of spacing of grooves to width of grooves must be similar to the relation of shear (or tension) strength of precast concrete to the shear (or tension) strength of cast in situ concrete. (Shear strength of plain concrete is considered here to be proportional to tension strength.) When this proportionality is respected both materials will break at the same time. This means, nor the precast concrete teeth (protrusions placed between each pair or grooves) nor the cast in situ concrete teeth (formed when filling in the grooves) are clearly weaker that its counterpart, avoiding weak points in the junction that would lead to lowering the horizontal shear strength of the junction.

Description of Experimental Results of Horizontal Shear Strength and its Relation with Differential Shrinkage A series of tests have been performed to assess the horizontal shear strength of different geometries of the contact surface of a precast floor element and a topping cast on top of it. Three sort of tests have been performed: a) Tests with small specimens under pure horizontal shear (35 tests); b) Tests with midsize specimens under horizontal shear induced by bending (6 tests); c) Big size specimens under horizontal shear induced by bending (2 tests).

The different sorts of tests gave consistent results. Next are also described the results of tests with small specimens, as those are the more representative.

Five sorts of surfaces have been tested:

1) Smooth surface (FIGS. 51 and 52) [17 specimens +2 medium size specimen+1 big specimen]
2) Brushed surface, with scratches shallower than 2 mm (FIGS. 51 and 52) [2 specimens]
3) Surface with holes, 2 cm deep (FIGS. 51 and 52) [4 specimens+2 medium size specimen]
4) Surface with shallow transverse grooves, 1 cm deep (FIGS. 51 and 52) [2 specimens]
5) Surface with appropriate transverse grooves, 2 cm deep (FIGS. 51 and 52) [10 specimens+2 medium size specimen+1 big specimen]

The two most studied cases are smooth surfaces (batch 1) and surfaces with appropriate transverse grooves (batch 5); also the case with holes (batch 3) has been studied. In all these cases, different concretes have been tested at different ages. These different concretes and ages have been designed to lead to different differential shrinkages, in order to assess the influence of this phenomenon on the horizontal shear strength.

Figure 49:
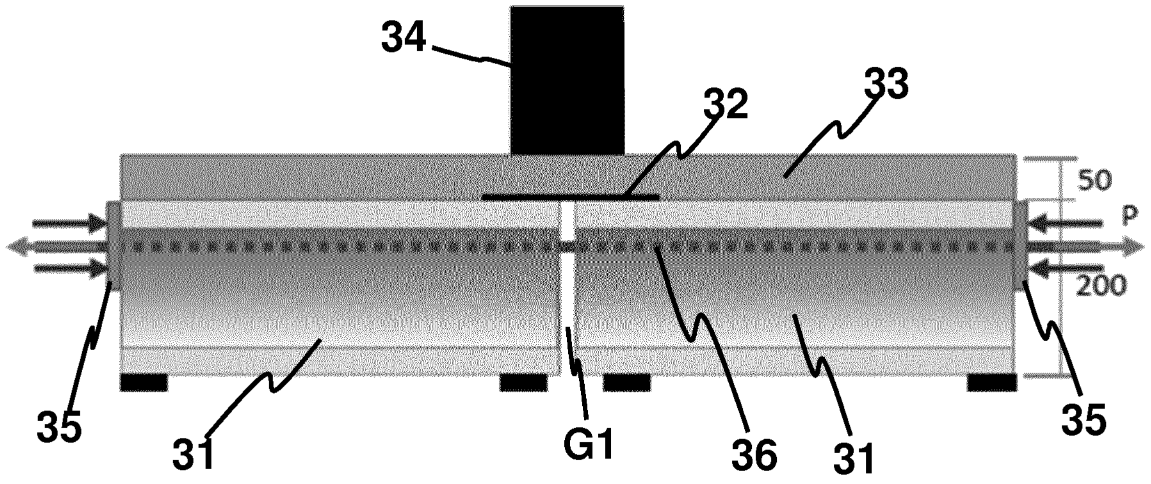
FIG. 49 is the experimental configuration of small tests for pure horizontal shear in the interface of precast floor elements and cast in situ topping

FIG. 49 shows the layout of the pure horizontal shear test, on small specimens. The precast floor elements used are segments of hollow core slabs. The dimensions are in mm. Two smooth floor elements 31 are arranged facing each other but spaced 40 mm apart with a gap G1. A horizontal plate 32 is arranged in the joint and then a topping layer 33 is poured. Next, a weight 34 is applied above the level of the joint, to prevent lifting of the floor elements 31. At the free ends of the plates, vertical pressure plates 35 are arranged, through which a tensioning armature 36 is passed. In this way the forces P can be applied at the right end, that is to say that the armature is pulled by bearing on the pressure plate 35. This causes the floor elements to be brought closer and the behaviour of the joint between the compression layer 33 and the smooth floor element 31 can be determined at the level of the interface between both.

Figure 50:
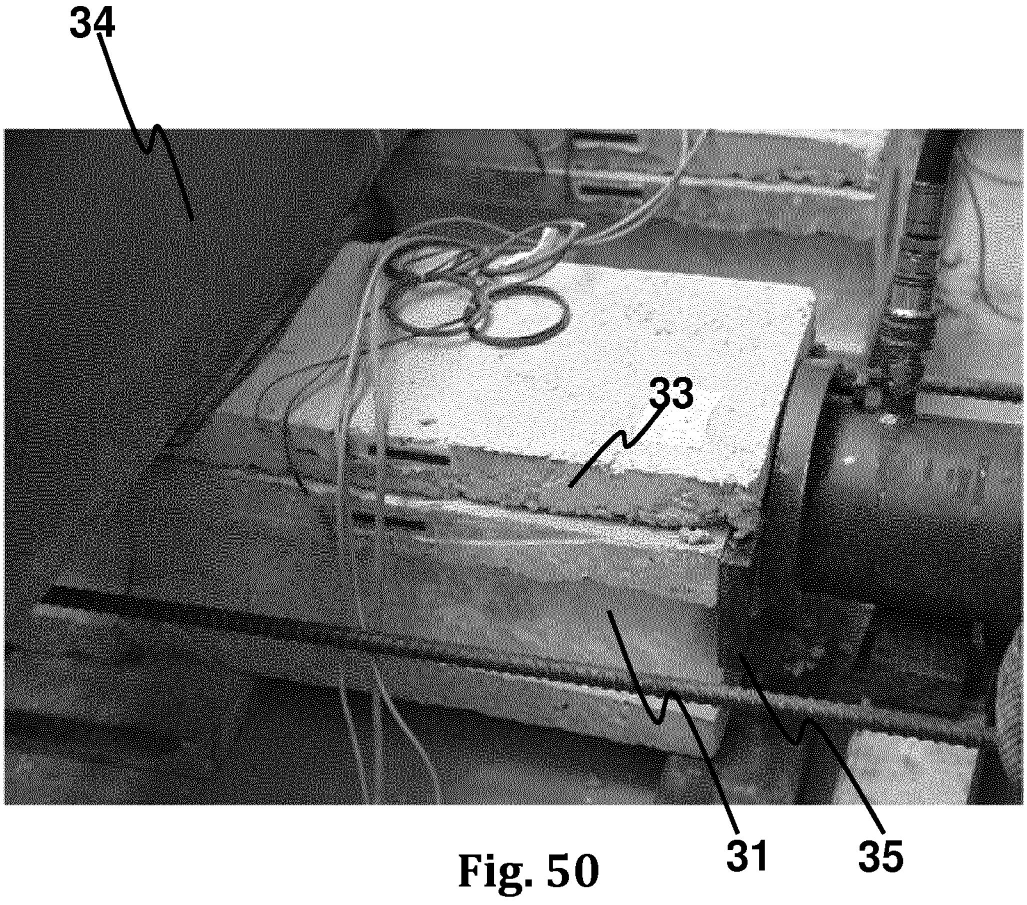
FIG. 50 is a picture of a specimen after the completion of a shear test like the one described in FIG. 49.

FIG. 50 is a picture of a specimen with smooth contact surface just after the pure horizontal shear strength test has been completed. The bond is completely broken and the topping has slipped from its original place.

FIG. 51 is a table including the results of the small scale tests. Horizontal shear strengths indicated in the table are average values of each series of tests. So the complete series of results includes strengths clearly above and under these average values.

FIG. 52 is a chart showing the ranges of shear strengths obtained in small tests Seeing all the results leads to the next conclusions:

i) There is a very noticeable dispersion in the results.

ii) The dispersion in the results can be partially explained by putting together tests where differential shrinkage is very different. Indeed, the dispersion due to differential shrinkage (which is not described here in detail) makes it clear that differential shrinkage has an important influence in modifying the shear strength of the joint.

iii) If we compare only the worst strength results of each sort of contact surface it is seen that smooth surfaces and brushed surfaces (only 2 specimens) have a neglectable shear strength, and that surfaces with holes have a minimum shear strength of 0.20 MPa; while surfaces with grooves (no matter their depth) have in all cases strengths over 0.75 MPa.

iv) If we suppress from the series of the results, those of the worse concrete for topping, the minimum shear strength of grooves of the proper depth rise to 1.00 MPa; while minimum strengths for smooth surfaces do not improve.

Description of Experimental Results for the First Variant

The prefabricated elements according to the first variant were successfully tested as described in this section.

Figure 33:
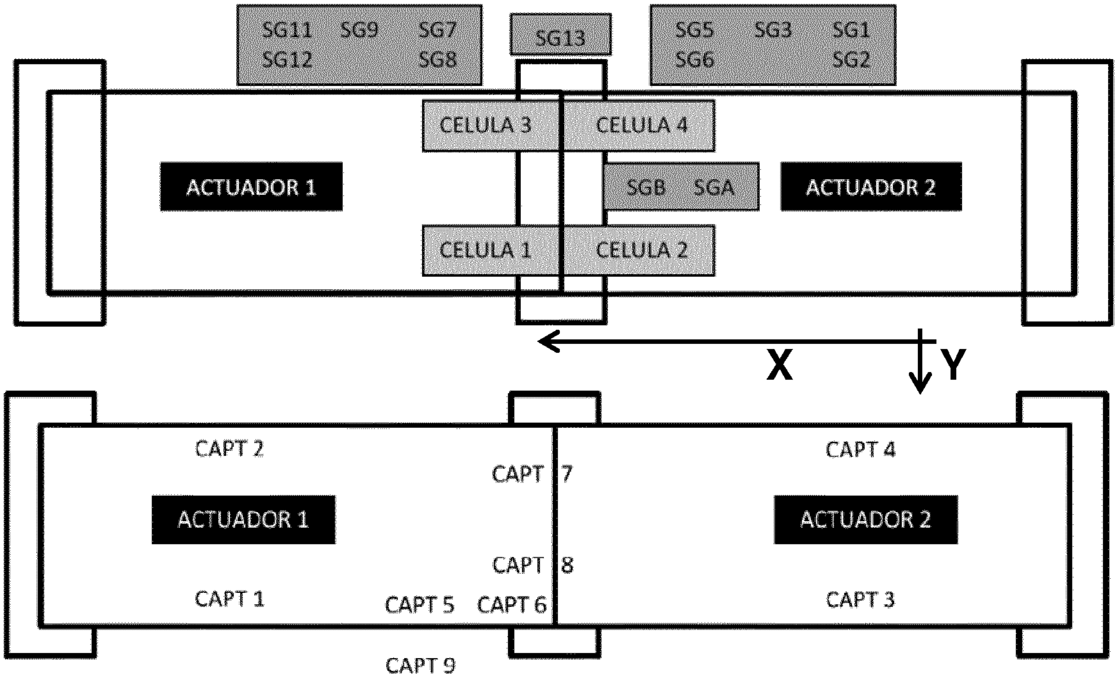
FIG. 33 is a schematic plant view of the experimental arrangement used to test the inventive structural system.
Figure 35:
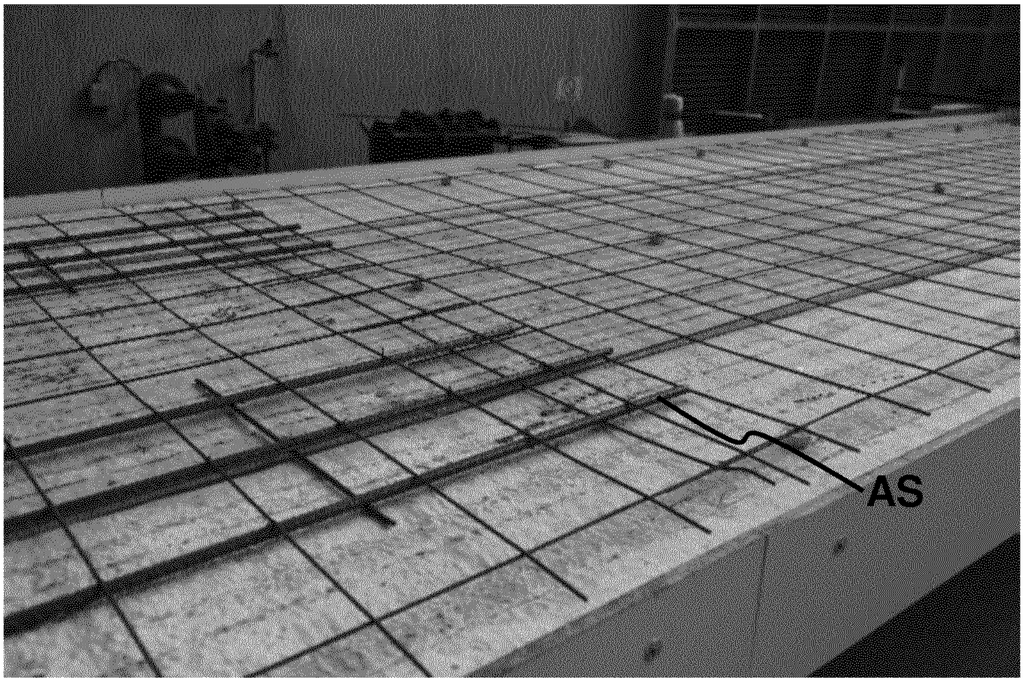
FIG. 35 is a photo of an arrangement comprising two smooth prefabricated floor elements and an armature placed thereon, before pouring the top concrete layer.
Figure 36:
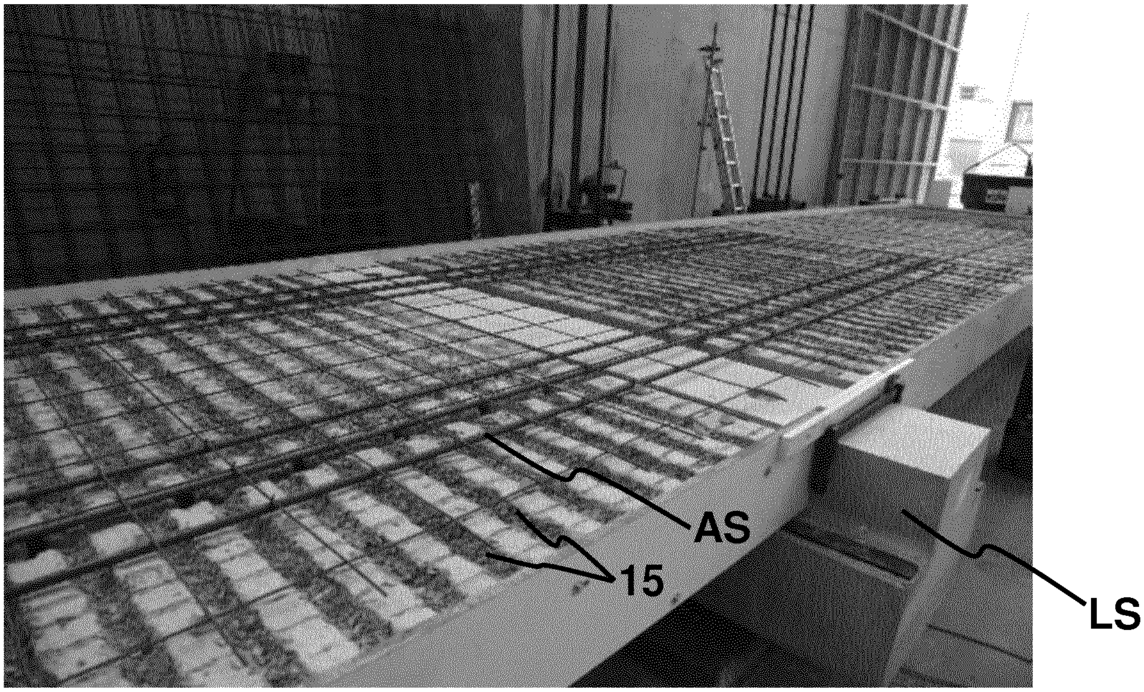
FIG. 36 is a photo of an arrangement comprising two prefabricated floor elements according to the first variant of the invention, which comprises upper continuous longitudinal grooves, the linear supporting element and an armature placed thereon, before pouring the top concrete layer.

FIG. 33 is a schematic plan view of the experimental arrangement, which comprises:

The actuators (ACTUADOR 1, ACTUADOR 2) are hydraulic jacks that apply vertical loads on each of the two spans, with an arrangement which simulates, with reasonable precision, a uniform superficial load;

The cells (CÉLULA 1, CÉLULA 2, CÉLULA 3, CÉLULA 4) are load cells that indirectly measure the vertical reaction of the linear supporting element placed at the central part of the experimental arrangement;

SG1, SG2 . . . are the strain gauges for measuring the elongations;

Upper Gauges SGA and SGB measure the upper surface elongations on the upper end portions of the slabs;

To make a valid comparison with the systems of the state of the art, the experimental arrangements of FIGS. 35 and 36 were used. The FIG. 35 arrangement is a system with flat hollow core slabs, that is to say conventional, where negative reinforcement has been placed in the topping, which is unusual in conventional practice. That has been done to put in evidence why negative reinforcement is not effective (and thus not used) in conventional practice. On the other hand, that of FIG. 36 is an installation including floor elements (in particular hollow core slabs) such as those of the present invention.

Figure 37:
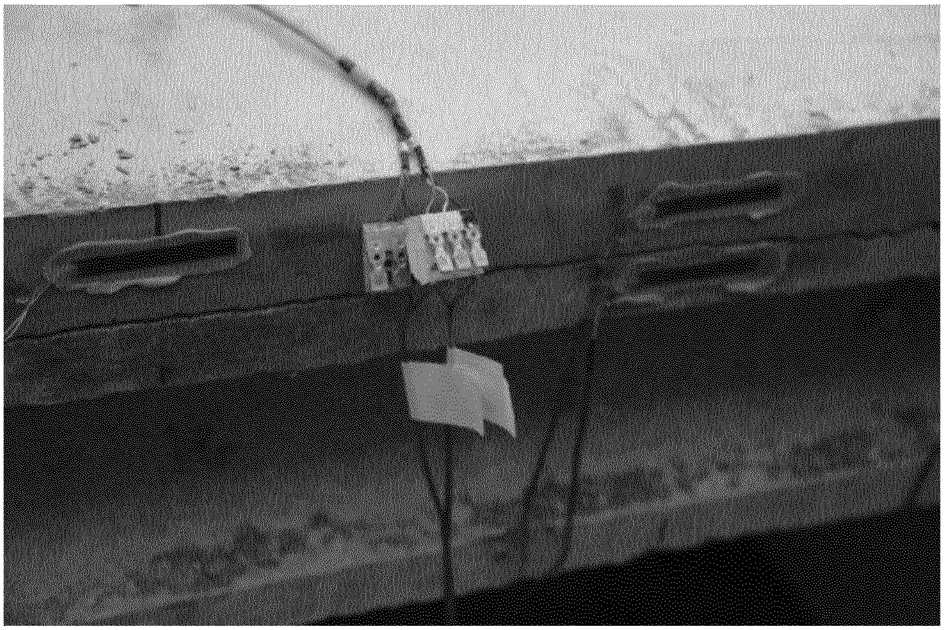
FIG. 37 is a photo of the experimental arrangement used for testing smooth prefabricated floor elements, that is, elements not including the inventive features.
Figure 38:
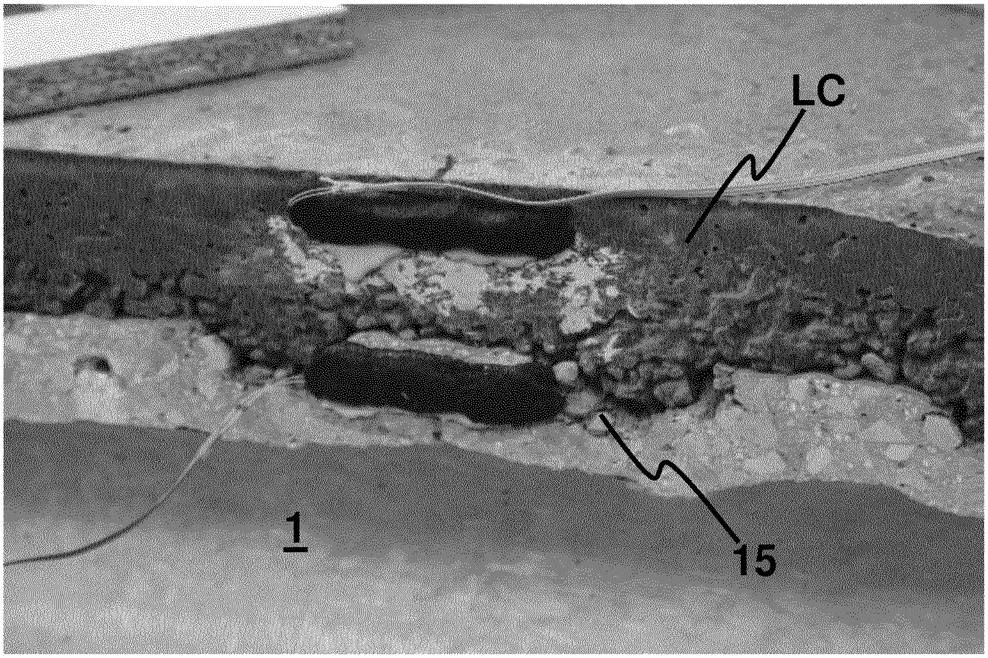
FIG. 38 is a photo of an experimental arrangement used for testing the inventive floor elements.
Figure 39:
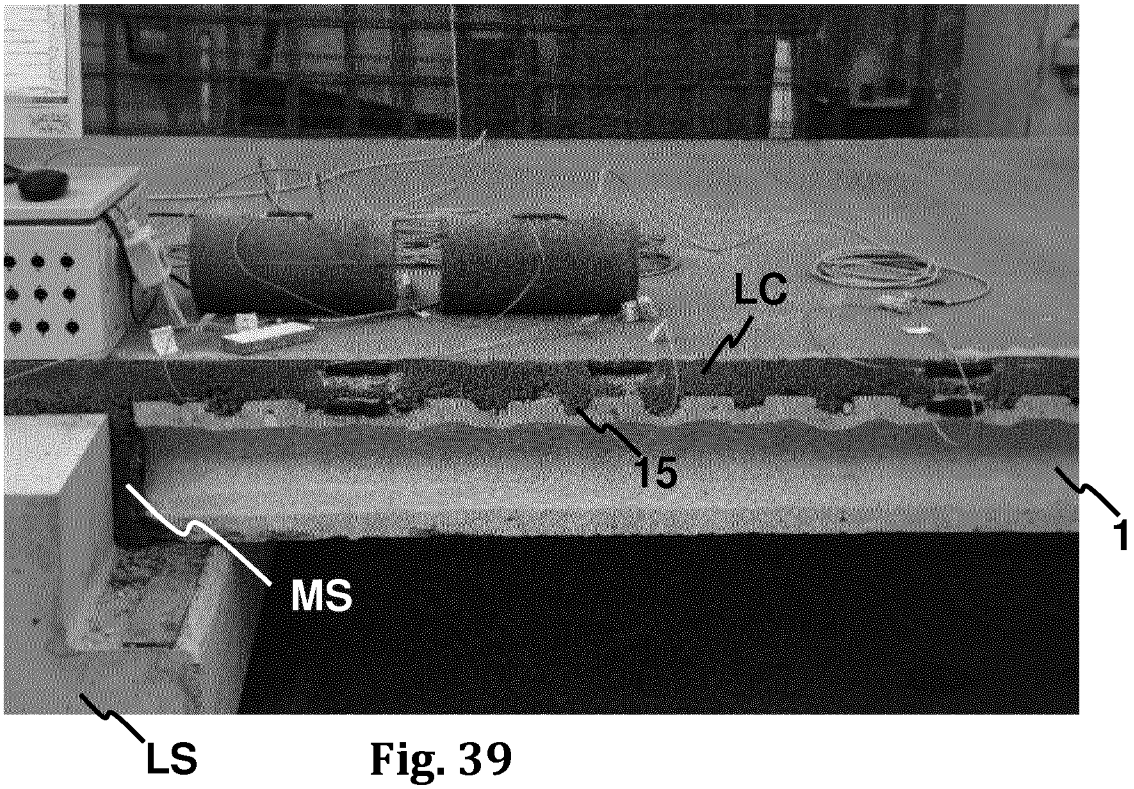
FIG. 39 is a photo of an experimental arrangement used for testing the inventive floor elements, specifically at the end of the floor element where it rests on the linear supporting element where the upper grooves are clearly visible.

A detail of the structure of FIG. 35 is shown in FIG. 37, whereas a detail of the structure of FIG. 36 is shown in FIG. 38, which clearly shows a groove 15 filled with concrete. FIG. 39 allows to appreciate the upper concrete layer LC (topping) which fills the upper grooves 15 of a floor element 1.

Figure 34:
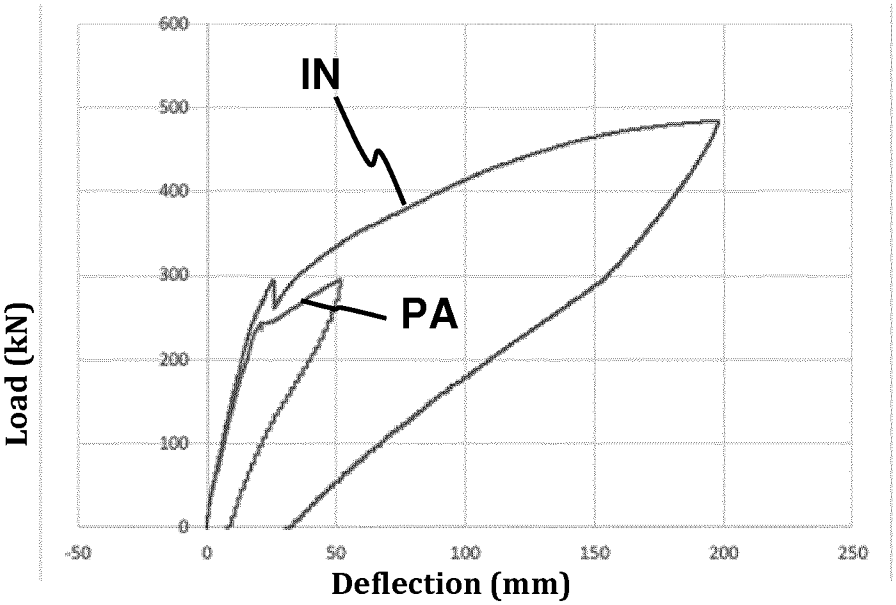
FIG. 34 is Load vs Deflection plot where the curves for a prior art floor (PA) and the inventive system (IN) are shown.

FIG. 34 shows the comparative load-deformation plots between the floor system with hollow core slabs with conventional layer (including negative reinforcement) as shown in FIG. 35 (curve PA) and a system according to the present invention (IN), shown in FIG. 36. Here it is clearly seen that the maximum ultimate load in the first case (PA) is 295 kN, while using the system of FIG. 16A, (corresponding to the moment diagram 16C), a maximum ultimate load value of 480 kN is obtained. It can also be seen that in the plot corresponding to an assembly according to the conventional technique (PA) bonding is already broken at 240 kN and from this load on the floor behaves simply as a hollow core slab; which only includes positive moment reinforcement. Thus, no proper bonding exists between the precast floor element and the topping, where the negative reinforcement is embedded. Under the load of 240 kN, when the bonding breaks, the maximum horizontal shear stress is 0.28 $N/mm^2$, and the average horizontal shear stress on the contact face of precast concrete and cast in situ concrete is 0.14 $N/mm^2$. This is totally consistent with small scale tests for horizontal shear strength.

Figure 40:
FIG. 40 is a photo of the floor made with the inventive prefabricated floor element under load.

The photo of FIG. 40 shows a floor according to the invention subjected to a load of 483 kN per actuator (hydraulic jack), where the continuous upper grooves are appreciated. It is seen that even in these extreme conditions the prefabricated part is still in good condition. Under the load of 483 kN, when the structural floor reaches ULS under flexure, bonding on the contact surface is totally intact. Under this load, the peak horizontal shear stress on the contact face of precast concrete and cast in situ concrete is 0.57 $N/mm^2$, the average horizontal shear stress on the grooved zone (end ⅓ of the length) is 0.38 $N/mm^2$; and the average horizontal shear force on the central ⅓ of the slabs is 0.10 $N/mm^2$. The stresses values on the grooved zone are 1.40 times and 2.11 times, respectively, smaller than the minimum horizontal shear strength (0.80 $N/mm^2$) of joints of the topping and precast elements with grooves as those defined in this invention, when de topping is made with the worst concrete of those included in the tests. These values are the security coefficient of the junction of the tested structural arrangement (FIG. 33). This security coefficient can go up to 1.75 times and 2.63 times, respectively, when we consider the minimum horizontal shear strength (1.00 $N/mm^2$) of joints where the second worse concrete is used for the topping.

In most common practice floors peak horizontal shear stress will be under 0.35 $N/mm^2$. This corresponds to average stresses of 0.23 $N/mm^2$ when grooves are only on the last ⅓ of floor elements, and to 0.175 $N/mm^2$ when grooves cover the hole floor element. Only under extremely severe conditions may the peak horizontal shear stress go up exceptionally to 0.50 $N/mm^2$. In all these cases the safety coefficients are summarized in the next table.

| FACTORED HORIZONTAL SHEAR STRESS (N/mm$^2$) [$\tau_d$ = 1.4* $\tau_k$] | | | SECURITY COEFF. Second worse concrete | Worse concrete |
|---|---|---|---|---|
| Highest stresses in conventional situations | Factored peak stress (end of the slab) | 0.35 | 2.86 | 2.23 |
| | Factored average stress (grooves only at ⅓ end of the slab) | 0.23 | 4.29 | 3.43 |
| | Factored average stress (grooves all over the slab) | 0.175 | 5.71 | 4.57 |
| Highest stresses in extreme situations | Factored peak stress (end of the slab) | 0.50 | 2.00 | 1.60 |
| | Factored average stress (grooves only at ⅓ end of the slab) | 0.33 | 3.00 | 2.42 |
| | Factored average stress (grooves all over the slab) | 0.25 | 4.00 | 3.20 |

Watching the results in the table, it can be seen that the solution with grooves is sufficiently secure in all cases, independently of the sort of concrete used for the topping.

Description of Experimental Results for the Second Variant

The prefabricated elements according to the second variant were tested as described in this section, and showed a much better performance than a floor made with conventional precast floor elements.

The experimental arrangement to test the floor elements of the second variant is very similar to that of the first variant. So that the schematic experimental arrangement showed in FIG. 33 is appropriate to describe the tests of the second variant.

Figure 53:
FIG. 53 is a conventional structural floor under construction, to be tested. The floor was completed only with concrete poured in the lateral joints a, and negative reinforcement, but no topping was poured.
Figure 54:
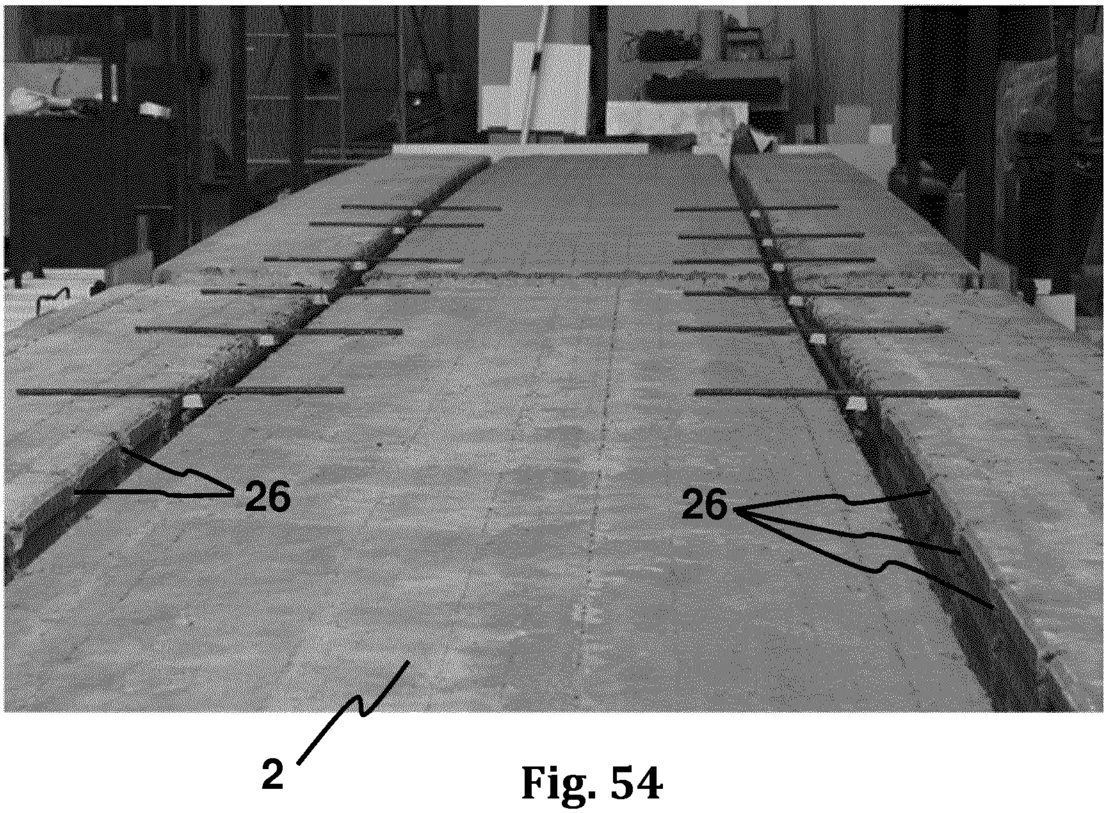
FIG. 54 is a structural floor under construction, being prepared to be tested, including floor elements of the second variant (2), with lateral grooves (26).

To make a valid comparison with the systems of the state of the art, the experiment was performed on the floors shown in FIG. 53 (conventional floor elements) and in FIG. 54 (second variant floor elements). Notice how in FIG. 54 floor elements 2 have lateral grooves 26, while conventional floor elements in FIG. 53 have smooth lateral faces, very badly suited (or totally unable) to transfer shear forces parallel to the longitudinal direction.

Figure 55:
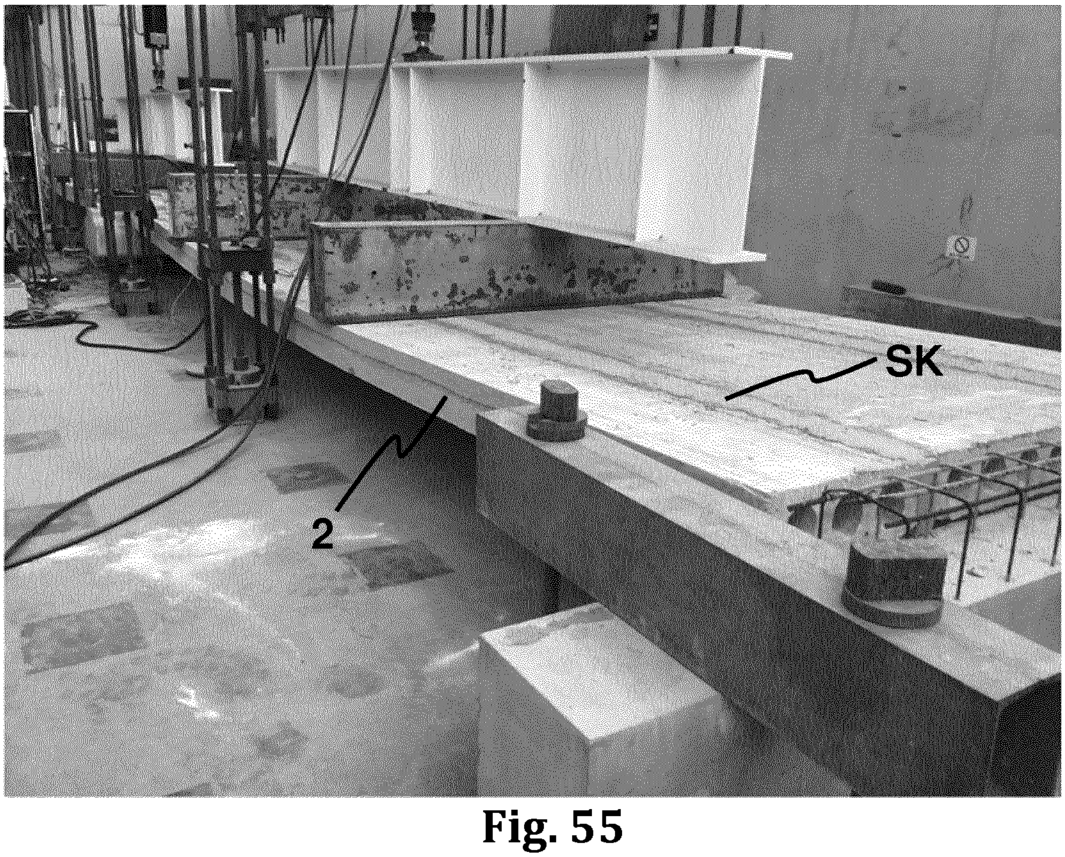
FIG. 55 shows a completed structural floor, with floor elements of the second variant (2) under intense test loads.

FIG. 55 shows a structural floor including floor elements 2 with lateral grooves 26, under heavy load.

Figure 56:
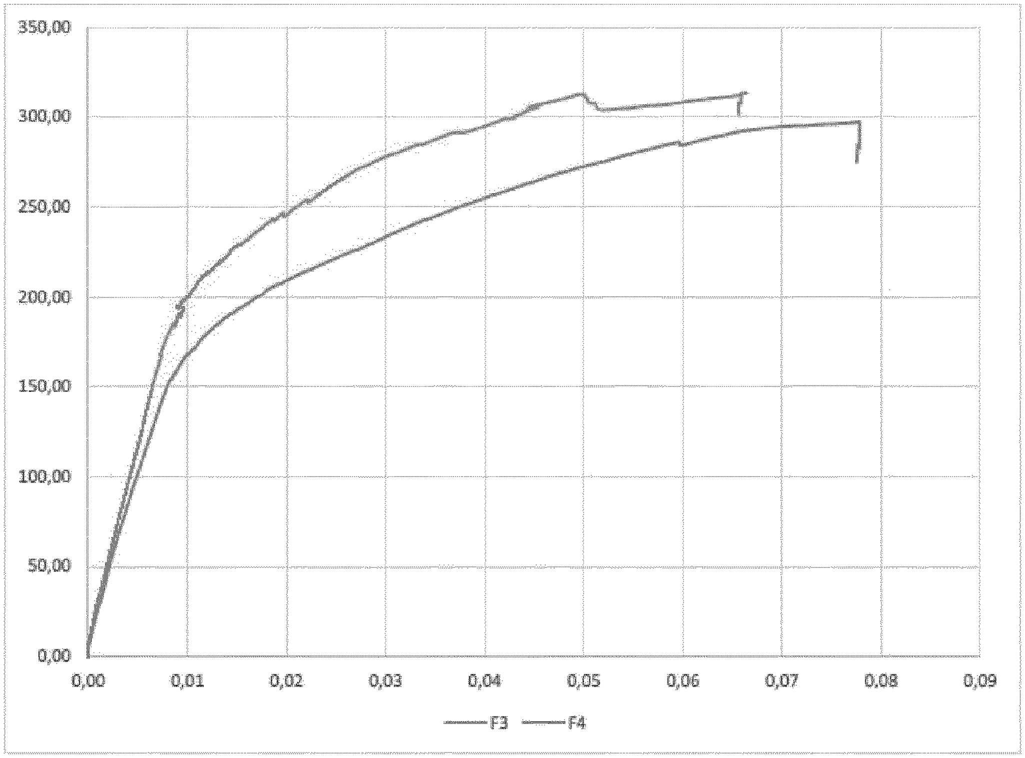
FIG. 56 shows a Load-Gyration plot comparing the performance of the conventional floor (FIG. 53), named F3, and the floor made with floor elements of the second variant (FIGS. 54 and 55).

FIG. 56 Shows the Load-gyration plot of the two structural floors tested, corresponding to a first cycle of load. F3 is for the conventional floor, and F4 is for the structural floor with floor elements 2 with lateral grooves 26. After this plot, at a first impression the two floors seem to have a very similar performance. However, after it is clearly appreciated that the F4 performs much better than F3. It is pointed out that the transverse confinement would yield even better results.

Figure 57:
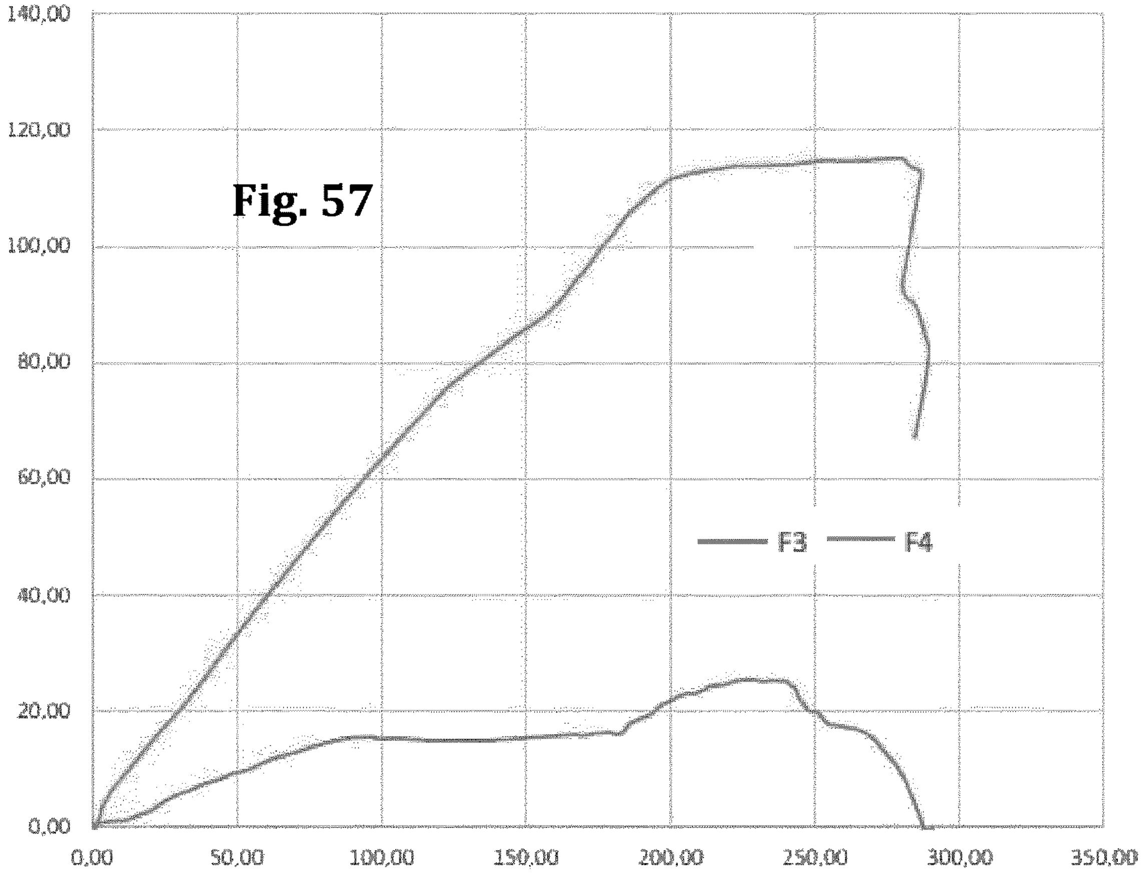
FIG. 57 shows a Negative Moment-Load plot comparing the performance of the conventional floor (FIG. 53), named F3, and the floor made with floor elements of the second variant (FIGS. 54 and 55).

FIG. 57 shows the Negative Moment-Load plot. The negative moments of this plot has been computed from the reactions on the load cells placed under the linear support element where all floor elements are supported. From this plot, it can be seen a very different behaviour of the two structural floors. F3, the conventional structural floor, behaves very poorly, when compared to F4, which includes floor elements 2 with lateral grooves 26. For the floor F4, the resisted negative moment increases almost linearly as load increases. For a load of 200 kN, the negative moment is 111 kN·m; while for the same load, the negative moment is 21 kN·m for the floor F3 (which is less than 5 times the negative moment resisted by F3). This big difference puts in evidence that conventional floors are almost unable to withstand negative moments, and work almost as pinned-pinned floors, even when they include considerable negative reinforcement.

The plot of FIG. 57 also explains why the behaviour of the two floors seems so similar, when reading the Load-Gyration plot (FIG. 56). In FIG. 57, it is seen that when the load on the F4 goes beyond 200 kN, the negative moment increases very slowly, and when the load goes beyond 278 kN, the negative moment is abruptly reduced to 81 kN·m. These two behaviours, but mostly the decrease in negative moments beyond the load of 278 kN, indicates an inappropriate behaviour of the floor: the negative reinforcement ceases to work properly. This improper behaviour is due to a certain slipping of the negative reinforcement AK from the concrete of the rib or shear key SK. This slipping is due to a loss of bonding due to a longitudinal crack along the reinforcement AK, caused by the lack of lateral confinement of the floor elements. It is to be noticed that the bonding failure occurred for a load very near to the yielding load of the negative reinforcement (estimated to occur for a load of 280 kN·m); which means that even without lateral confinement, the structural floor F4 was about to function properly and reach its negative moment-strength peak. This malfunction of the tested specimen F4 lead it to a behaviour, at the end of the test, similarly to a pinned-pinned floors, thus similarly to conventional floors. This explains why in FIG. 56 both floors reach similar maximum loads.

Figure 58:
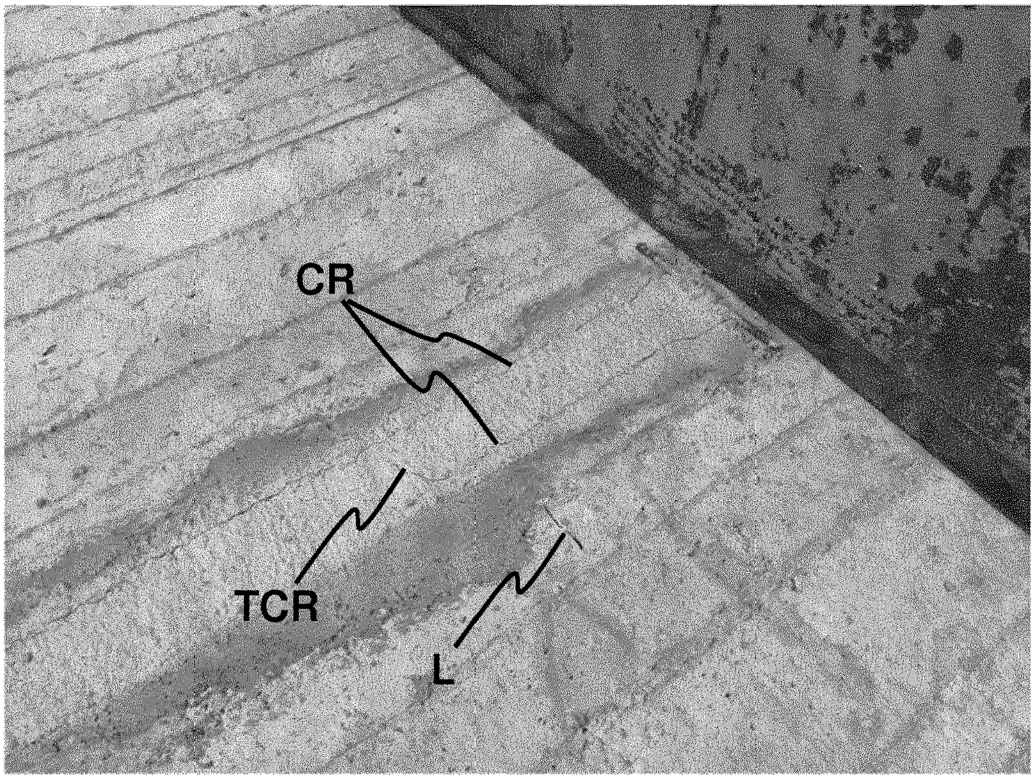
FIG. 58 shows cracks, in a detailed view of the conventional structural floor previously shown in FIG. 53.

FIG. 58 shows how in slab F3, conventional structural floor, longitudinal cracks CR appear all along the contact junction of precast floor elements and the cast in situ rib. These cracks appear already for very low loads during the test. Moreover, in the figure, which is taken when the floor is under a load of 100 kN approximately, a transverse crack TCR cutting the cast in situ rib can be seen. These cracks coincide quite exactly with the point where the negative bar ends (indicated with a line L on the floor element). This sort of transverse crack, combined to the cracks in the longitudinal direction, shows clearly that the cast in situ rib (with the negative reinforcement embedded therein) has detached from the precast floor elements, and slipped. This cracks, and their associated loss of negative strength of the structural floor, are totally consistent with the Negative Moment-Load plot of F3 (FIG. 57), where beyond the load of 100 kN the floor is almost unable to withstand more negative moments.

Figure 59:
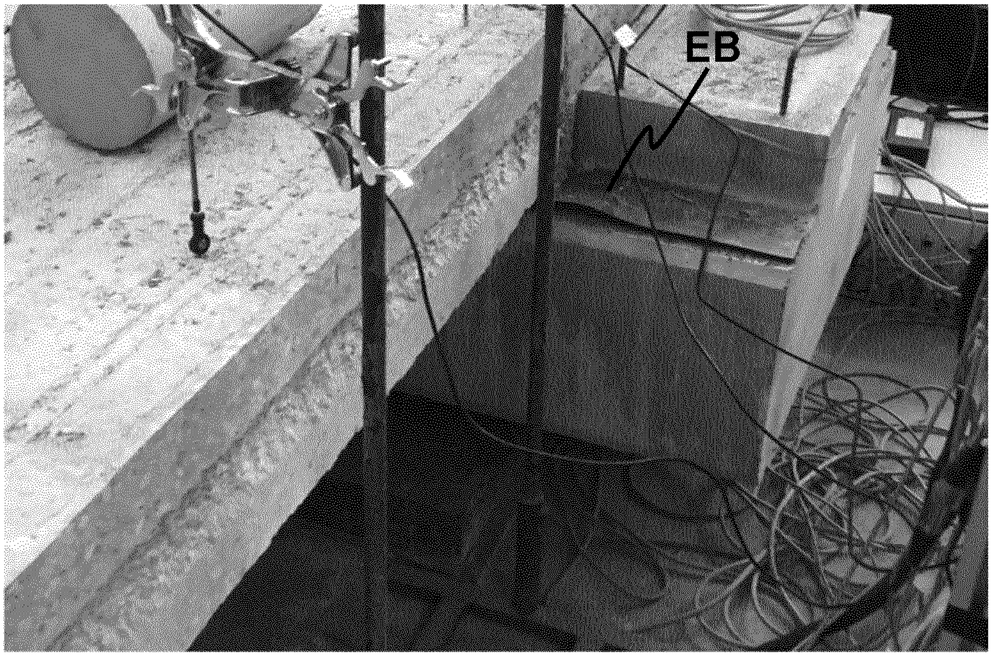
FIG. 59 shows a detail of the bearing of a floor element on a linear supporting element in the conventional structural floor previously shown in FIG. 53.

FIG. 59 shows how structural floor elements, which are not laterally confined, move laterally during the test. This lateral movement is noticeable by the fact that the elastomeric band EB locally is uplifted.

FIG. 60 shows severe damage in floor elements and cast in situ ribs, in the test with conventional floor elements. Diagonal cracks in the slabs are parallel to maximum compression forces (struts) due to a certain (small) negative moment strength of the floor.

Figure 61:
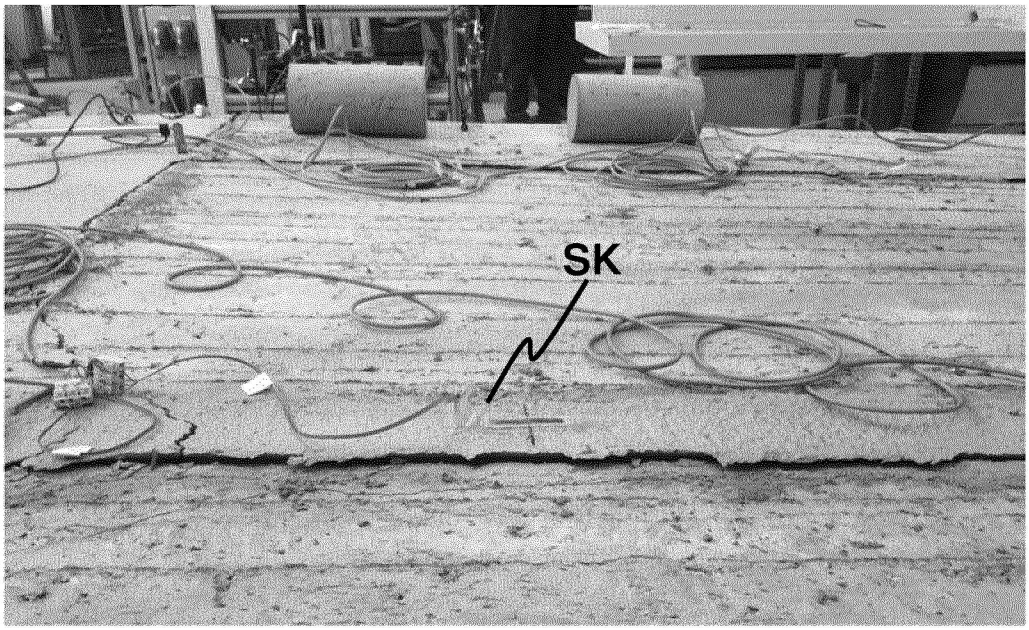
FIG. 61 shows, in a detailed view, damages appeared during the test performed on the conventional structural floor previously shown in FIG. 53.

FIG. 61 shows the cast in situ ribs SK uplifted in comparison to the floor elements. This behaviour occurs due to two related phenomena. Firstly, the differential deflection of the floor elements (acting as pinned-pinned elements) and the cast in situ rib (acting as a cantilever) and secondly the lack of proper shear reinforcement to enable the cast in situ rib to resist the strong vertical shear force due to this differential deflection.

FIG. 62 shows the catastrophic state in which ended the structural floor F3, after finishing abruptly, due to a fragile vertical shear failure of the floor element. The picture shows also important vertical shear cracks in the rib. This failure is a proof of how insecure is reinforcing and loading a conventional structural floor as if it was able to withstand negative moments.

Figure 63:
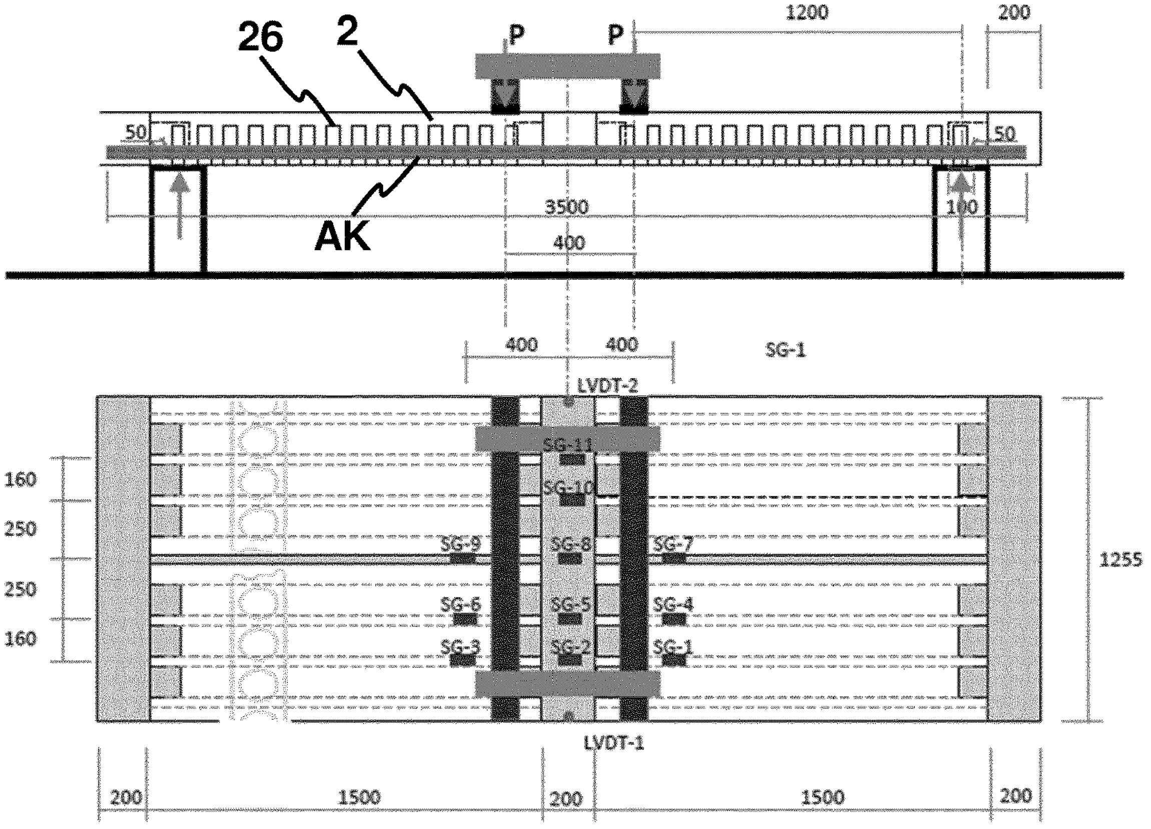
FIG. 63 is a scheme of the experimental arrangement for a mid-size test done on structural floors including floor elements (2) with lateral grooves (26), to assess the importance of shear reinforcement (VK) placed within the cast in situ shear key (SK).

Another series of tests have been performed to assess the importance of placing shear reinforcement in structural floors including floor elements 2 with lateral grooves 26. FIG. 63 shows the experimental arrangement to assess the shear strength of the cast in situ ribs. To facilitate the test, the structural floor has been completely reversed, so that the loads exerted downwardly by the hydraulic jacks HJ on the floor are simulating the upward reaction exerted by the linear supporting element supporting two lateral spans of a structural floor. So, the prefabricated floor elements 2 are reversed (with the prestressed reinforcement in the upper face), and the reinforcement AK of the cast in situ shear key SK is placed in the bottom face, and thus resists moments causing tension in the lower face.

Figure 64:
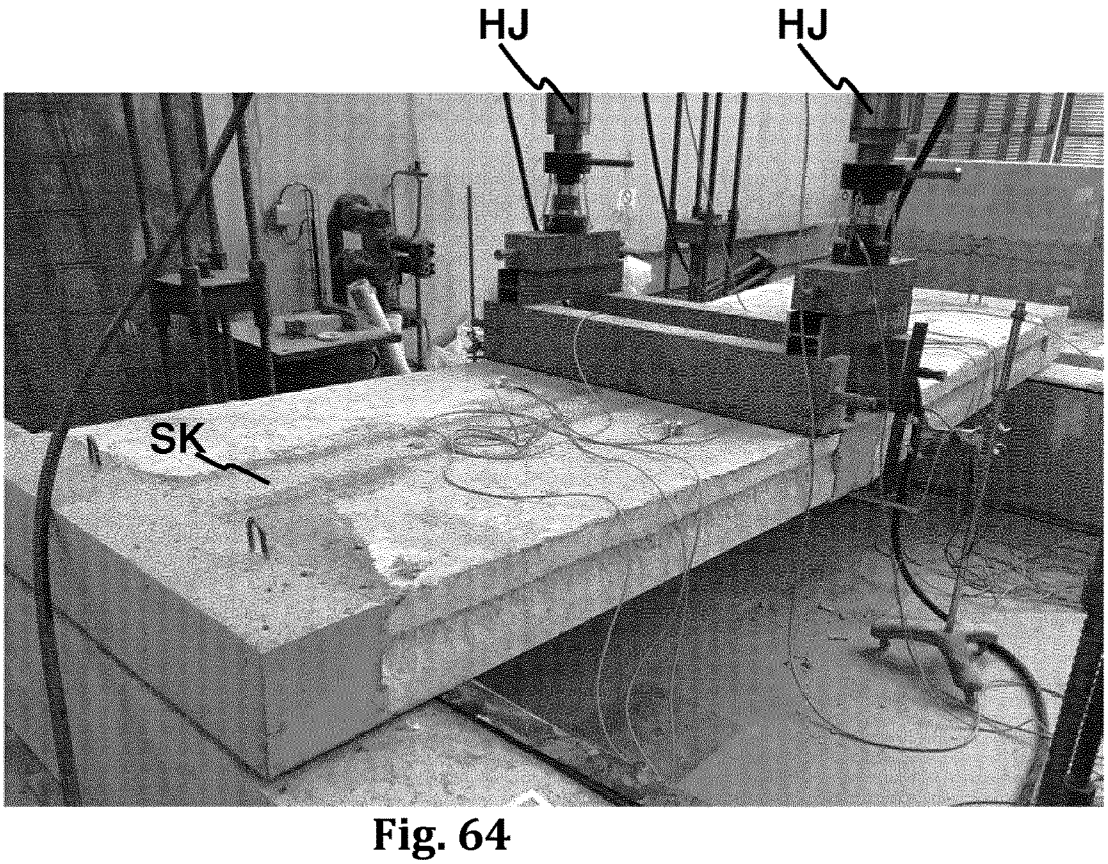
FIG. 64 is a picture of a specimen being tested with an experimental arrangement such as the one described in FIG. 63.

FIG. 64 shows a specimen deflecting under intense test load applied with the experimental arrangement depicted in FIG. 63.

Figure 65:
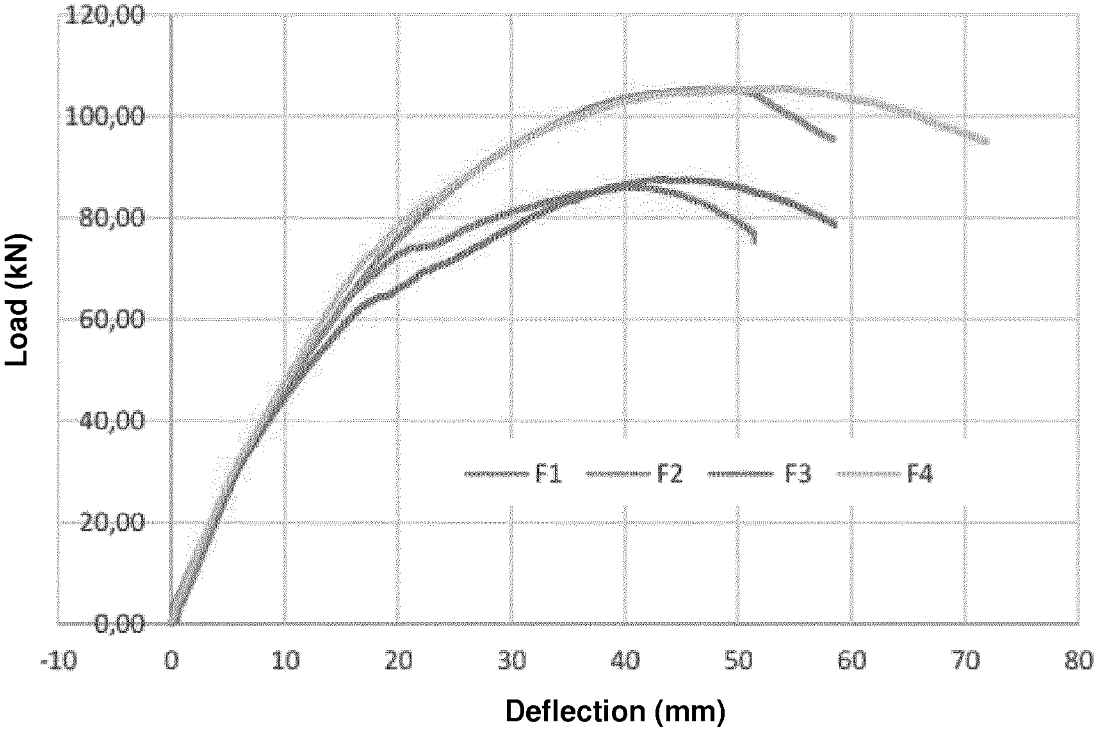
FIG. 65 shows a Load-Deflection plot of the tests performed on four specimens, after the experimental arrangement described in FIG. 63.

The experimental arrangement of FIG. 63 and FIG. 64 comprises:

- The actuators, that are hydraulic jacks HJ that apply vertical loads at the two ends of the central tie beam, with an arrangement which simulates, with reasonable precision, the reversed moments diagram on a linear bearing supporting two symmetrical spans under a uniform superficial load;
- SG1, SG2 . . . are the strain gauges for measuring the elongations on the floor elements, on the shear key and on the central tie beam (which simulates the linear supporting element);
- LVDT-1, LVDT-2 are gauges on supports, to measure the vertical deflection of the specimen FIG. 65 shows the Load-Deflection plots of 4 tests performed with the arrangement described in FIG. 63 and FIG. 64. All the specimens were identical in all details, but two of them (F1 and F3) did not include vertical shear reinforcement VK embedded in the cast in situ shear key SK. None of the specimens led the reinforcement AK of the shear key to yielding. A very high amount of reinforcement AK was placed to achieve this result, to find other failure modes. The two specimens including shear reinforcement F2, F4 achieved a maximum load of 105 kN. This is a 21% more than the maximum load achieved by F1 (86 kN) and F3 (88 kN), which did not include shear reinforcement VK. Both these results, and the brittle shear failure of the floor shown in FIG. 62 show the importance of placing shear reinforcement VK in shear keys SK in this sort of floors.

Description of Installations Destined to Manufacture the Inventive Floor Elements Movable Formwork for Dry Concrete Precasts As shown in FIGS. 41 a 48, the invention also relates to installations IM1, IM2, IM3 for manufacturing prefabricated floor elements 1, 2, 3 according to any of claims 1 to 6 using dry concrete, which comprises:

- A formwork movable according to a longitudinal direction X;
- The formwork comprising a front wall I1, two lateral die walls I2, I3, and an upper die wall I4;
- A lower wall of the formwork being defined by the casting bed F;
- A hooper I5 having its lower outlet I6 placed between the front wall I1 and the upper wall I4;
- An interior section mould I7 which extends longitudinally beyond the end of the upper die I4 and the lateral dies I2, I3.

For imprinting the grooves, either lateral or upper, the installation comprises at least a rolling die I8, I9, I10 placed after the formwork I2, I3, I4 in the longitudinal direction X, there where the mould I7 extends, the rolling die I8, I9, I10 having continuous surface teeth I8T, I9T, I10T having axial direction of the die I8, I9, I10, the axis Γ8, Γ9, Γ10 of the die I8, I9, I10 being perpendicular to the longitudinal direction X, such that grooves 15, 26, 36 can be formed on the lateral 12, 22 or upper faces 14, 24 of the prefabricated floor elements 1, 2, 3.

Figure 44:
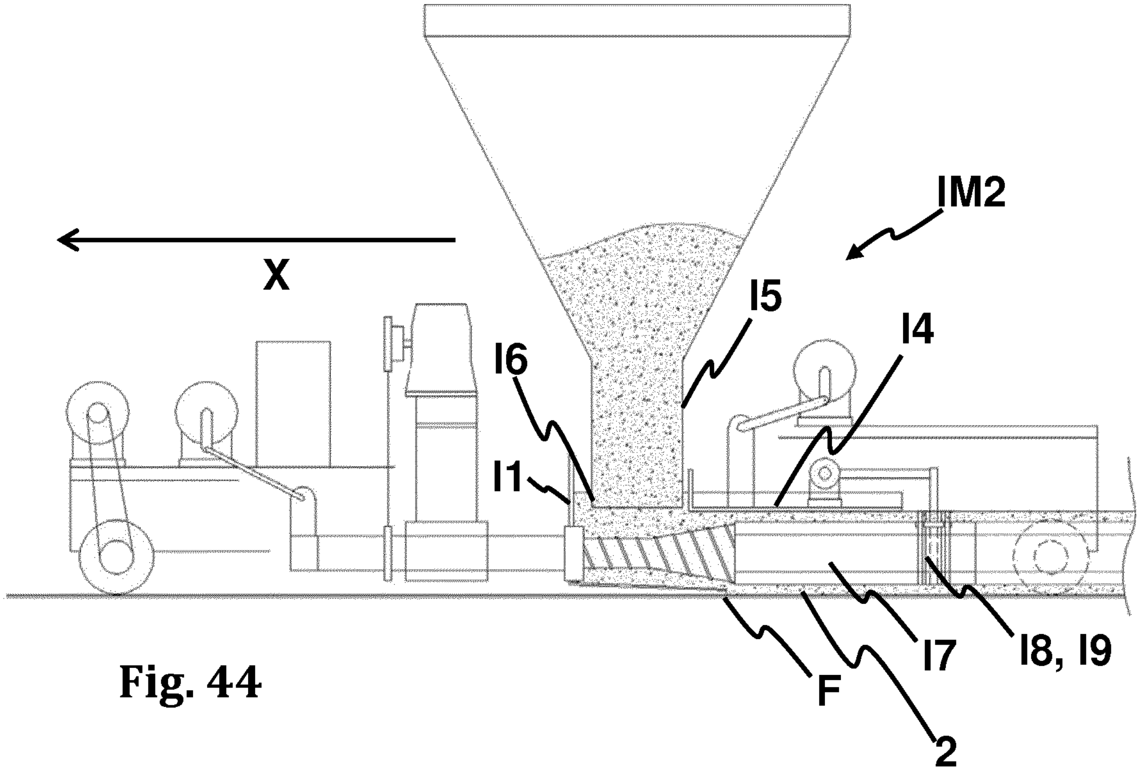
FIG. 44 is a vertical section according to the longitudinal direction of an inventive installation used for manufacturing prefabricated floor elements according to the second variant.
Figure 45:
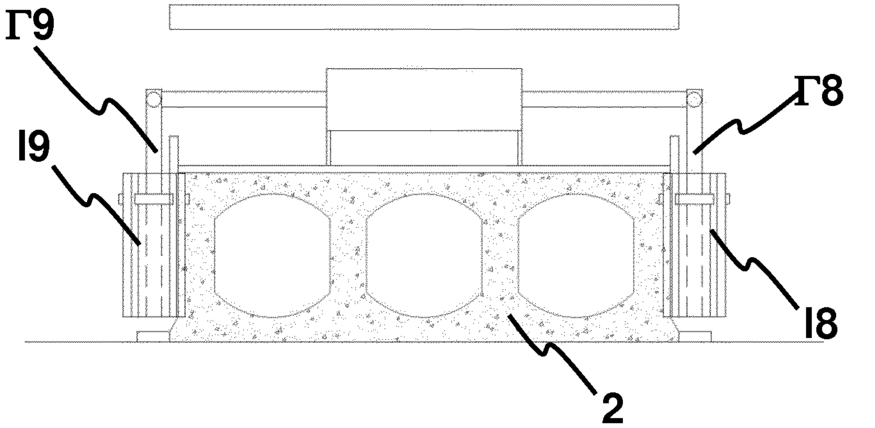
FIG. 45 is a vertical section according to the transversal direction of the installation of FIG. 44.
Figure 46:
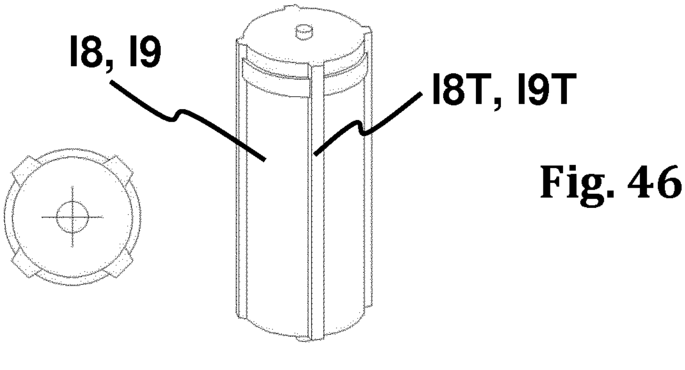
FIG. 46 shows a perspective view of the rolling die used for imprinting the continuous lateral grooves and the upper tabs on the prefabricated floor elements according to the second variant.

According to an embodiment, shown in FIGS. 44 to 46, the installation comprises two rolling dies I8, I9 having vertical axis and arranged after each lateral die wall I2, I3, such that they allow to cast vertical continuous grooves in the prefabricated floor elements 2.

According to another embodiment, shown in FIGS. 41 to 43, the installation comprises a rolling die I10 having a horizontal axis and arranged after the upper wall I4, such that it allows to cast horizontal continuous grooves in the prefabricated floor elements 1.

A further embodiment is the result of combining the previous two embodiments. That is, an installation having two rolling dies having vertical axis and a rolling die having a horizontal axis, as shown in FIGS. 47 and 48; such that they can cast vertical and/or horizontal grooves in the prefabricated floor elements 1, 2, 3.

Figure 47:
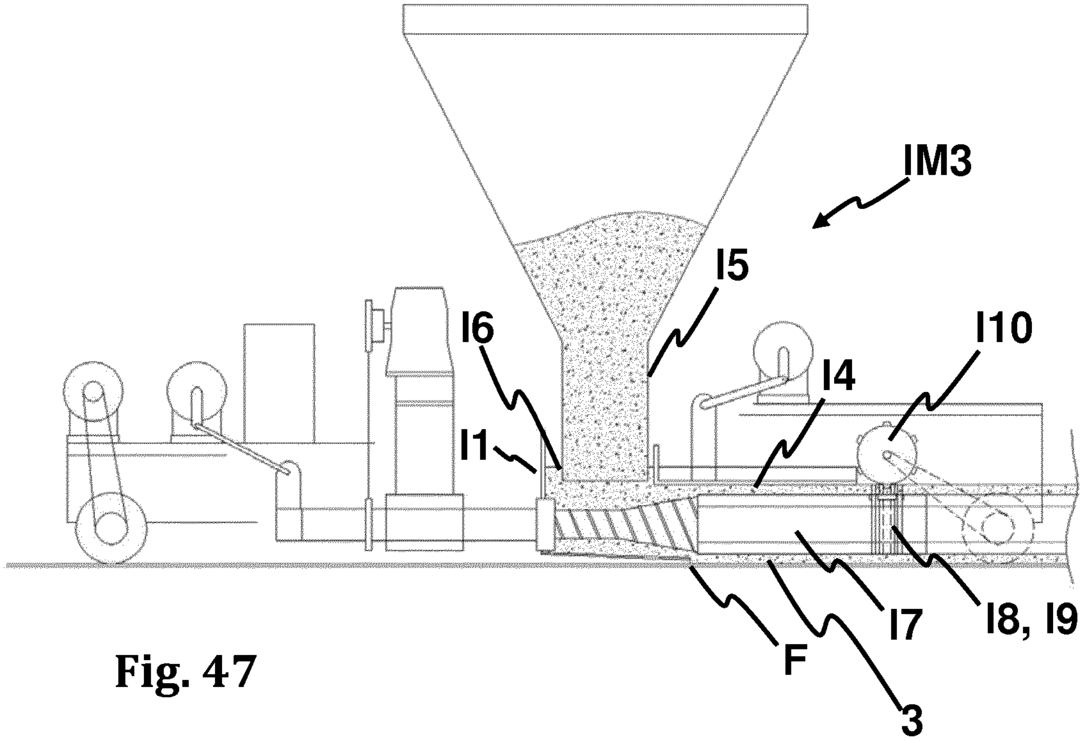
FIG. 47 is a vertical section according to the longitudinal direction of an inventive installation used for manufacturing prefabricated floor elements according to the third variant.
Figure 48:
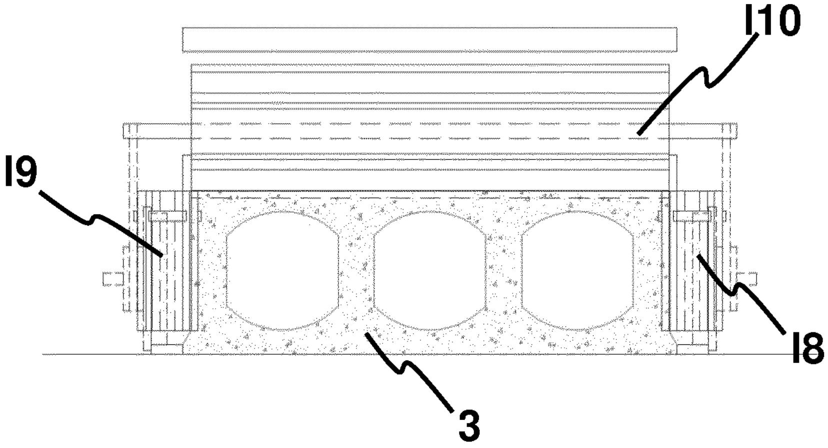
FIG. 48 is a vertical section according to the transversal direction of the installation of FIG. 47.

A particular embodiment of the installation IM3 depicted in FIGS. 47 and 48 is one that includes means, such as a clutch, to engage and disengage the rolling dies I2, I3, I4. Such a clutch enables installation I3 to effectively produce precast elements 1 or 2 or 3, depending on which of the rolling dies are engaged at the same time.

A particular embodiment of installations IM1, IM2, and IM3 is one that includes a device for counting the length of produced slab including grooves.

A particular embodiment of installations IM1, IM2, and IM3 is one that includes at list a device able to cause vibration to at least one of the rolling dies I2, I3, I4, while the mentioned rolling die rolls around its axis. This vibration while rotating enables a more appropriate compaction of the concrete when passing through the dies.

Formwork for Self-Consolidating Concrete Precasts

Figure 66:
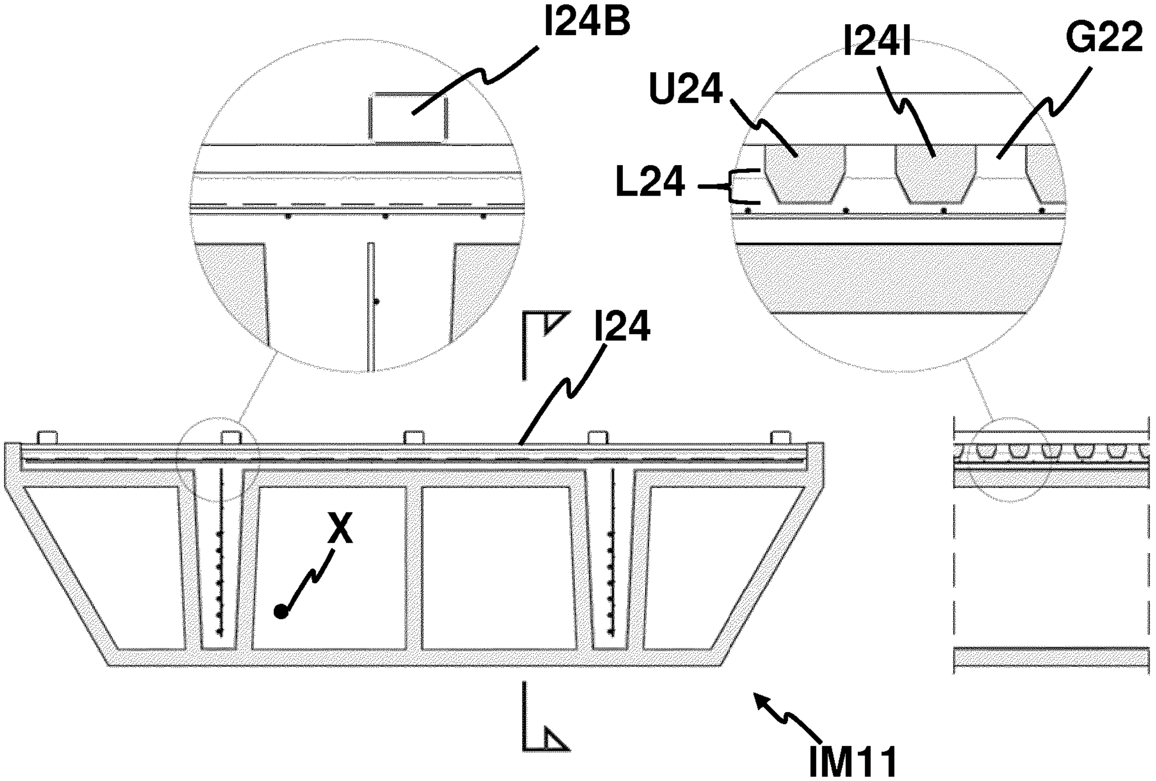
FIG. 66 shows different details of an alternative installation for casting the inventive floor elements.
Figure 67:
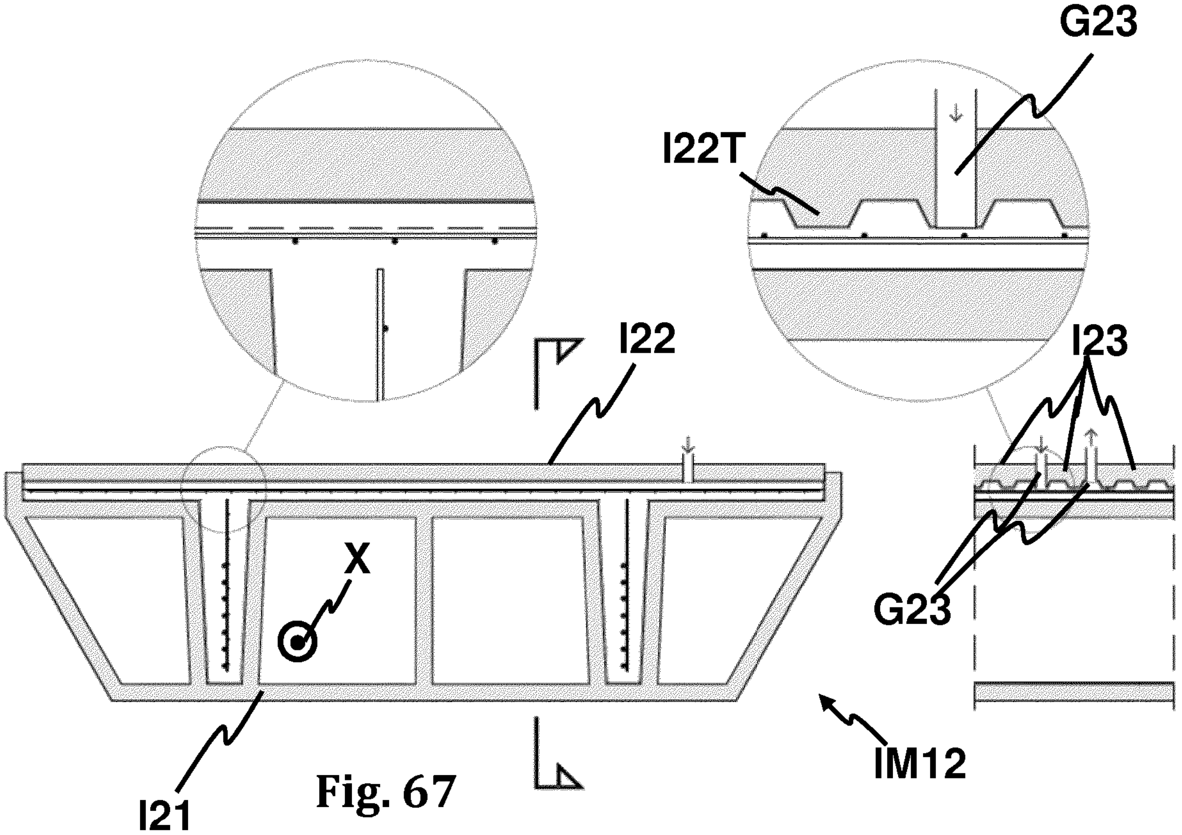
FIG. 67 shows different details of another alternative installation for casting the inventive floor elements.

As shown in FIGS. 66 and 67, the invention also relates to another way to produce the inventive prefabricated floor elements 1, 2, 3 by using self-consolidating concrete.

FIG. 66 shows an installation IM11 comprising a formwork elongated in a longitudinal direction X, the formwork comprising a lower part I21 and a removable upper part I24 having teeth I24T perpendicular to the longitudinal direction X, such that grooves 15, 26, 36 can be formed on the upper faces 14, 24 of the prefabricated floor elements 1, 2, 3.

In this case, the removable upper part I24 is formed by a plurality of former structural profiles I241 perpendicular to the longitudinal direction X. The mentioned upper part I24 is removeable to allow for the demoulding of the precast member once it has hardened, but it typically stays stationary during the hardening process of the concrete.

The lower section L24 of the former structural profiles I24I defining a decreasing section that defines the section of the grooves 15, 26, 36, the upper section U24 of the former profiles I24I defining a constant section.

Therefore, to mold the floor elements 15, 26, 36 with self-consolidating concrete, the volume of the lower part of the mold must be filled up to the section change between the lower L24 and upper U24 section of the former profiles I24I.

The space G22 between each elongated former element I23 makes it easy to pour concrete, and avoids the formation of interior air bubbles, as the air can easily be evacuated by the multiple spaces.

The placing of the self-consolidating concrete may either be carried out once the upper part I22 is assembled to the rest of the installation IM11, or may the upper part I22 be put in place after the placing of concrete. In this second case, the upper part I22 must be placed right after placing the concrete, while this is still liquid, so that the elongated former elements can properly displace the liquid to form the grooves.

The upper part I24 further comprises joining profiles I24B having the longitudinal direction X and joined to an upper surface of the former profiles I24I, such that the former profiles I24I and the joining profiles I24B form a removable grid.

FIG. 67 shows an installation IM12 comprising a formwork elongated in a longitudinal direction X, the formwork in turn comprising a lower part I21, and a removable upper part I22 having teeth I22T perpendicular to the longitudinal direction X, such that grooves 15, 26, 36 can be formed on the upper faces 14, 24 of the prefabricated floor elements 1, 2, 3.

In the installation IM12, shown in FIG. 67, the upper part I22 has a lower perimeter equal to the shape of the superior grooves of precast floor elements 1, 3; and the upper part 122 comprises at least to ducts connecting the interior of the formwork to the interior. One of the ducts, used to inject liquid concrete in the formwork, and the other one to allow the evacuation of the air enclosed in the formwork, as it is pushed out by the liquid concrete.

In this text, the term "comprises" and its derivations (such as "comprising", etc.) should not be understood in an excluding sense, that is, these terms should not be interpreted as excluding the possibility that what is described and defined may include further elements.

Thought the document one of the main features that characterizes the invention is the existence of "continuous grooves". However one must understand that in the scope of this invention are also included "continuous protrusions". In fact, grooves and protrusions are only two ways of referring to a same thing. One can understand that between each pair of grooves there is a protrusion or vice versa. Thus, defining groves is equivalent to indirectly defining protrusions.

The invention is obviously not limited to the specific embodiments described herein, but also encompasses any variations that may be considered by any person skilled in the art within the general scope of the invention as defined in the claims.

The invention claimed is:

1. A prefabricated floor element (1) configured to span directly from end to end, bearing at both ends exclusively supported on permanent primary structural members (LS), having a continuous steel reinforcement from one end to the other embedded in the prefabricated floor element (1), having an elongated shape with a longitudinal direction (X), a transversal direction (Y), a height direction (Z), two end faces (11) which delimitate the element (1) in the longitudinal direction (X), two lateral faces (12) which delimitate the element (1) in the transversal direction (Y), a lower face (13) and an upper planar face (14) that delimitate the element (1) in the height direction (Z) are defined, characterised in that the prefabricated floor element comprises transversal continuous upper grooves (15) on the upper planar face (14) that extend from each lateral face (12) and into the upper planar face (14) extending on the upper planar face (14) from a first of the lateral faces (12) through a second of the lateral faces (12).

2. The prefabricated floor element (1) according to claim 1, further comprising a lower tab (TL) on a lower edge of the lateral faces (12), and an upper tab (TS) on an upper edge of the lateral faces (12) the lower tab (TL) being longer than the upper tab (TS) in the transversal direction (Y).

3. The prefabricated floor element (1) according to claim 2, which comprises lateral grooves (16, 26, 36) on each of the lateral faces (12).

4. The prefabricated floor element (1) according to claim 1, wherein a dimensionless thickness of a cross section of the floor element is below 0.6.

5. A structure comprising the prefabricated floor element (1) according to claim 1, which comprises:

a linear supporting element (LS) which supports one end of the prefabricated floor element (1) such that in the linear supporting element (LS) a supporting surface (S1) is defined and:

a moment resisting system (MS) arranged on the linear supporting element (LS) and facing an end face (11) of the prefabricated floor element (1), an upper concrete layer (LC) poured all over the upper planar face of the prefabricated floor element (1), characterised in that the prefabricated floor element (1) spans directly from end to end bearing at both ends exclusively supported on permanent primary structural members (LS), not requiring juxtaposition of prefabricated floor elements in the direction of the span to form structural floors, and that structure comprises armatures (AS) arranged along the longitudinal direction (X), such that a portion of the armatures (AS) is embedded in the concrete layer (LC) and another portion of the armatures (AS) extends such that the another portion of the armatures (AS) is embedded in the moment resisting system (MS), such that the armatures (AS), when acted under tension forces, can transmit forces to the concrete layer (LC), and the concrete layer (LC) can transmit forces to the prefabricated floor element (1) through the upper grooves (15) on the upper planar face (14), and then a negative moment is transmitted from the moment resisting system (MS) to the prefabricated floor element (1), wherein the moment resisting system (MS) is an upper extension of the linear supporting element (LS), a concrete poured between an upper extension of the linear supporting element (LS) and the end face (11), a concrete poured between the end face (11) and another prefabricated floor element arranged with an end face facing the end face (11), or a concrete poured on top of the linear supporting element (LS) including reinforcement extending from the top to form a cast in situ torque moment resistant system.

6. The structure according to claim 5, which comprises yet another prefabricated floor element placed at one side such that respective lateral faces of the prefabricated floor elements face each other and such that a shear key is formed by pouring concrete in the volume delimited by the lateral faces, which comprises at least one duct (D) which extends continuously in the shear key (SK) and a post-tensioned tendon (PTT) inserted within the duct.

* * * * *